US006652283B1

United States Patent
Van Schaack et al.

(10) Patent No.: US 6,652,283 B1
(45) Date of Patent: Nov. 25, 2003

(54) SYSTEM APPARATUS AND METHOD FOR MAXIMIZING EFFECTIVENESS AND EFFICIENCY OF LEARNING RETAINING AND RETRIEVING KNOWLEDGE AND SKILLS

(75) Inventors: Andrew Van Schaack, Cupertino, CA (US); Andrew Smith Lewis, New York, NY (US)

(73) Assignee: Cerego, LLC, Arlington, VA (US)

( * ) Notice: Subject to any disclaimer, the term of this patent is extended or adjusted under 35 U.S.C. 154(b) by 0 days.

(21) Appl. No.: 09/475,496

(22) Filed: Dec. 30, 1999

(51) Int. Cl.[7] .............................................. G09B 19/00
(52) U.S. Cl. ...................... 434/236; 434/322; 434/323; 434/362
(58) Field of Search ................................ 434/362, 236, 434/322, 323

(56) References Cited

U.S. PATENT DOCUMENTS

| | | |
|---|---|---|
| 3,638,196 A | 1/1972 | Nishiyama et al. |
| 4,194,301 A | 3/1980 | Caldwell |
| 4,439,161 A | 3/1984 | Wiggins et al. |
| 4,447,213 A | 5/1984 | Culley |
| 4,509,137 A | 4/1985 | Yoshida |
| 4,637,797 A | 1/1987 | Whitney et al. |
| 4,802,103 A | 1/1989 | Faggin et al. |
| 4,921,427 A | 5/1990 | Dunn |
| 4,946,391 A | 8/1990 | Hawkins et al. |
| 5,010,495 A | 4/1991 | Willetts |
| 5,161,977 A | 11/1992 | Thomas, Jr. |
| 5,261,823 A | 11/1993 | Kurokawa |
| 5,267,865 A | 12/1993 | Lee et al. |
| 5,295,228 A | 3/1994 | Koda et al. |
| 5,302,132 A | 4/1994 | Corder |
| 5,306,154 A | 4/1994 | Ujita et al. |
| 5,316,485 A | 5/1994 | Hirose |
| 5,318,450 A | 6/1994 | Carver |
| 5,387,104 A | 2/1995 | Corder |
| 5,395,243 A | 3/1995 | Lubin et al. |
| 5,437,553 A * | 8/1995 | Collins et al. .......... 434/322 X |

(List continued on next page.)

FOREIGN PATENT DOCUMENTS

| | | |
|---|---|---|
| GB | 2 360 389 | 9/2001 |
| WO | WO 00/02178 | 1/2000 |
| WO | WO 00/43972 | 7/2000 |

OTHER PUBLICATIONS

Chu et al., "Using the Operator Function Model and OFMspert as the Basis for an Intelligent Tutoring System: Towards a Tutor/Aid Paradigm for Operators of Supervisory Control Systems"; IEEE Transactions on Systems, Man and Cybernetics, Jul. 25, 1995, No. 7, pp. 1054–1075.

Gunzenhaeuser, R., "Grundlagen intelligenter Lehr und Lernsysteme"; IT &TI Informationstechnik Und Technische Informatik, Oldenbourg, Velag, Dec. 1, 1997, pp. 11–15.

*Primary Examiner*—S. Thomas Hughes
*Assistant Examiner*—Chanda L. Harris
(74) *Attorney, Agent, or Firm*—Joseph R. Keating, Esq.

(57) ABSTRACT

A system, method and apparatus for maximizing the effectiveness and efficiency of learning, retaining and retrieving knowledge and skills includes a main engine having a Learn Module, a Review Module and a Test Module. Each of the Learn, Review and Test Modules are capable of operating independently but are preferably arranged to operate interactively such that operation of each of the Learn, Review and Test Modules are changed based on a user's past performance within one or more of the three modules. In addition, the main engine may also include a Schedule Module for flexibly scheduling learning, reviewing and retrieving knowledge and skills based on various factors and input information. The main engine also may include a Progress Module which monitors a user's performance on any of the Learn, Review and Test Modules and changes the future operation of each module based on the monitored performance. The main engine also may include a Help Module to provide assistance with any of the other modules.

112 Claims, 38 Drawing Sheets

U.S. PATENT DOCUMENTS

| | | | |
|---|---|---|---|
| 5,441,415 | A | 8/1995 | Lee et al. |
| 5,442,782 | A | 8/1995 | Malatesta et al. |
| 5,463,718 | A | 10/1995 | Maeda et al. |
| 5,486,111 | A | 1/1996 | Watkins |
| 5,494,444 | A | 2/1996 | Thayer et al. |
| 5,503,560 | A | 4/1996 | Stentiford |
| 5,540,589 | A * | 7/1996 | Waters .................. 434/156 X |
| 5,545,044 | A | 8/1996 | Collins et al. |
| 5,555,439 | A | 9/1996 | Higashino et al. |
| 5,577,919 | A | 11/1996 | Collins et al. |
| 5,597,312 | A | 1/1997 | Bloom et al. |
| 5,627,945 | A | 5/1997 | Cohen |
| 5,675,710 | A | 10/1997 | Lewis |
| 5,727,951 | A | 3/1998 | Ho et al. |
| 5,743,743 | A | 4/1998 | Ho et al. |
| 5,743,746 | A | 4/1998 | Ho et al. |
| 5,779,486 | A | 7/1998 | Ho et al. |
| 5,788,508 | A | 8/1998 | Lee et al. |
| 5,797,753 | A | 8/1998 | Griswold et al. |
| 5,797,754 | A | 8/1998 | Griswold et al. |
| 5,810,605 | A * | 9/1998 | Siefert .................. 434/362 X |
| 5,813,861 | A | 9/1998 | Wood |
| 5,836,771 | A | 11/1998 | Ho et al. |
| 5,863,208 | A | 1/1999 | Ho et al. |
| 5,870,731 | A | 2/1999 | Trif et al. |
| 5,884,302 | A | 3/1999 | Ho |
| 5,885,087 | A | 3/1999 | Thomas |
| 5,888,071 | A | 3/1999 | Takamori |
| 5,890,911 | A | 4/1999 | Griswold et al. |
| 5,904,485 | A * | 5/1999 | Siefert .................. 434/322 X |
| 5,934,909 | A | 8/1999 | Ho et al. |
| 5,934,910 | A | 8/1999 | Ho et al. |
| 5,944,530 | A * | 8/1999 | Ho et al. ............... 434/236 X |
| 5,957,699 | A | 9/1999 | Peterson et al. |
| 5,967,793 | A | 10/1999 | Ho et al. |
| 5,974,446 | A | 10/1999 | Sonnenreich et al. |
| 5,987,443 | A | 11/1999 | Nichols et al. |
| 6,003,021 | A | 12/1999 | Zadik et al. |
| 6,014,134 | A | 1/2000 | Bell et al. |
| 6,017,219 | A | 1/2000 | Adams, Jr. et al. |
| 6,022,221 | A * | 2/2000 | Boon .................... 434/156 X |
| 6,024,572 | A | 2/2000 | Weyer |
| 6,024,577 | A | 2/2000 | Wadahama et al. |
| 6,029,043 | A | 2/2000 | Ho et al. |
| 6,029,156 | A | 2/2000 | Lannert et al. |
| 6,039,575 | A | 3/2000 | L'Allier et al. |
| 6,064,856 | A | 5/2000 | Lee et al. |
| 6,067,537 | A | 5/2000 | O'Connor et al. |
| 6,077,085 | A * | 6/2000 | Parry et al. ............ 434/322 X |
| 6,085,184 | A | 7/2000 | Bertrand et al. |
| 6,086,382 | A | 7/2000 | Thomas |
| 6,118,973 | A | 9/2000 | Ho et al. |
| 6,120,300 | A | 9/2000 | Ho et al. |
| 6,126,448 | A | 10/2000 | Ho et al. |
| 6,141,528 | A | 10/2000 | Remschel |
| 6,141,529 | A | 10/2000 | Remschel |
| 6,148,174 | A | 11/2000 | Remschel |
| 6,149,438 | A | 11/2000 | Richard et al. |
| 6,149,441 | A | 11/2000 | Pellegrino et al. |
| 6,154,631 | A | 11/2000 | Remschel |
| 6,159,014 | A | 12/2000 | Jenkins et al. |
| 6,206,700 | B1 * | 3/2001 | Brown et al. .......... 434/116 X |
| 6,212,358 | B1 * | 4/2001 | Ho et al. ............... 434/362 X |
| 6,302,697 | B1 * | 10/2001 | Tallal et al. ........... 434/185 X |
| 6,306,086 | B1 * | 10/2001 | Buscke .................. 600/300 X |

* cited by examiner

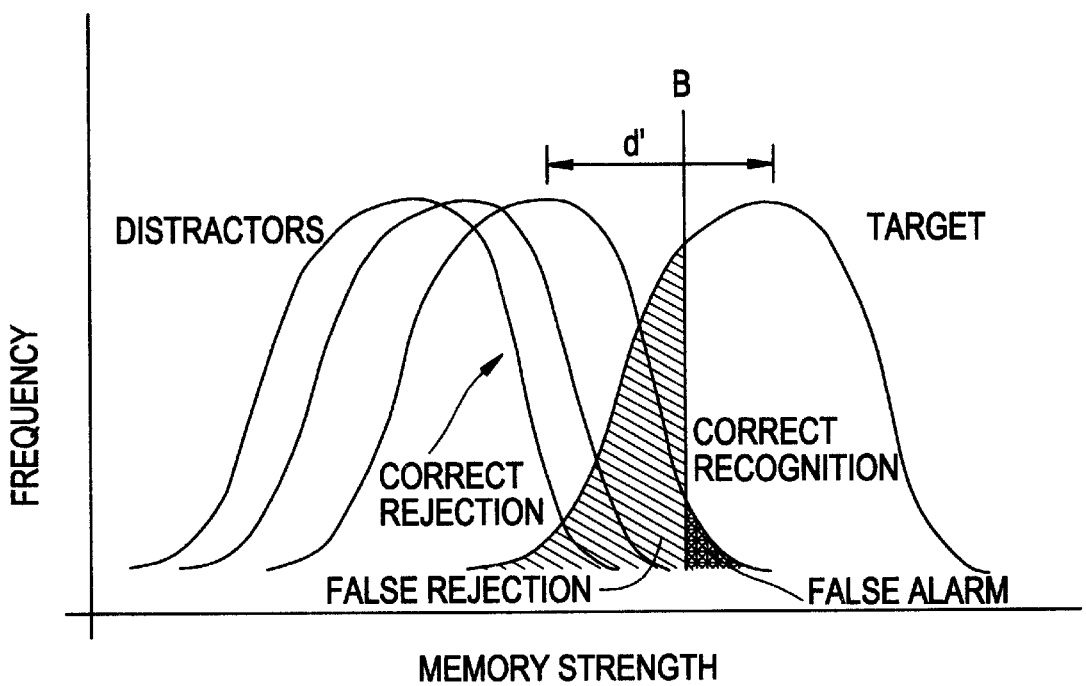

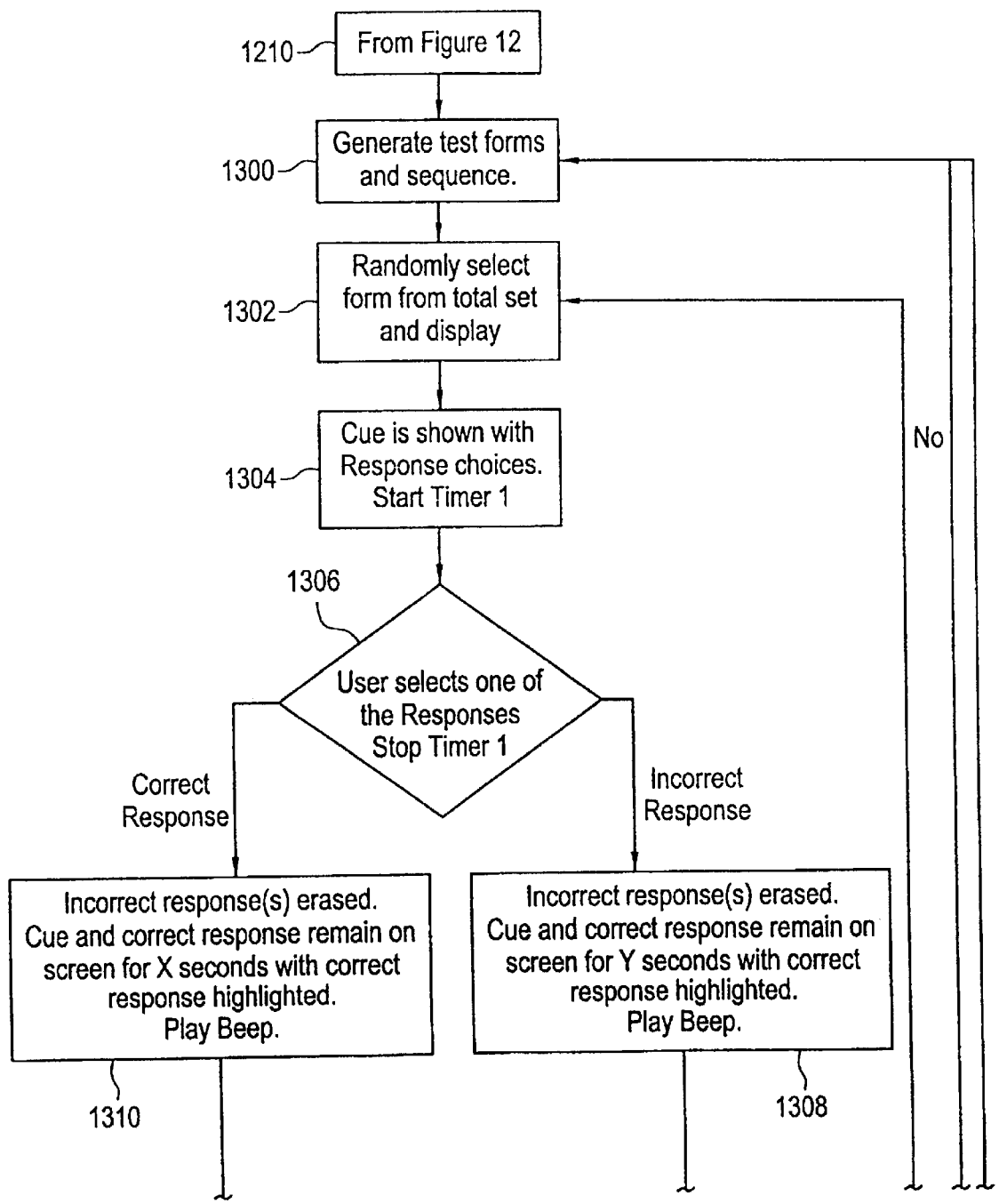

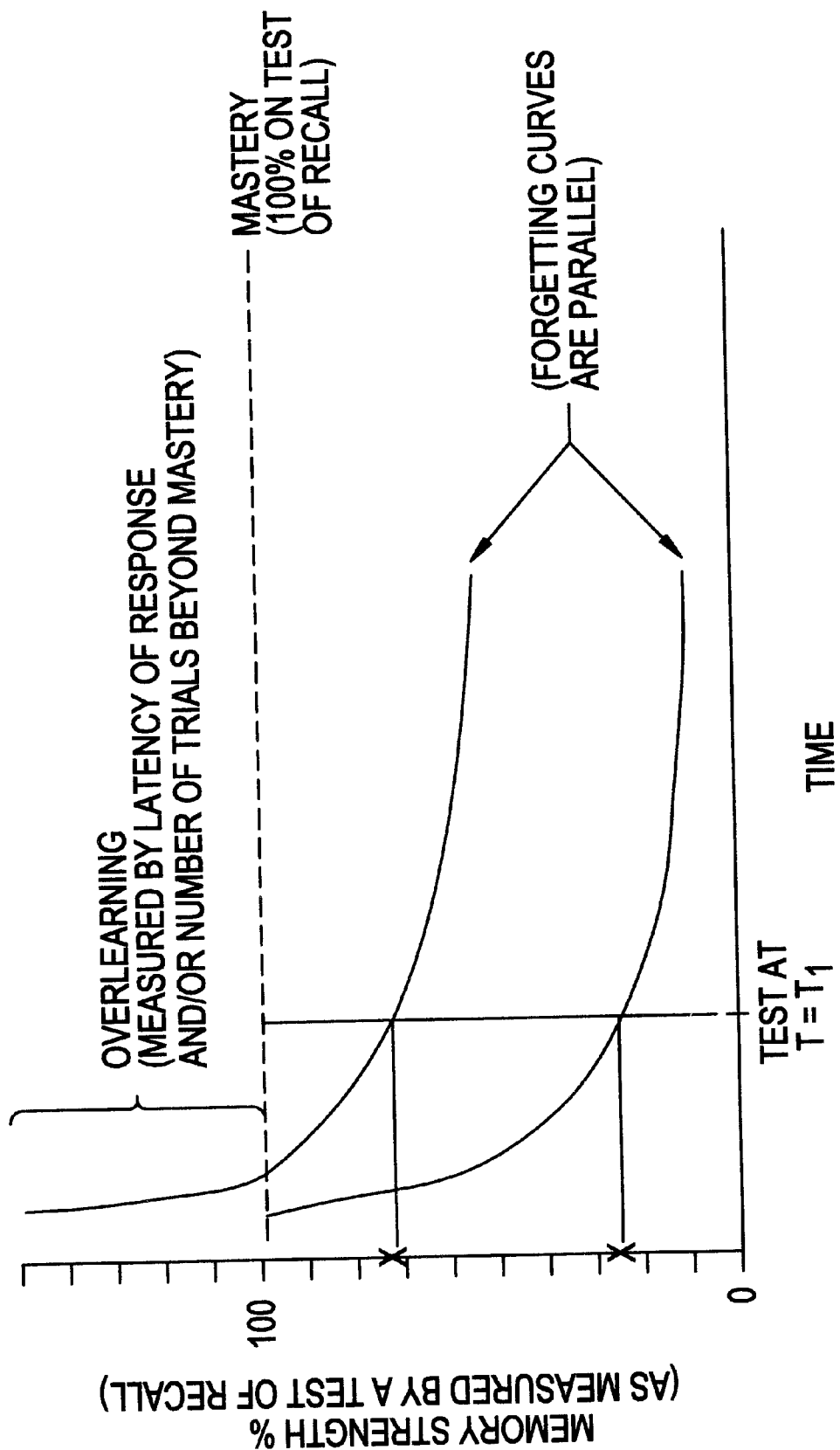

FIG. 16

$U_I \ U_1 \ \underbrace{K_R U_2} \ \underbrace{K_R K_R U_3} \ \underbrace{K_R K_R K_R U_4} \ \underbrace{K_R K_R K_R K_R U_5} \longrightarrow$ $U_I$ : INITIAL PRESENTATION OF UNKNOWN ITEM
$U_N$: $N^{th}$ PRESENTATION OF UNKNOWN ITEM
$K_R$: KNOWN ITEM, CHOSEN RANDOMLY FROM PREVIOUSLY LEARNED ITEMS

FIG. 17

$U_I$ [ $T_1$: CUE AND RESPONSE SHOWN BY FIRST METHOD
     $T_2$: BLANK SCREEN / NULL EVENT $U_N$ [ $T_3$: UNKNOWN CUE SHOWN
     $T_4$: UNKNOWN RESPONSE SHOWN BY SECOND METHOD
     $T_5$: UNKNOWN CUE AND RESPONSE REMAIN
     $T_6$: BLANK SCREEN / NULL EVENT $K_R$ [ $T_7$: KNOWN CUE SHOWN
     $T_8$: KNOWN RESPONSE SHOWN BY THIRD METHOD
     $T_9$: KNOWN CUE AND RESPONSE REMAIN
     $T_{10}$: BLANK SCREEN / NULL EVENT

FIG. 18

|          | $T_1$ | $T_2$ | $T_3$ | $T_4$ | $T_5$ | $T_6$ | $T_7$ | $T_8$ | $T_9$ | $T_{10}$ |
|----------|------|------|------|------|------|------|------|------|------|-------|
| INITIAL  | 2.5  | 2.0  | .85  | .185 | 2.0  | .50  | 2.0  | .25  | 2.0  | .5    |
| MAX      | 2.5  | 2.0  | —    | —    | 2.0  | —    | 2.0  | —    | 2.0  | —     |
| MIN      | 1.5  | 1.0  | —    | —    | 1.0  | —    | 1.0  | —    | 1.0  | —     |
| MID      | 2.0  | 1.5  | —    | —    | 1.5  | —    | 1.5  | —    | 1.5  | —     |
| INCREASE | —    | .125 | —    | —    | —    | —    | .125 | —    | .125 | —     |
| DECREASE | .10  | .25  | —    | —    | .10  | —    | .25  | —    | .25  | —     |

FIG. 22

CUE

|  | TEXT | PICTURE | SOUND | MAP | ANIMATION | KINESTHETIC | LIST | OTHER I/O |
|---|---|---|---|---|---|---|---|---|
| TEXT | TT | PT | ST | MT | AT | KT | LT | OT |
| PICTURE | TP | PP | SP | MP | AP | KP | LP | OP |
| SOUND | TS | PS | SS | MS | AS | KS | LS | OS |
| MAP | TM | PM | SM | MM | AM | KM | LM | OM |
| ANIMATION | TA | PA | SA | MA | AA | KA | LA | OA |
| KINESTHETIC | TK | PK | SK | MK | AK | KK | LK | OK |
| LIST | TL | PL | SL | ML | AL | KL | LL | OL |
| OTHER I/O | TO | PO | SO | MO | AO | KO | LO | OO |

RESPONSE

FIG. 23

CURVE NUMBER

| | 1 | 2 | 3 | 4 | 5 | 6 | 7 | 8 |
|---|---|---|---|---|---|---|---|---|
| 1 | 1 | 1 | 1 | 1 | 1 | 1 | 1 | 1 |
| 2 | 3 | 2 | 2 | 2 | 2 | 2 | 2 | 2 |
| 3 | 8 | 6 | 5 | 4 | 3 | 3 | 3 | 3 |
| 4 | 26 | 15 | 10 | 8 | 6 | 5 | 4 | 4 |
| 5 | 87 | 41 | 24 | 16 | 12 | 9 | 8 | 6 |
| 6 | 315 | 121 | 61 | 36 | 24 | 18 | 14 | 11 |
| 7 | 1253 | 382 | 163 | 86 | 53 | 35 | 26 | 20 |
| 8 | 5517 | 1313 | 471 | 218 | 120 | 74 | 50 | 36 |
| 9 | / | 4983 | 1477 | 593 | 292 | 165 | 104 | 71 |
| 10 | / | / | 5118 | 1760 | 767 | 395 | 229 | 146 |
| 11 | / | / | / | 5793 | 2212 | 1024 | 545 | 323 |
| 12 | / | / | / | / | 7132 | 2937 | 1421 | 776 |
| 13 | / | / | / | / | / | 9537 | 4146 | 2071 |
| 14 | / | / | / | / | / | / | / | 6301 |

REVIEW NUMBER

FIG. 24

SCORE

| ROUND | | 1 | 2 | 3 | 4 | 5 |
|---|---|---|---|---|---|---|
| | 1 | ↓ | ↓ | ↓ | 0 | -1 |
| | 2 | ↓ | ↓ | ↓ | 0 | 0 |
| | 3 | ↓ | ↓ | ↓ | +1 | +1 |
| | 4 | START OVER | | | +2 | +1 |

| Q₁ | Q₁ | Q₂ | Q₂ |
|---|---|---|---|
| A₁   A₂ | A₂   A₁ | A₁   A₂ | A₂   A₁ |
| A₁ | A₁ | A₂ | A₂ |
| Q₁   Q₂ | Q₂   Q₁ | Q₁   Q₂ | Q₂   Q₁ |

| Lesson 1 |
|---|
| This lesson contains 10 question and answer pairs which will teach you the first 10 amendments to the United States Constitution-these are called the Bill of Rights.<br><br>The Bill of Rights came into effect on December 15, 1791. |
| ©1998, by XYZ, Inc. | 11/10/98 | Preview | ◀ ▶ | Close |

FIG. 31

Fifth Amendment

FIG. 32

Fifth Amendment due process of law

FIG. 40

Fifth Amendment

Show the answer

FIG. 41

Fifth Amendment due process of law

Rate the quality of your response:

① ② ③ ④ ⑤

Low ~~~~~~~~~~ High

Fifth Amendment

A

B

C

D due process of law

| | | |
|---|---|---|
| TODAY'S WORD | HALCYON adj (HAL see un)<br>PEACEFUL, TRANQUIL DAYS<br>THESE HALCYON DAYS SUGGEST THAT WE WILL HAVE A RELAXING VACATION. | WEDNESDAY<br>APRIL 22 |
| RECENT WORDS | GRIEVOUS adj (GREE vus)<br>ATROCIOUS<br>GRATIS adj (GRATIS)<br>FREE | APRIL<br>Su  M  Tu  W  Th  F  Sa<br>          1   2   3   4<br>5   6   7   8   9  10  11<br>12 13 14 15 16 17 18<br>19 20 21 [22] 23 24 25<br>26 27 28 29 30 31 |
| OLDER WORDS FOR REVIEW | FORENSIC............USED IN COURT OF LAW<br>CREVICE...............A CRACK<br>CARCINOGENIC...CAUSING CANCER<br>ASCRIBE...............ATTRIBUTE TO<br>ACCRUE...............ACCUMULATE | |

SYSTEM APPARATUS AND METHOD FOR MAXIMIZING EFFECTIVENESS AND EFFICIENCY OF LEARNING RETAINING AND RETRIEVING KNOWLEDGE AND SKILLS

BACKGROUND OF THE INVENTION

1. Field of the Invention

The present invention relates to a system, apparatus and method for learning, and more specifically, relates to a system, apparatus and method for interactively and adaptively maximizing the effectiveness and efficiency of learning, retaining and retrieving knowledge and skills including flexibly scheduling learning, retaining and retrieving knowledge and skills based on various factors and input information.

2. Description of Background Art

Previous systems and methods for learning have focused on presenting an item or items to be learned in a paired-associate format, such as a cue and response system. These prior art systems and methods have relied heavily on the motivation and metacognitive skills of the student and therefore, have varying degrees of effectiveness and efficiency. More importantly, such prior art methods and systems have very limited success in terms of a student actually acquiring knowledge or skills rapidly, ensuring that the student maintains the knowledge and skills to a high degree of retention for an extended period of time, and enabling the student to retrieve knowledge and skills automatically at some future date.

In a well known prior art method, a paired-associate learning method is embodied in a group of flashcards which may be presented manually or electronically via a computer, for example. In a typical example of such a method, a student starts by separating flashcards into two groups: known and unknown. The student studies each unknown flashcard by first viewing the question on one side of the flashcard and then formulating a response to the question. The student then turns the card over and views the answer provided. The student judges the adequacy of his response by comparing his answer to the correct answer. If the student believes he has learned or "knows" the paired-associate, that flashcard is placed in the group of known items. When the student has studied all of the flashcards in the first unknown group, and all of the flashcards have been transferred to the group of known flashcards, the student may review the group of known items in the same manner as described above. In an alternative method, the cards can be shuffled for learning. Thus, in this method, the learning and review is performed by a student simply looking at flashcards to determine correct responses and reviewing the flashcards as desired, with no fixed schedule or sequence.

In another method invented by B. F. Skinner, a method of learning and reviewing is provided. More specifically, Skinner discloses a machine which presents a number of paired-associate questions and answers. The learning machine has an area for providing questions, and an area where the user writes in an answer to these questions. At the time the question is presented, the correct answer is not visible. A student reads a question and then writes in an answer in the area provided. The user turns a handle which causes a clear plastic shield to cover his answer while revealing the correct answer. The user judges the adequacy of his response. If the user judges that his answer is adequate, he slides a lever which punches a hole in the question and answer sheet and turns a handle revealing the next question. If the answer is judged to be inadequate, the user simply turns a handle revealing the next question. After all of the questions have been answered a first time, the user can make a second pass through the questions and answers. The machine operates such that only the questions which were answered incorrectly in the first pass are viewable during the second pass so as to provide a review of questions which were answered incorrectly. Thus, this conventional method provides a crude method of enabling review of missed questions.

A slightly more advanced method was invented by Sebastian Leitner and described in "So Lernt Man Lernen." The method involves studying flashcards as in the method described above, but in addition, involves using a specially constructed box to calculate review schedules. More specifically, the box has five compartments increasing in depth from the first compartment to the fifth compartment. According to Leitner's method, a student takes enough "unknown" flashcards to fill the first compartment and places them in the first compartment. The student begins by taking the first card out of the box and reading the question. The student then constructs an answer and compares it to the correct answer on the back of the card. If the student is correct, the student places the flashcard in the second compartment. If the student cannot construct an answer, or if the student's answer is incorrect, the student places the flashcard at the back of the group of cards in the first compartment. This process continues until all of the cards have been moved to the second compartment and the student stops the learning session. The next learning session begins by placing new "unknown" cards into the first compartment. The process of studying and sorting is performed as described above until once again, no cards remain in the first compartment. At some future date, the second compartment will be full of cards placed there during previous learning sessions. At that time, the student begins to study the cards in the second compartment, except this time, known cards are placed into the third compartment and unknown cards are placed backed into the first compartment. New cards are continually introduced into the first compartment and are moved through the compartments as they are learned and reviewed Cards that are easily remembered or known are moved from the more shallow compartments to the deeper compartments and therefore are reviewed less and less frequently. Cards that are more difficult to learn are put back into the more shallow compartments for more frequent review. This method provides a crude form of scheduled review of learned items based on item difficulty.

A computer-based version of Leitner's method is provided in the German language computer software program entitled Lernkartei PC 7.0 and in the Spanish language computer software entitled ALICE (Automatic Learning In a Computerized Environment) 1.0. With ALICE 1.0, question and answer units are presented to a user and the number of cards and interval of time between study sessions are distributed to adapt to a user's work habits.

Other conventional methods have recognized the importance of developing a system to present items for review. For example, a computer program developed by Piotr Wozniak in Poland and referred to as "SuperMemo" uses a mathematical model of the decline of memory traces to determine spacing of repetitions to maintain long term retention of paired-associates.

In another prior art method described in U.S. Pat. Nos. 5,545,044, 5,437,553 and 5,577,919 issued to Collins et al., paired-associates are presented to a user for learning. However, unlike the conventional methods described above, in this invention, the user is first queried as to whether a particular item is perceived to be known or unknown, not whether the user actually knows the item, or knows the correct answer to a question. That is, a user is asked to determine whether they think they know the correct response to the cue, not what the correct response actually is. Then, a sequence of perceived known items and perceived unknown items is generated and presented to the user in the form of cue and response for learning. Similar to the first conventional method described above, the question of the perceived known or unknown items is presented to a user, the user constructs a response to the presented cue and then compares the constructed response to the correct response.

The prior art methods described above have generally proven to be only marginally effective for learning, retaining and retrieving knowledge and skills. The prior art methods often require a user to schedule and manage the learn, review and test processes which consequently consumes a portion of the cognitive workload of the user thereby reducing efficiency of learning, retaining and retrieving knowledge and skills. The cognitive workload is the amount of mental work that an organism, such as a human, can produce in a specified time period. By diverting some of the cognitive workload away from learning, the organism is distracted from learning and cannot devote all of the available cognitive resources to learning.

Furthermore, because the user is making subjective judgements of perceived knowledge, they provide feedback to the method that is distorted by certain cognitive illusions inherent in self-paced study. These subjective inputs result in less effective learning than would otherwise be possible. Furthermore, even though some of the prior art methods monitor progress of learning or reviewing or testing, future learning or reviewing or testing are not modified based on a student's actual performance results.

In addition, most prior art methods seek to train or teach knowledge or skills only to a level of recall in which a person or organism must expend significant cognitive effort to attempt to remember an item previously learned. Conventional methods have not been successful in training or teaching knowledge or skills to a level of automaticity in which performance is characterized by an extremely rapid response without conscious effort or attention.

Also, there are many different theories, scientific principles, and concepts relating to learning, memory and performance which seek to explain how humans and other organisms are able to encode, store and retrieve knowledge and skills. Although these theories, principles and concepts have been studied, they have not been quantitatively measure and applied in a synergistic and effective manner to improve learning, reviewing and retrieving knowledge and skills. Furthermore, the prior art methods do not train a student to become a better learner by monitoring and improving their metacognitive skills, but merely provide a marginal improvement in the ability to encode and recall learned items.

SUMMARY OF THE INVENTION

To overcome the problems described above and to provide other significant and previously unattainable advantages, preferred embodiments of the present invention provide a system including various apparatuses and methods for maximizing the effectiveness and efficiency of learning, reviewing and retrieving knowledge and skills in an interactive and adaptive matter that minimizes the cognitive workload or mental effort of the user, while minimizing or eliminating forgetting of the knowledge or skills learned.

In addition, preferred embodiments of the present invention provide a system including apparatuses and methods for allowing a user to encode, store and retrieve knowledge and skills flexibly and efficiently in response to overt and covert inputs from the user or other sources of input information, such as a desired level of memory strength, the date when the knowledge or skills are needed, the schedule of availability to use the system and many other factors.

More specifically, preferred embodiments of the present invention provide a system including various apparatuses and methods for maximizing the ease of use of the system and maximizing the results of learning, retaining and retrieving of knowledge and skills by allowing a user, administrator or other input information source to interactively and flexibly input information to be learned, identify confusable items to be learned, select desired levels of initial learning and final retention of knowledge or skills, and input preferences regarding scheduling of learning, reviewing and testing and other input information relating to the learning, reviewing and testing of knowledge or skills. Based on these and other input information, the system schedules operation of the learn, review and test operations in the most efficient way to guarantee that the user achieves the desired degree of learning within the desired time period.

Furthermore, preferred embodiments of the present invention provide a system including apparatuses and methods which include a Learn Module for presenting new knowledge or skills to a user, a Review Module for presenting previously learned knowledge or skills to a user in order to maintain a desired level of retention of the knowledge or skills learned previously, and a Test Module for testing of previously learned knowledge or skills. Each of the three modules are preferably adapted to interact with the other two modules and the future operation of each of the Learn, Review and Test modules and scheduling thereof can be based on previous performance in the three modules to maximize effectiveness and efficiency of operation.

The advantages achieved by basing the interaction and scheduling of the Learn, Review, and Test Modules on previous performance in the three modules include achieving much more effective and efficient combined and overall operation of each of the three main modules so that a user encodes, stores and retrieves knowledge and skills much more effectively and efficiently, while also becoming a better learner.

Also, preferred embodiments of the present invention provide a system including various methods and apparatuses which provide an extremely effective method of encoding, storing and retrieving knowledge or skills which are quantitatively based and interactively modified according to a plurality of scientific disciplines such as neuroscience (the scientific study of the nervous system and the cellular and molecular mechanisms associated with learning and memory), cognitive psychology (an approach to psychology that emphasizes internal mental processes), and behavioral psychology (an approach to psychology that emphasizes the actions or reactions produced in response to external or internal stimuli), as well as scientific principles including: active recall (the process whereby a student constructs a response to a presented cue as opposed to passive recall in which a student simply observes a cue and response paired presented), the alternative forced-choice method (a test of memory strength sensitive to the level of recognition in which a cue is presented followed by the correct response randomly arranged among several alternative choices called distracters, and in which the student must discriminate the correct response from the distracters), arousal (the student's experience of feeling more or less energetic which feeling is accompanied by physiological changes in perspiration, pupil diameter, respiration and other physiological reactions, and which influences information processing, in particular, the encoding and retrieval of information), attention (the ability or power to concentrate mentally by focusing on certain aspects of current experience to the exclusion of all others), automaticity (performance characterized by rapid response without conscious attention or effort), the auditory rehearsal loop (the process of rehearsal, usually via subvocal speech, to maintain verbal information in memory, in which the loop is capable of holding approximately 1.5 to 2.0 seconds worth of information), classical conditioning (the procedure in which an organism comes to display a conditioned response to a neutral conditioned stimulus that has been paired with a biologically significant unconditioned stimulus that evoked an unconditioned response), cognitive workload (the amount of mental work that a student produces or can produce in a specified time period), confidence (a subjective judgement made regarding the degree of certainty of the correctness of a constructed response or of a subjective evaluation), consolidation (the initial period of time in memory formation when information in a relatively transient state is transformed to a more permanent, retrievable state), consolidation period (the interval during which the transformation to the more permanent retrievable state occurs), contiguity (two items occurring or being presented close together in time), contingency (two items being presented or occurring in a manner such that the occurrence of one item increases the probability that another item will occur, which is required to form a conditioned association), discrimination (the act of distinguishing between two or more items by noting the differences between the two or more items), ease of learning (a metacognitive judgement made in advance of knowledge acquisition in the form of a prediction about what will be easy or difficult to learn), encoding specificity (the theory that memory performance is better when tested in the presence of the same cues that were present when the memory was formed), encoding variability (the theory that memory performance is better when multiple cues are available to generate a desired response), feeling of knowing (a metacognitive judgement made during or after knowledge or skill acquisition as to whether a given, currently non-recallable item is known or will be remembered on a subsequent retention test), generalization (when a response is evoked by a cue other than the one it was conditioned to), habituation (a decrease in response as a result of repeated exposed to a stimulus), instrumental conditioning (a situation in which a particular stimulus occurs and if an organism generates a response, then a particular reinforcer will occur), interference (a negative relationship between the learning of two sets of material), judgement of learning (a metacognitive judgement during or soon after knowledge acquisition which is a prediction about future test performance on currently recallable items), the labor-in-vain effect (in self-paced study, students make metacognitive judgements that determine the allocation of effort and often study beyond the point where any benefit is derived), latency of recall (a measure of time required to construct a response to a presented cue), learned helplessness (when a negative reinforcement is provided independent of a student's performance, the student behaves as though they have no control over their situation), long term potentiation (when appropriate stimulation is provided to some areas of the brain, there is a long term increase in the magnitude of the response of the cells to further stimulation), memory activation (the availability of an item in memory such that items which have been recalled recently have relatively higher activation than those that have not), memory strength (a property of memory which increases with repeated practice and is the degree to which a cue can activate a memory record), metacognition (the process of monitoring and controlling mental processes, particularly those associated with the acts of learning and retrieving), overlearning (learning that continues past the point where the student is first able to construct the correct response to a presented cue), paired-associate learning (a memory procedure in which the student learns to give a response when presented with a cue), performance (the observable qualities of learning; sometimes measured by the ability to discriminate a signal from noise), probability of recall (a measure of the likelihood that a student will be able to construct the correct response to a presented cue), rapid serial visual presentation (the presentation of a passage of text, one word or phrase at a time, serially, each in the same position on a display, so as to increase reading speeds and eliminate saccades required in normal reading), rehearsal (the process of repeating information to oneself in order to remember it), reinforcement (following a behavior with an especially powerful event such as a reward or punishment), the retrieval practice effect (the act of retrieving an item from memory facilitates subsequent retrieval access of that item and the act of retrieval does not simply strengthen an item's representation in memory, it also enhances the retrieval process), savings in relearning (a measure of memory strength calculated by measuring the amount of time necessary to relearn an item to the same criteria as that attained in the initial learning session), sensitization (increase in response as a result of repeated exposure to a stimulus), the serial position effect (the observation that items at the beginning and end of a list that are learned in serial order are more easily remembered than items in the middle of the list), signal detection theory (a method used to measure the criterion an observer uses in making decisions about signal existence and to measure the observer's sensitivity that is independent of his decision criteria), the spacing effect (the finding that for a given amount of study time, spaced presentations yield substantially better learned than massed presentations), the time of day effect (differences in performance on learning tasks and other factors relating to circadian rhythms depending on the time of day), transfer appropriate processing (the concept that memory performance is better when a student processes an item in the same way in which the item was processed during learning or study), vigilance (the process of paying close and continuous attention), Von Restorff effect (the observation that an item from one category that is learned as a part of a serial list of items all from a different category will be more easily recalled than items from around it in the list) and many other important factors which are applied in novel and unique ways, both individually and in combination with other factors. For the first time, the above-listed factors or phenomena are measured in a quantifiable manner and the measurements of the effects of these factors are used to interactively and adaptively modify the processes of learning, reviewing and testing knowledge and skills to achieve results never before obtainable.

While the above-listed factors have been studied in the past, and the effects thereof sometimes even measured, the measurements have not been quantified and then used in a feedback system to continuously and interactively modify future encoding, storage and retrieval of knowledge and skills to achieve maximum effectiveness and efficiency.

The system, apparatuses and methods of preferred embodiments of the present invention may be used to perform learning, reviewing and testing of any type of knowledge and skills in any format. The information including knowledge or skills to be learned, reviewed and tested, referred to as "content," can be obtained from any source including but not limited to a text source, an image source, an audible sound source, a computer, the Internet, a mechanical device, an electrical device, an optical device, the actual physical world, etc. Also, the content may already be included in the system or may be input by a user, an administrator or other source of information. While the knowledge or skills to be learned, reviewed and tested may be presented in the form of a cue and response or question and answer in preferred embodiments of the present invention, other methods and formats for presenting items to be learned, reviewed and tested may be used.

More specifically, the content is preferably arranged in paired-associate (cue and response) format for ease of learning. The paired-associates may be presented visually, auditorily, kinesthetically or in any other manner in which knowledge or skills can be conveyed. The content may be also arranged in a serial or non-serial procedural order for skill-based learning. Any other arrangements where there is any form of a cue with an explicit or implicit paired response or responses are appropriate for use in the systems, methods and apparatuses of preferred embodiments of the present invention.

In one specific preferred embodiment, a system includes a Learn Module, a Review Module and a Test Module, each of which is arranged to interact and adapt based on the performance and user results in the other two modules and the particular module itself. That is, operation and functioning of each of the Learn, Review and Test Modules are preferably changed in accordance with how a user performed in all modules. The Learn Module, the Review Module and the Test Module preferably define a main engine of the system which enables information to be encoded, stored and retrieved with maximum efficiency and effectiveness.

A Discriminator Module may be included in the main engine to assist with the learning, reviewing and testing of confusable items.

A Schedule Module may also be included in the main engine to schedule the timing of operation of each of the Learn, Review and Test Modules. The scheduling is preferably based on a user's performance on each of the Learn, Review and Test modules, in addition to input information. The Schedule Module completely eliminates all scheduling planning and tasks which are normally the responsibility of the user, and thereby greatly increases the cognitive workload and metacognitive skills that the user can devote completely to learning, reviewing and testing of knowledge or skills.

Further, a Progress Module may be included in the main engine for monitoring a user's performance on each of the Learn, Review and Test Modules so as to provide input to the system and feedback to the user whenever desired. The Progress Module presents critical information to the user about the processes of learning, reviewing and testing in such a manner as to enable the user to increase his metacognitive skills and become a much better learner both with the system of preferred embodiments of the present invention and also outside of the system.

Also, a Help Module may be provided to allow a user to obtain further instructions and information about how the system works and each of the modules and functions thereof. The Help Module may include a help assistant that interactively determines when a user is having problems and provides information and assistance to overcome such difficulty and make the system easier to use. The Help Module may provide visual, graphical, kinesthetic or other types of help information.

It should be noted that although in the preferred embodiment of the present invention described in the preceding paragraph, the system preferably includes an interactive combination of Learn, Review and Test Modules, each module can be operated independently, and each module has unique and novel features, described below, which are independent of the novel combination of elements and the interactive and adaptive operation of the main engine described above.

In addition, other modules may be provided and used with the system described above. These other modules are preferably not included as part of the main engine, but instead are preferably arranged to interact with the main engine or various modules therein. For example, a Create Module may be provided outside of but operatively connected to the main engine to allow for input of knowledge or skills to be learned, retained or retrieved. The Create Module thus enables a user, administrator or other party to input, organize, modify and manage items to be learned so as to create customized lessons.

An Input Module may also be included and arranged similar to the Create Module. The Input Module is preferably arranged to allow a user, administrator, or other party to input any information that may affect operation of the modules of the main engine. Such input information may include information about which of the main engine modules is desired to be activated, changes in scheduling of learning, reviewing or testing, real world feed back which affect the learning, reviewing and testing and any other information that is relevant to the overall operation of the system and the modules contained in the main engine.

Also, a Connect Module may be provided outside of but operatively connected to the main engine to all external systems such as computers, the Internet, personal digital assistants, cellular telephones, and other communication or information transmission apparatuses, to be connected to the main engine. In fact, the Connect Module may be used for a variety of purposes including allowing any source of information to be input to the main engine, allowing multiple users to use the system and main engine at the same time, allowing a plurality of systems or main engines to be connected to each other so that systems can communicate. Other suitable connections may also be achieved via the connect module.

Another preferred embodiment of the present invention provides a method of learning including the steps of presenting knowledge or skills to be learned so that the knowledge or skills to be learned become learned knowledge or skills; presenting the learned knowledge or skills for review in a way that is different from the way in which the knowledge or skills are presented during learning, and presenting knowledge or skills for reviewing or testing whether the learned knowledge or skills have actually been learned. The method includes a step of monitoring each of the above steps and changing scheduling of each step based on progress in each step without the user knowing that monitoring or scheduling changes are occurring.

As noted above, with respect to the Input Module, the main engine and the methods performed thereby, can communicate with the real world allowing for feedback, information exchange and modification of the operation of the modules of the main engine based on real world information. All of these modules are preferably interactive with the Schedule Module and scheduling process which determines sequence of operation of the three modules and responds to the input information from the various input sources and optimizes the schedule of operation of the learn, review, and test processes.

The system, including the various methods and apparatuses of preferred embodiments of the present invention, is constructed to have a highly adaptive interface that makes the system extremely streamlined and progressively easier to use each time a user operates any of the modules of the system. The system preferably prompts a new user for identification information such as a password or other textual, graphical, physiological or other identifying data that identifies each user. Then, the adaptive interface determines the pattern of usage, and with what level of skill that particular user has operated the system. Based on this information, the system adapts to the user's familiarity level with the system and changes the presentation of information to the user to make it easier and quicker to use the system. For example, cues, instructions, help messages and other steps may be skipped if a particular user has operated the system many times successfully. Preferably, the Help module is preferably available should an advanced user forget how to operate the system.

The various systems, methods and apparatuses of preferred embodiments of the present invention may take various forms including a signal carrier wave format to be used on an Internet-based system, computer software or machine-executable or computer-executable code for operation on a processor-based system such as a computer, a telephone, a personal digital assistant or other information transmission device. Also, the systems, methods and apparatuses of preferred embodiments of the present invention may be applied to non-processor based systems which include but are not limited audio tapes, video tapes, paper-based systems including calendars, books, and any other documents.

The items to be learned, reviewed and tested using the systems, methods and apparatuses of preferred embodiments of the present invention are not limited. That is, items to be learned, reviewed and tested can be any knowledge, skill, or other item of information or training element which is desired to be learned initially and retrieved at a later date, or used to improve or build a knowledge base or skill base, to change behavior or thought processes, and to increase the ability to learn, review and test other items. For example, the systems, methods and apparatuses of preferred embodiments of the present invention may be used for all types of educational teaching and instruction, test preparation for educational institutions and various certifications such as CPA, bar exams, etc., corporate training, military and armed forces training, training of police offices and fire/rescue personnel, advertising and creating consumer preferences and purchasing patterns, mastering languages, learning to play musical instruments, learning to type, and any other applications involving various knowledge or i skills. That is, the real-world applications of the systems, methods and apparatuses of preferred embodiments of the present invention are not limited in any sense.

Other features, advantages, elements and modifications of preferred embodiments of the present invention will become more apparent from the detailed description of the present invention below.

BRIEF DESCRIPTION OF THE DRAWINGS

A more complete appreciation of the present invention and many of the attendant advantages thereof will be readily obtained as the same becomes better understood by reference to the following detailed description of preferred embodiments when considered in connection with the accompanying drawings, wherein:

FIG. 5 is graph of frequency versus memory strength indicative of the signal detection theory with multiple distractors related to preferred embodiments of the present invention;

FIG. 6 is a matrix indicative of the signal detection theory shown graphically in FIG. 5;

FIG. 15 is a graph of the memory strength versus time which is indicative of the benefits of overlearning used in the system shown in FIG. 1;

FIG. 16 is a table showing a learn presentation sequence in which cues and responses are presented in a certain sequence in the system of FIG. 1;

FIG. 17 is a table showing a learn presentation pattern indicative of the order of presenting items to be learned as shown in FIG. 16;

FIG. 18 is a table illustrating learn presentation timing indicative of the timing of the presentation of the items shown in FIGS. 16 and 17;

FIG. 22 is a table showing a modality pairing matrix including various combinations of cues and responses used in the system of FIG. 1;

FIG. 23 is a Review Curve Table which models curves indicative of the forgetting rate for each item learned in the system of FIG. 1;

FIG. 24 is a Review Hopping Table which is a set of instructions for informing the system of FIG. 1 how to switch between review curves for each item to be reviewed;

FIG. 31 is an illustration of a learn sequence including the presentation of a cue for a preferred embodiment of the system shown in FIG. 1;

FIG. 32 is an illustration of a learn sequence including the presentation of a cue and response for a preferred embodiment of the system shown in FIG. 1;

FIG. 40 is an illustration of a review sequence including a presentation of a cue to be reviewed for a preferred embodiment of the present invention;

FIG. 41 is an illustration of a review sequence including a user rating the quality of response for a preferred embodiment of the present invention;

FIG. 52 is a schematic illustration of a preferred embodiment of the present invention in which the system of FIG. 1 is applied to a paper-based system; and FIG. 53 is an illustration of a review expansion series for the paper-based embodiment shown in FIG. 52.

DETAILED DESCRIPTION OF PREFERRED EMBODIMENTS

Figure 1:
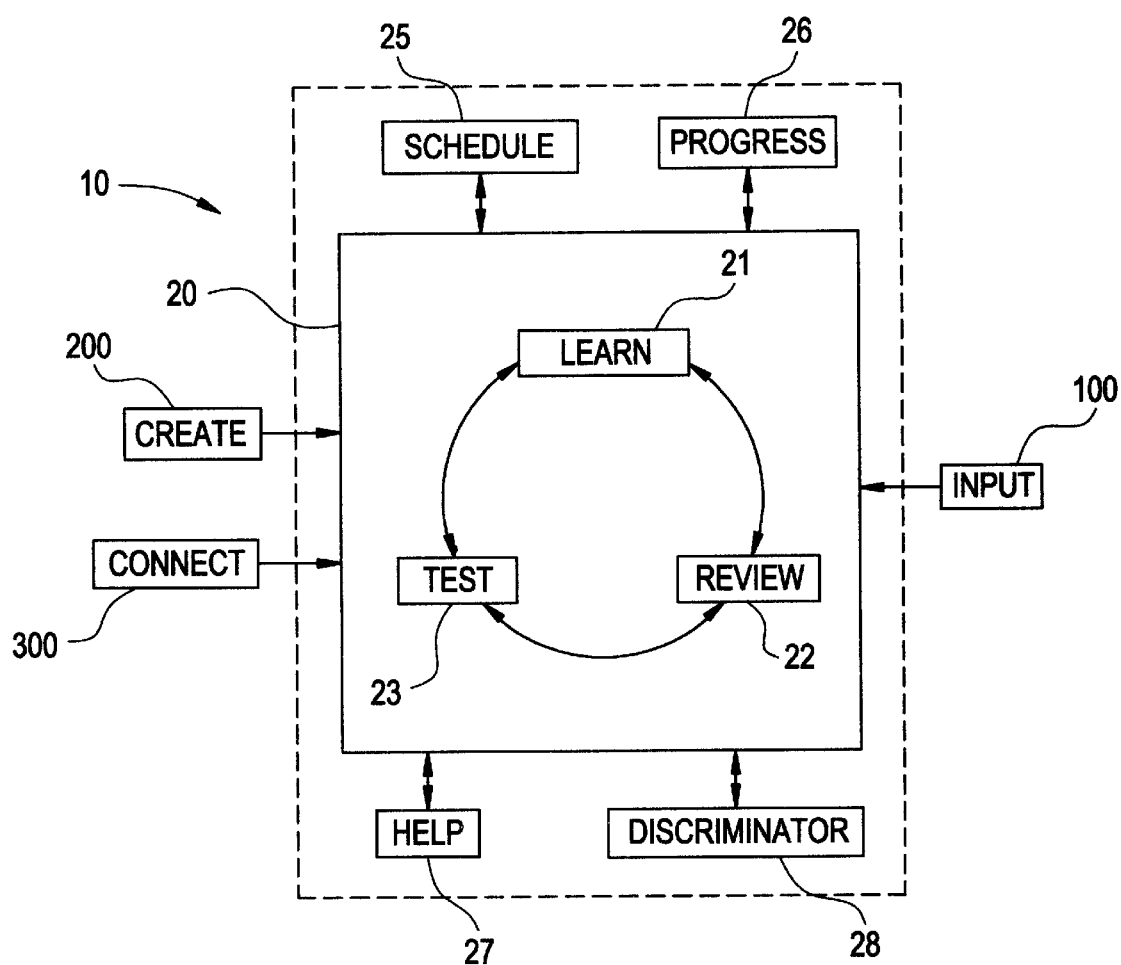
FIG. 1 is a schematic view of a system for learning, reviewing and testing knowledge or skills according to a preferred embodiment of the present invention.

Hereinbelow, a plurality of preferred embodiments of the present invention are explained referring to the several drawings. Hereinafter, like reference numerals indicate identical or corresponding elements throughout several views.

FIG. 1 shows in a schematic form a system 10 according to a preferred embodiment of the present invention. The system 10 is arranged and operative to maximize the effectiveness and efficiency of learning, retaining and retrieving knowledge and skills. Knowledge in this system 10 preferably refers to declarative knowledge such as the knowledge of factual information. Skills in this system 10 preferably refers to procedural knowledge such as the knowledge of how to perform a task. Of course, other types of knowledge can be readily adapted for use in the system 10.

The system 10 preferably includes a main engine 20. The main engine 20 preferably includes a Learn Module 21, a Review Module 22 and a Test Module 23. The Learn Module 21 is adapted to encode knowledge or skills via a process for creating a memory record. The Review Module 22 is adapted to store knowledge or skills via a process of maintaining a memory record over time through rehearsal. The Test Module 23 is adapted to retrieve knowledge or skills via a process of producing a response to a presented cue automatically or through active recall.

The Learn Module 21, the Review Module 22 and the Test Module 23 preferably operate together and interact with each other to improve the learning, memory and performance of a user of the system 10. To this end, the cooperation between the Learn Module 21, the Review Module 22 and the Test Module 23 allows a user to learn via a process by which relatively permanent changes occur in the behavioral potential as a result of interaction of these modules, to achieve memory for each item which is the relatively permanent record of the experience that underlies the learning, and to achieve high levels of performance including various observable qualities of learning.

As shown in FIG. 1, the Learn Module 21, the Review Module 22 and the Test Module 23 are preferably interactive with each other as shown by the arrows connecting adjacent ones of the modules 21–23. As will be described in more detail below, the three modules 21–23 are preferably arranged such that the future operation of each of the modules 21–23 is based on the past performance in each of the other modules.

The system 10 and the methods thereof can be implemented on any platform and with any type of system including a paper-based system, a computer-based system, a human-based system, and on any system that presents information to a person or organism, for learning and future retrieval of that information. For example, the system 10 may be a non-processor based system including but not limited to audio tapes, video tapes, paper-based systems such as a word-a-day calendar described later with respect to FIGS. 52 and 53, learning books such as workbooks, a processor-based system, such as that shown in FIGS. 29–51, in which the main engine 22 is implemented in a processor, microprocessor, central processing unit (CPU), or other system in which functions are executed via processing of machine readable code, computer software, computer executable code or a signal carrier wave transmitted via the Internet.

As will be described in more detail below, the main engine 20 may also include a Schedule Module 25, a Progress Module 26, a Help Module 27 and a Discriminator Module 28.

The system 10 may also be adapted to interact with various elements or modules external to the system, such as an Input Module 100, a Create Module 200 and a Connect Module 300 shown in FIG. 1.

It should be noted that the modules 21, 22, 23, 25, 26, 27, 28, 100, 200, 300 and other modules described herein are preferably processes or algorithms including a sequential series of steps to be performed. The steps may be performed via a plurality of different devices, apparatuses or systems. For example, the steps to be performed by the main engine 20 including modules 21, 22, 23, 25, 26, 27, 28 may be performed by various devices including as a computer, any type of processor, a central processing unit (CPU), a personal digital assistant, a hand-held electronic device, a telephone including a cellular telephone, digital data/information transmission device or other device which performs the steps via processing of instructions embodied in machine readable code or computer executable code such as computer software.

Each of the modules external to the main engine 20 will be described and then each of the module s of the main engine 20 will be described.

The processes or steps to be performed by the Input Module 100, the Create Module 200 and the Connect Module 300 may be performed by various devices including a keyboard, microphone, mouse, touchscreen, musical keyboard or other musical instrument, telephone, Internet or other suitable information transmitting device.

The Input Module 100 may be adapted to receive information that is transmitted overtly or covertly from the user. The Input Module 100 can also be used by an administrator of the system such as a teacher. The Input Module 100 can also receive input information from objects or any other source of information existing in the real world. The Input Module 100 is configured to allow a user, administrator, or other party or source of information to input any information that may affect operation of the modules of the main engine 20 or other modules in the system 10. Such input information may include information about which of the main engine modules is desired to be operated, changes in scheduling of learning, reviewing or testing, user performance with the system 10, the type and difficulty of the items to be learned, reviewed and tested, real world feed back which affect the learning, reviewing and testing, and any other information that is relevant to the overall operation of the system 10 and the modules contained in the main engine 20 and outside of the main engine.

Furthermore, the Input Module 100 can be configured to receive information as to the performance of the user of the system 10 through quantitative measurements such as time required to input various responses requested, ability of user to meet and adhere to schedule set up by the system 10, and the user's level of interest and arousal in learning which can be measured by such physiological characteristics as perspiration, pupil diameter, respiration, and other physiological reactions.

As will be described in more detail below, the system 10 accepts and obtains various input information through the Input Module 100 and the future operation of the various modules of the system 10 modified based on this input information. In this way, the system is adaptive to the user's abilities and performance, and other input information so as to constantly and continuously adapt to provide maximum effectiveness and efficiency of learning, retaining and retrieving of knowledge or skills.

The manner in which the information is input to the system 10 via the Input Module 100 is not limited, and may include any information transmission methods, processes, apparatuses and systems. Examples of input devices and processes include electronic data transmission and interchange via computer processors, the Internet, optical scanning, auditory input, graphical input, kinesthetic input and other known information transmission methods and devices.

The Create Module 200 may be provided outside of, but operatively connected to, the main engine 10 to allow for input of knowledge or skills to be learned, retained, and retrieved. The Create Module 200 thus enables a user, administrator or other party to create new customized lessons by inputting items to be learned and by providing additional information about each item that will affect how each item or groups of items will be learned, reviewed and tested to maximize effectiveness and efficiency of the learning system 10.

The Connect Module 300 may be provided outside of, but operatively connected to, the main engine 20 so as to connect all types of external systems and devices such as computers, the Internet, personal digital assistants, telephones, and other communication or information transmission apparatuses, to be connected to the main engine 10. In fact, the Connect Module 300 may be used for a variety of purposes including allowing any source of information to be input to the main engine, allowing multiple users to connect to and use the system 10 and the main engine 20 at the same time, and allowing a plurality of systems 10 or main engines 20 to be connected to each other so that systems 10 and main engines 20 can communicate and share information such as lessons to be learned, performance by an individual in any of the modules, changes in schedule and many other factors, data and information pertaining to operation of the system 10. Other suitable connections may also be achieved via the Connect Module 300.

The Help Module 27 may be provided to allow a user to obtain further instructions and information about how the system 10 works and the operation of each of the modules and functions thereof. The Help Module 27 may include a help assistant that interactively determines when a user is having problems in operating the system 10 and provides information and assistance to overcome such difficulty and make the system 10 easier to use. The Help Module 27 may provide visual, graphical, kinesthetic or other types of help information to the user, either in response to a request from the user or when the system 10 has detected that the user is having difficulty using the system 10. The Help Module 27 may also provide feedback, preferably through the Connect Module 300, to an administrator such as a teacher or some of other third party so as to indicate problems that various users of the system 10 are having.

The Progress Module 26, the Schedule Module 25 and the Discriminator Module 28 will be described after the Learn Module 21, the Review Module 22 and the Test Module 23 are described.

The arrangement and operation of the system 10 of FIG. 1 and all of the elements thereof are based on several scientific principles and phenomena which are related to learning systems having memory with a fixed storage space for storing knowledge or skills.

Figure 2:
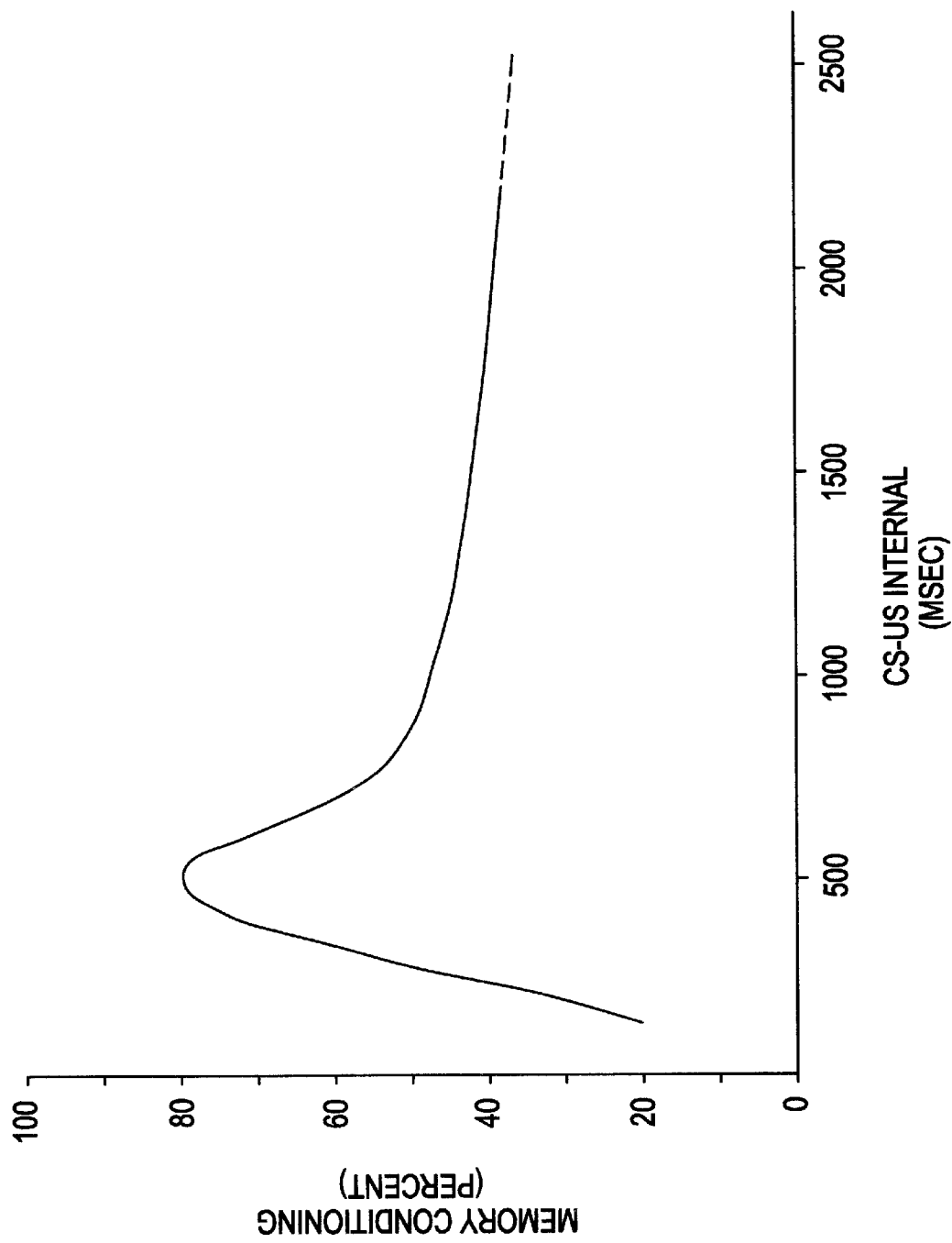
FIG. 2 is a graph of memory conditioning versus the CS-US interval related to preferred embodiments of the present invention.

FIG. 2 is a graph of the degree of memory conditioning versus the CS-US Interval which is a known characteristic of temporal aspects of classical conditioning. Classical conditioning is the procedure in which an organism comes to display a conditioned response to a neutral conditioned stimulus that has been paired with a biologically significant unconditioned stimulus that evoked an unconditioned response. For example, in the well known experiment by Pavlov, a dog comes to display the conditioned response of salivating upon hearing a bell. In this example, the ringing of the bell is the neutral conditioned stimulus which is paired with the biologically significant unconditioned stimulus of presentation of food which causes the biological reaction of the dog salivating.

Similar biological principles apply to operant conditioning or instrumental conditioning which is the procedure in which a particular stimulus condition occurs and if an organism voluntarily emits a response to the stimulus, then a particular reinforcer will occur. For example, a student wishes to learn that the Spanish word for dog is "perro." The stimulus can be thought of as "dog" and the response "perro", and the reinforcer may be the teacher's approval.

As seen in FIG. 2, ideally, when information is initially encoded, or is strengthened through reviewing or testing, a cue is presented and a response is actively recalled. It is this process of active recall that strengthens memories. One critical aspect of the process of achieving active recall of knowledge or skills is the timing of the presentation of the cue and the presentation of the response. FIG. 2 shows that maximum conditioning occurs when the response follows the cue by about 250 milliseconds to about 750 milliseconds.

While classical conditioning and operant conditioning have been used in the past for various training and teaching methods, these methods have not been quantitatively measured and then had the resulting quantitative measurements used to modify various timing parameters and steps of a learning process as in preferred embodiments of the present invention as will be described later with respect to FIGS. 7–13. One of the advantageous results of this novel process is maximizing the effectiveness and efficiency of encoding for retrieval such that a paired-associate or item to be learned is encoded to a level of automaticity and can be recalled automatically with no significant cognitive effort being expended. A real world example of this novel process is in the advertising context in which a paired-associate might include "sneaker" as the cue and "Brand X sneakers" as the response. With the novel process of preferred embodiments of the present invention, the system adaptively and interactively encodes for retrieval such that when a consumer is presented, in any form, with the cue "sneaker", the consumer automatically thinks of the response "Brand X sneakers."

As will be described below in preferred embodiments of the present invention, the presentation of cues and responses in the Learn Module 21, the Review Module 22 and the Test Module 23 interactively adapts the CS-US interval shown in FIG. 2 based on various factors such as the type and difficulty of the knowledge or skills, the user's performance in each of the modules of the system 10, the measured arousal and attention of the user, the measured confidence of the user in responding to the presentation of cues and responses and providing responses to cues, the number of times a paired-associated has been seen by a user to take into account the effects of habituation and sensitization, the user's feeling of knowing and judgement of knowing as quantitatively rated by the user, the measured latency of response of the user, the measured memory strength for a particular item, the measured probability of recall and user's performance, and many other quantitatively measured factors and effects.

Figure 3:
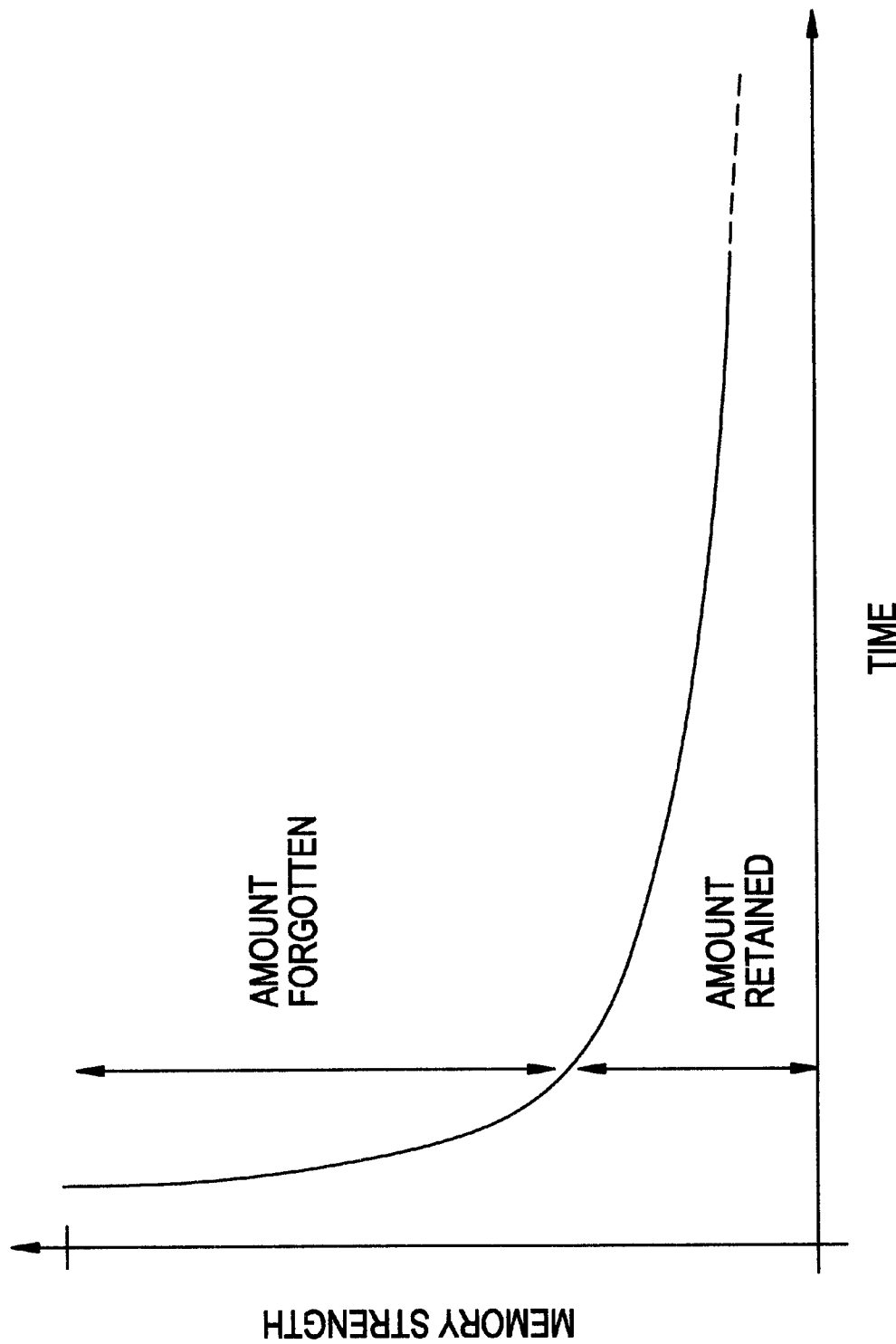
FIG. 3 is a graph showing memory strength versus time indicative of the forgetting/retention function related to preferred embodiments of the present invention.

FIG. 3 shows a graph of memory strength versus time which indicates how human memory decays over time which is an important phenomenon in a learning system. The graph of FIG. 3 is often referred to as the forgetting function because the vertical distance between the curve and the horizontal line marking the maximum memory strength represents the amount of previously learned material that has been forgotten. Conversely, the graph of FIG. 3 is also referred to as the retention function because the vertical distance between the curve and horizontal line marking the minimum memory strength represents the amount of previously learned material that has been retained or remembered. As seen in FIG. 3, the curve is a negatively accelerated function which means that initially, material is forgotten quickly and over time, the rate at which material is forgotten slows. The curve shown in the graph of FIG. 3 is measured by a test of memory at a fixed degree of sensitivity.

Figure 4:
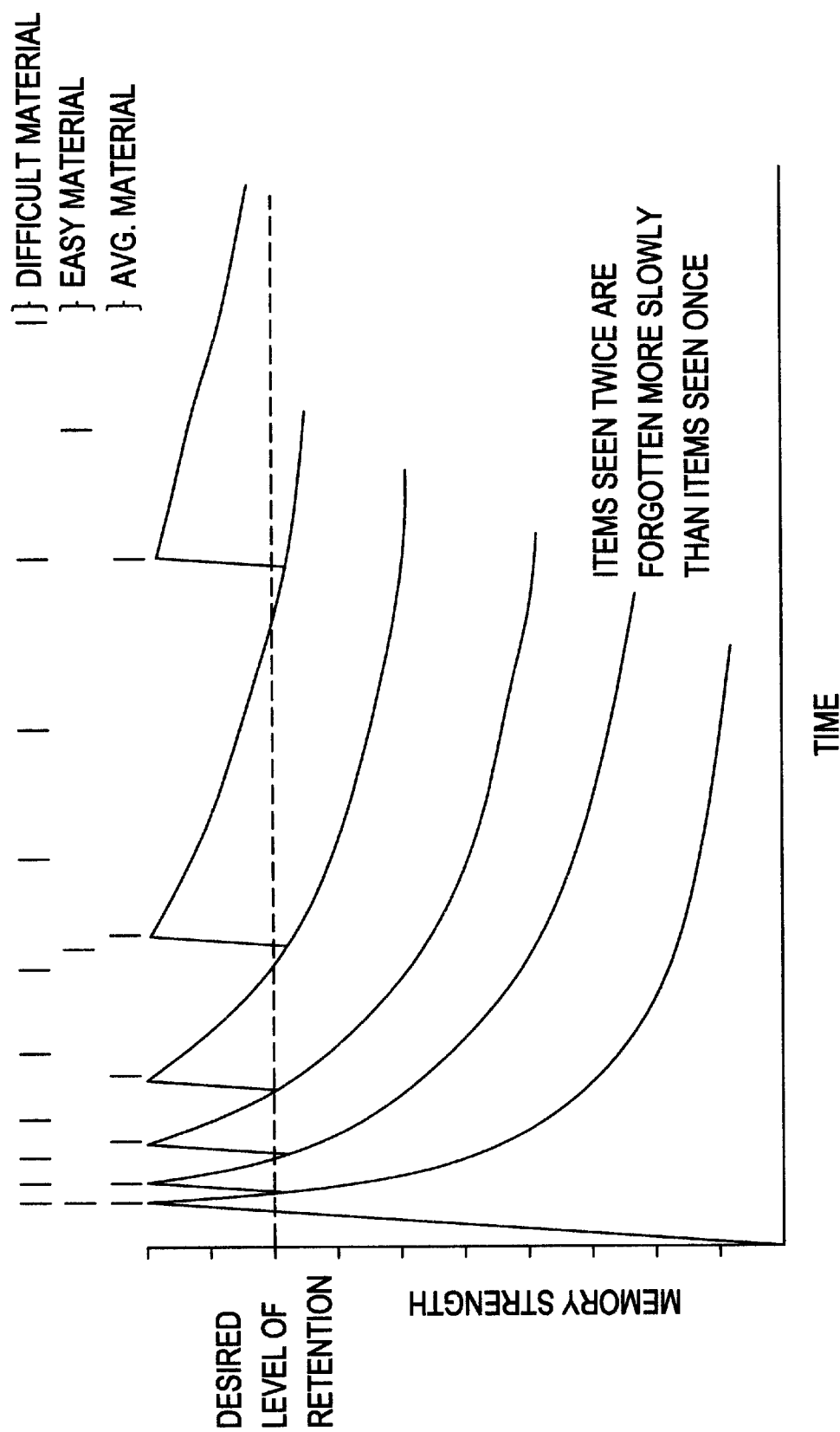
FIG. 4 is a graph of memory strength versus time showing an expanded rehearsal series used to maintain a desired level of retention in the system shown in FIG. 1.

FIG. 4 is a graph similar to FIG. 3. The axes of FIG. 4 are memory strength and time as in FIG. 3. Stating from t=0, the trace proceeds quickly to a local maximum, indicating the desired degree of initial learning of previously unlearned material. Following an initial learning session, the trace declines in the form of a negatively accelerated function indicating the normal loss of memory strength over time. It is desirable, however, to maintain a certain level of retention for learned material over some period of time.

Conventional methods of learning have recognized the effects of the decay of memory over time as shown in FIGS. 3 and 4 and have used an expanded rehearsal series, whereby items previously learned are later reviewed according to a schedule which is not modified and is identical for all items and individuals. The expanded rehearsal series shown in FIG. 4 is a random and crude attempt at minimizing the effects of forgetting due to the decay of memory over time.

In contrast to the conventional methods, preferred embodiments of the present invention quantitatively measure the memory strength for each item and for each user, since there are significant differences in memory strength over time for various types of knowledge or skills and for various users which have vast differences in how they encode, store and retrieve knowledge or skills, (i.e. dyslexic, learning disabled, low IQ, etc.). The memory strength over time is quantitatively measured using overt and covert information gathered during the user's operation and activity in the Learn Module 21, the Review Module 22 and the Test Module 23, as well as other modules. The information input to the system 10 to determine memory strength over time include, but are not limited to: rate of initial learning, degree of initial learning, probability of recall, latency of recall and savings in relearning. The quantitative measurement of the memory strength for each item is used to adaptively modify the operation of one or more of the Learn Module 21, the Review Module 22 and the Test Module 23, as well as other modules included in the system 10.

More specifically, the system 10 determines that the memory strength for a particular item has decreased to the minimum retention level by making calculated projections based on the mathematical characteristics of the decline of human memory, the type and difficulty of the item being learned, the recency, the frequency, the pattern of prior exposure, and the user's particular history of past use of the system 10. As can be seen in FIG. 4, items seen twice are forgotten more slowly than items seen once and furthermore, items seen three times are forgotten more slowly than items seen twice or once. This must be taken into account when making the calculated projections as to when the memory strength for each particular item will fall below the minimum retention level. The system 10 schedules the item for review in the Review Module 22 based on the calculated projections. The climb of the trace of FIG. 4 back to the local maximum memory strength indicates the change that occurs as a result of a review session in which a previously learned item is reviewed in the Review Module 22. Following the Review Module 22 session, the trace of memory strength of FIG. 4 declines once again in the form of a negatively accelerated function. This time, however, the curve function is more shallow than the forgetting curve following the initial learning session. The more shallow curve indicates that the item is forgotten more slowly for items seen twice than for items only seen once. Once again, when the system 10 has determined that the memory strength for each particular item has decreased to the minimum retention level, the system schedules the item for review. This process of forgetting and review continues for as long as the user or administrator desires the learned material to be retained to a desired level.

Because all learners are not alike, and not all items are equally easy to learn, to maintain in memory and to retrieve, the system 10 preferably constantly monitors the memory strength for each item for each learner to determine the most effective and efficient schedule of Review.

FIG. 4 illustrates the schedule of review for items that a model learner finds are of average difficulty. The small vertical hash marks above the curves in FIG. 4 indicate the end of each Review session. The spacing of the hash marks in FIG. 4 is indicative of an expanded rehearsal series. Above these hash marks are another series of hash marks which indicate the spacing of review sessions for items a model learner finds are easy to learn, to maintain in memory or to retrieve. Above these hash marks is a third set of hash marks which indicate the spacing of review sessions for items that are relatively difficult.

In the system 10 of preferred embodiments of the present invention, there is no single review schedule in the Review Module 22 that is the most effective and efficient to maintain a desired level of retention for each user for each item. Accordingly, the system 10 monitors the users as he learns, reviews and tests himself on each item. Based on measured quantitative results gathered overtly and covertly as described above, the system 10 quantitatively determines when the next review session must occur to maintain the desired level of retention. Thus, the system 10 is adapted to the individual needs of each user.

Eventually, review sessions are scheduled so far apart in time, that the item can be considered to have entered a state of permastore. That is, the item will have been learned and reviewed such that the item is known for the lifetime of the learner. Although memory strength will not decay to a point where the item is lost due to storage failure, the item may be forgotten as a result of low memory activation and the user may experience a retrieval failure. This problem can be reduced or eliminated by scheduling review sessions for particularly important items to maintain a minimum desired level of activation.

FIG. 5 illustrates the concept of Signal Detection Theory, a branch of psychophysics. Signal Detection Theory is based on the phenomenon that a living organism such as a human or other animal, perceives stimuli and makes decisions based upon those perceptions. This two-part process is integral to many memory related tasks and is quantitatively incorporated into the performance of various modules of the system 10 of a preferred embodiment of the present invention.

In FIG. 5, a target, or correct response to a cue, is perceived as differing in memory strength from a number of distracters. The user's ability to perceive the difference between the target and the distracter(s) is measured by d', also known as performance. In the signal detection paradigm, the user must be able to discriminate the target from the distracters. The criterion a user uses in making decisions about signal existence is known as Beta. If the user is extremely lax in their criteria for reporting, Beta shifts to the left of the graph of FIG. 5. If the user is extremely cautious in their criteria for reporting, Beta shifts to the right of the graph of FIG. 5.

FIG. 6 is related to FIG. 5 and shows a signal detection theory matrix. When there is overlap between the target and the distracters, the position of Beta on the graph of FIG. 5 creates a possibility of four outcomes. In memory experiments where a user is trying to retrieve a correct response to a presented cue, the user must select a response stored in his memory from a number of alternative incorrect responses and distracters. Four outcomes are possible in the simplest case: in the first case, the user believes that he has retrieved a response that is correct, and he turns out to indeed be correct—a correct recognition. In the second case, the user believes that he has identified an incorrect response, and he is correct in his assessment and reporting—a correct rejection. In the third case, the user believes that he has identified a correct response and reports it as such. Unfortunately, the chosen response is incorrect—a false alarm. In the fourth case, the user believes that he has identified an incorrect response and reports it as such, but it turns out that it was actually the correct response—a false rejection.

The system 10 according to preferred embodiments of the present invention monitors not only the correctness of the user's response but also the user's performance, which is the ability to evaluate accurately whether they know the correct response and the incorrect responses. The system 10 according to preferred embodiments of the present invention also measures the time required for the user to make such evaluation about the correct response and incorrect responses.

Instead of using the measured performance to generate sequences of perceived known and unknown items which is not done in any of the preferred embodiments of the present invention, the quantitatively measured performance is fed back and presented, either graphically, auditorily, kinesthetically, or otherwise, to the user, preferably along with the score of accuracy of recall, to provide information to the user about his metacognitive skills in this learning environment and other learning environments, enabling the user to improve how he monitors and controls how he learns and to become a better learner. Because a significant part of learning and retrieval is the ability to discriminate between correct and incorrect answers, the system 10 according to preferred embodiments of the present invention not only teaches the user knowledge or skills, but also trains the user to become a more effective learner by improving the metacognitive skills required for self-paced learning. These are skills necessary to monitor performance during learning, reviewing, and testing. Metacognitive skills include subjective measurements of feeling of knowing, confidence, and judgement of learning, which are measured quantitatively in preferred embodiments of the present invention and then used to modify the future use of the system 10 and the future operation of the various modules therein, including especially the Learn Module 21, the Review Module 22 and the Test Module 23.

For example, the system 10 of preferred embodiments of the present invention preferably uses the measured probability of recall, latency of response, and savings in relearning in the future operation of the Learn Module, the Review Module and the Test Module to further increase the effectiveness and efficiency of learning and performance achieved by the system of the present invention.

Each of the modules including the Learn module 21, the Review Module 22 and the Test Module 23 are preferably arranged and adapted to function either together with the other two of these three modules or to function independently as a stand-alone module.

In addition, other modules such as the Schedule Module 25, the Progress Module 26 and the Help Module 27 may be added to any combination of the Learn Module 21, the Review Module 22 or the Test Module 23 in a system.

It should be noted that each of the Learn Module 21, the Review Module 22 and the Test Module 23 contain many novel aspects, processes, elements and features thereof and can be used independently of the system shown in FIG. 1 and independently of the other modules of the main engine 20 and the system 10 shown in FIG. 1. The novel features of each of the Learn Module 21, the Review Module 22 and the Test Module 23 will be described now.

Now, each of the various modules will be described.

I. THE LEARN MODULE: The Learn or Encode Module 21 is used to present items to be learned to a user. Learning methods have been known such as the Skinner method described above. The method and system according to the preferred embodiments of the present invention is based on the Skinner method but is modified and greatly improved so as to be adaptive and interactive in response to various factors.

The Learn Module 21 uses the Skinner method of learning through presenting paired-associates of cues and responses. The timing, order of presentation and sequence of each cue and response for the Learn Module 21 is interactively determined based on covert and overt input from the user and may also may be based on information received from various other input sources. Such cover or overt input may relate to the content of knowledge or skills to be learned, timing of presentation of knowledge or skills to be learned including timing between each cue and response in each of the plurality of cue and response items, timing between presentation of groups of cue and response items (time between presentation of one cue and response pair and the next cue and response pair), sequence of presentation of knowledge or skills to be learned and the format of presentation of knowledge or skills to be learned and other factors.

The inputs upon which the presentation of the items in the Learn Module 21 may be from one or more of the user, the administrator, the system 10 including other modules included therein, and any other input source that is relevant to the learning process and operation of the Learn Module 21.

For example, other input sources could be sensed environmental conditions such as time of day. Time of day has an effect on learning for people of various ages and therefore may be input to change the presentation of items in the Learn Module 21. The inputs to the Learn Module 21 may further include various personal and physiological information such as age, gender, physiological activity such as galvanic skin response, information obtained through non-invasive monitoring of brain activity, and other personal factors.

The overt and covert inputs from the various input sources may include information concerning rate of presentation of items, format of presentation of items, sequence of presentation of items, and other information that would affect operation of the Learn Module 21. The method of inputting the overt information is based on a purposeful, conscious decision on the part of a user, administrator, or other source to input information to the system. In contrast, the covert information is input based on physiological information obtained by various sensors obtaining data regarding factors such as a galvanic skin response, pupil diameter, respiration, blood pressure, heart rate, brain activity, and other personal conditions. This information can be obtained by such known sensors including an electromyogram, electroencephalogram, thermometer, and electrocardiogram among others. The covert information is analyzed to determine many factors including a user's attention and vigilance so as to determine to what degree a user is attending to the presentation of information in the Learn Module 21.

The actual cue and response items may be modified in format according to the desires of a user, administrator or based on other input information. In addition, the cue and response items may be supplemented by information such as a facility for pronunciation hints, and other helpful facts or information related to the items being presented for learning in the Learn Module 21. Such additional related information is not part of the cue and response items but is presented with the cue and response items to assist in the learning process.

In addition, items to be learned in the Learn Module 21 may be confusable items and may be presented differently from other items to be learned. This process will be described in more detail in the description of the Discriminator Module 28 below.

The Learn Module 21 operates and is controlled based on many factors including desired degree of initial learning and desired degree of retention over time. A desired degree of initial learning may be input by a user, administrator, or other input source to indicate what degree of memory strength is desired for each item or group of items to be learned. The desired degree of retention is based on the rate of forgetting predicted (FIGS. 3 and 4) and measured by probability of recall, latency of recall, savings in relearning, and other factors, in Review and Test sessions conducted over time.

As a general rule, the system, apparatus, and method of preferred embodiments of the present invention seek to provide a level of retrieval that is known as automaticity. Automaticity means that a person knows the knowledge or skills and does not have to expend great effort to remember it. Automaticity decreases the latency of response as well as the cognitive workload during retrieval.

Therefore, the preferred embodiments of the present invention perform encoding for automaticity to achieve "knowing rather remembering." The prior art assumes mastery is achieved at the time that the first correct answer is provided on a test of recall. Recall, however, is not automaticity. Automaticity can be distinguished from recall because it allows extremely fast retrieval of knowledge or skills. The difference between automaticity and recall is latency of response or how long it takes to respond to a cue or perform a desired skill. Also, simple recall requires relatively more cognitive effort on the part of the person responding to the cue or performing the skill, but automaticity requires far less cognitive effort thereby reducing overall cognitive workload. The net result is that knowledge or skills encoded, retained and retrieved using the method are retrieved quickly and effortlessly.

In order to reduce cognitive workload during learning and thereby reduce fatigue, the pattern, sequence and timing of presentation of items is continuously adjusted in the Learn Module 21 based oh quantitative inputs thereto. Items to be learned are preferably presented one item at a time to avoid requiring the user to retain multiple items in short term memory. In addition, the pattern, sequence and timing of items to be learned is determined by the system 10 and therefore, the cognitive effort required for monitoring and controlling the study session is reduced so that a person can learn for a longer period of time and is not distracted from the learning process.

The Learn Module 21 also operates to capture and maintain the user's attention based on psychological phenomenon of habituation and sensitization. One example of sensitization is a person becoming aware of something, such as the sound of a car alarm, which initially captures that person's attention. However, if that stimuli repeats itself over and over, the person becomes oblivious or habituated to it—their brain tunes it out. Accordingly, the presentation pattern, sequence, or timing of items to be learned may be preferably varied so as to vary stimulation in such a way as to avoid habituation or the disengagement from attending to this particular stimuli. The difficulty is that this variation in the above-identified factors should not be done overtly but should be done in a manner that is not so obvious that it becomes a distraction in and of itself, but rather should be done in a more subtle manner, using variations in the presentation pattern, sequence, and timing at the "just noticeable difference" threshold whereby a person notices unconsciously but not actually consciously. In a preferred embodiment of the Learn Module 21, attention that is declining is recaptured through various means such as the use of obligatory attention cues and then by varying the presentation pattern, sequence, and timing of the items presented.

Obligatory attention cues include such sensory events as a blinking light, a tone, object movement or other stimulation that attracts the attention of the user.

In addition, the serial position affect is preferably taken into consideration in the Learn Module 21 and the presentation of items to be learned in the Learn Module 21 is changed in order to eliminate the serial position effect. Providing a non-serial presentation to avoid the serial position effect may be accomplished by reordering the presentation of the cue and response items. For example, the non-serial presentation of items in the Learn Module 21 can be achieved by spacing apart unknown items to be learned by inserting between the unknown items, a number of items which are randomly selected from a pool of previously learned items.

The Learn Module 21 takes advantage of the psychological phenomenon known as the spacing effect. The spacing effect states that for an equal number of presentations of an item to be learned, distributing the presentations over time yields significantly greater long-term retention than does massed presentations. Furthermore, the spacing of presentations in the Learn Module 21 preferably takes the form of an expanded rehearsal series where items are reviewed at increasingly longer intervals for the greatest effectiveness and efficiency of learning.

Also, the sequence in which the cue and response items are presented in the Learn Module 21 may be changed to present more difficult items more times than easier items allowing the user to concentrate their effort where it is most needed.

The Learn Module 21 is preferably designed to promote self-motivated learning. One factor in motivating learning is the rate of success and failure. Too much success or failure is not motivating to a person seeking to learn. Thus, the Learn Module 21 maintains a challenging learning environment by sequencing the presentation of paired-associate items to balance items that a user is successful at providing a correct response to with items the user is less successful at providing a correct response to.

The Learn Module 21 also takes into consideration a physiological phenomenon known as consolidation in the presentation of items to be learned. Consolidation is the period of time immediately following learning where memories are most vulnerable to loss due to decay and interference. In first stage of memory formation, process oriented changes take place at the cellular level of the brain resulting in short term memory. During consolidation, additional changes occur and result in actual structural modifications in the brain. This is prerequisite for long term memory formation. Taking this into consideration, the Learn Module 21 presents items as many times as is necessary to achieve the desired degree of overlearning. In contrast, in the prior art, learning is judged to be completed when the user is able to recall the correct response to a cue the first time. Overlearning suggests that the user can derive additional benefit from continuing to study an item learned to this level. One measure of overlearning is latency of recall. An item that is overlearned will be recalled not only correctly, but also quickly, indicating automaticity. Overlearning, however, is subject to the law of diminishing returns, which means that at some point the effort expended does not provide a justifiable benefit. Overlearning in the Learn Module 21 reduces the likelihood that memories will be lost during consolidation and that if no review were to follow, the likelihood of successful retrieval at some future date would be higher than if the items were not overlearned, as shown in FIG. 15, which will be described in more detail below.

As will be described in more detail below, all of the modules of the main engine 20 are preferably adapted to enable users to become better learners by training them to make more accurate metacognitive judgements. Judgment of learning, for instance, is a subjective evaluation made after a learning session in which a person judges whether an item was learned or not learned. In self-paced study, the decision as to whether to continue studying a particular item is often made based on the user's judgement of learning of that item. An inaccurate judgement will lead to either too much time, or too little time spent on an item resulting in less effective and efficient learning than would otherwise be possible if an accurate judgement were made.

In addition, in the Learn Module 21, it is preferable to provide a preview of knowledge or skills to be learned. In the preview, a background description or related information is provided before the actual cue and response items to be learned are presented. Such background information can include general information about a topic that is the subject of the cue and response items so as to provide some basis or context for learning, or what a user should keep in mind while learning, hints about the upcoming lesson itself or any other relevant information. The preview information can be text-based, graphics-based, auditory, or any other format. In addition, the preview can teach a user how to learn more effectively and efficiently before he learns, for example, by providing learning tools (pronunciation hints, study tips, what to pay attention to, etc.).

The Learn Module 21 preferably includes a Quick Review, which is presented at the end of lesson. Quick Review provides the user one or more opportunities to review difficult or unlearned items before that particular session of the Learn Module 21 is completed. Quick Review preferably reorders the presentation of items so as to eliminate the serial position effects of primary, recency, Von Restorff and other well known effects. In addition, it is possible in Quick Review to rearrange the cue and response items such that for each item, the cue becomes response and the response becomes the cue.

Preferably, items presented during Quick Review are sorted using the drop-out method. That is, if the user quickly indicates he is able to retrieve a correct response to presented cue, as measured by accuracy of recall and latency of response, the item is dropped out of the list of items being presented because the item is determined to be well known. The remaining items are then re-ordered and lesser known items are presented again. This continues until no items remain, or until some other criteria is met such as the completion of four rounds of Quick Review.

The re-ordering done during Quick Review is preferably based on an inside-out ordering to reduce the serial position effect. Primacy and recency effects cause items presented first and last to be learned better than items in the middle of the sequence. By turning the sequence inside-out in terms of presentation, the effects of primacy and recency are minimized ensuring that items originally presented in the middle of the sequence are learned to the level of items originally presented at the beginning or end of the sequence.

In the Learn Module 21, the ease of initial learning of each item can be determined by analyzing the drop-out scores. This is done by measuring how many times an item was presented and determining from this the relative difficulty of learning each item. This information is then used to place the item on the appropriate review curve (described later) which determines the initial schedule of review.

The Learn Module 21 is preferably interactive with the Review Module 22 and Test Module 23. More specifically, the ease of initial learning in the Learn Module 21 as described above is used to determine how to present items in the Review Module 22.

More specifically, preferred embodiments of the present invention use hopping tables, prediction curves and other mathematical correlations to accurately control interaction between the modules of the main engine 20. For example, a Learn hopping table is preferably provided and used to determine the initial schedule of presentation of items in the Review Module 22. Using the Learn hopping table, if an item was presented once in Quick Review, it is placed on an easy curve—one which schedules the review relatively infrequently. If an item was presented twice in Quick Review, it is placed on a medium curve. If an item was presented three times in Quick Review, it is placed on a hard curve—one which schedules review frequently. As will be described below, as a user begins reviewing the learned items using the Review Module 22, items will hop from curve to curve; the curves determine the items to present during each review session of the Review Module 22. The Review Module 22 has a hopping detect function which feeds back into a rule set used to determine which review curve the item is on and is used to reconfigure the hopping table rules in the Learn Module 21 for improving the effectiveness and efficiency of learning, reviewing, and testing in the future.

Figure 25:
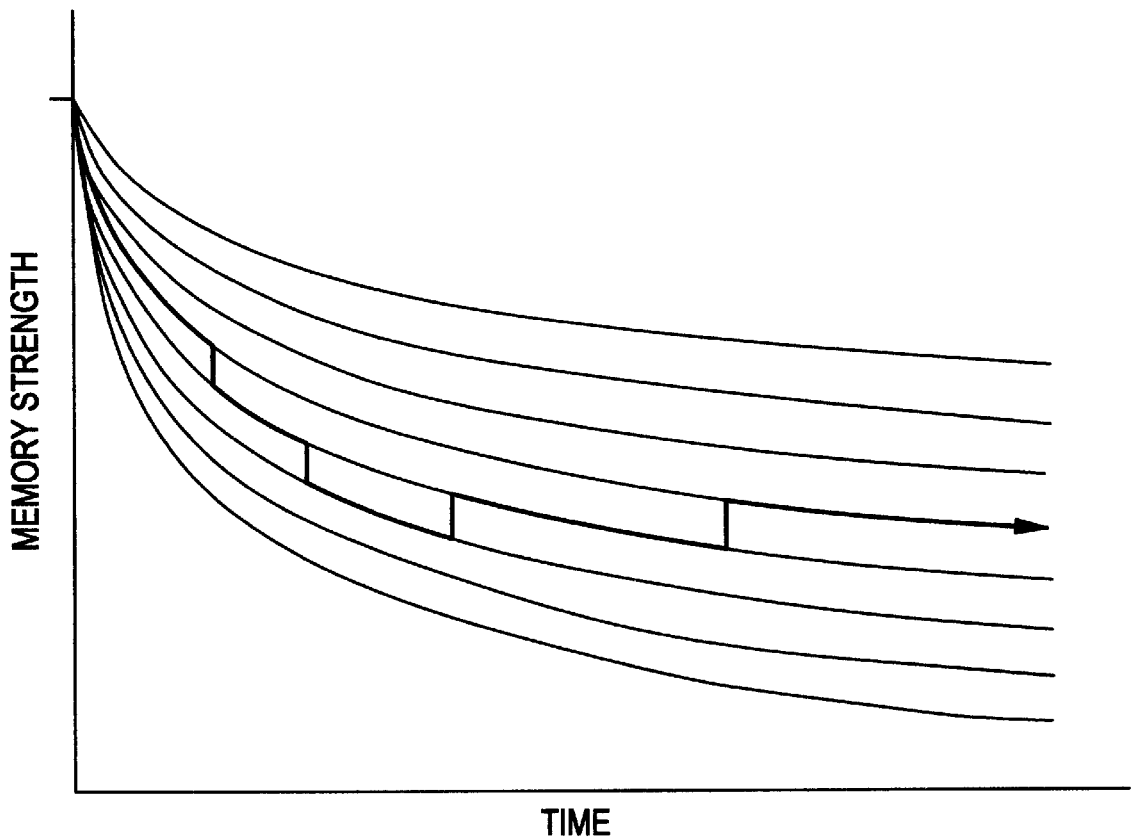
FIG. 25 is a graph of memory strength versus time which includes a family of review curves for illustrating hopping between review curves.

Since human memory decays differently for words, pictures, sounds, smells, skills and other types of information and depends on degree of difficulty in learning, retaining, and retrieving items, it is preferable to modify the curves to reduce hopping to more efficiently predict the decline of memory strength as a result of decay and interference. A plurality of families of curves may be used and arranged according to the characteristics of the curves. Such hopping tables and families of curves for review are shown in FIGS. 24 and 25 and will be described later. There are preferably several sets of hopping rules associated with each curve. The system 10 determines how many times an item has hopped between curves and will determine which curve included in which curve family minimizes hopping because too much hopping indicates poor prediction of decline of memory strength for that user and that item.

The function of the system 10 relating to the hopping rules and curves depends on the rate or level of retention chosen by the user or administrator. Different families of curves may be better at predicting items based on primary sensory modality or other factors. Also, the curves or families of curves may be chosen for use based on subject matter of content, gender, age, or each individual user since information about each user may be made available each time the system starts up. This information about how the user learns is then used by the system in each of the Learn Module 21, the Review Module 22, and Test Module 23.

With such data, it is possible to determine which items are more difficult to learn, retain and retrieve than other items based on data from many other users and to share that data with each specific user so as to affect how the Learn Module 21, the Review Module 22 and the Test Module 23 perform for that user.

II. THE REVIEW/STORE MODULE: The Review Module 22 preferably includes many different types of review formats including Normal Review, Ad Hoc Review, and Scheduled Review.

In a preferred method of the Normal Review of the Review Module 22, after a lesson has been presented by the Learn Module 21 and has been learned by a user, the system 10 prompts the user to indicate whether the lesson is to be reviewed in the future. If so, the system 10 places the lesson on a review schedule of the Review Module 22 for maintaining default retention rate for an indefinite period of time. If not, then no review schedule is created for that lesson. The user or administrator may change from "never reviewed" to "indefinite review," or vice versa, at any time in the future. The user or administrator may also change the retention level from the default level to any other level at any time in the future for lessons or individual items.

The Schedule Module 25 schedules the appropriate time of learning, reviewing and testing of items based on a previously input desired date of completion as well as many other factors. The desired date of completion is the date by which the user desires all of the items to be known to a predetermined level of memory strength and activation, preferably to a level of automaticity. At the appropriate times, the system will indicate that the items scheduled for review are due to be reviewed and review proceeds as will be described below in more detail.

Scheduled Review of the Schedule Module 22 takes into account problems such as items learned later in the schedule have relatively higher activation and relatively lower strength than items learned early in the schedule which have relatively higher strength and relatively lower activation. Items that are more difficult to learn may be scheduled to be learned early in the overall schedule to provide them with the greatest number of review sessions to develop the desired degree of memory strength.

With Ad Hoc Review of the Review Module 22, a user can select a particular item or group of items to be reviewed at that moment. If the user conducts this review on an ad hoc basis instead of waiting for the review of the item or group of items scheduled for Normal Review, feedback based on Ad Hoc Review performance is used by the system 10 to reschedule future Normal Review, Scheduled Review and testing of this item in the Test Module 23.

Scheduled Review of the Review Module 22 arranges the presentation of items to be reviewed so as to increase memory strength of items learned later in the schedule and increase memory activation of items learned early in the schedule just prior to the date when the knowledge or skills are required.

Other factors which might be used by Scheduled Review of the Review Module. 22 to arrange presentation of items for review may include degree of difficulty, degree of importance, strength, activation and how user has interacted with the system 10 in the past.

In addition, Scheduled Review and Normal Review of the Review Module 22 preferably take into account graceful degradation and workload smoothing when arranging the presentation of items to be reviewed. Graceful degradation and workload smoothing are used if a schedule originally set is altered, for example, by a user missing a review session or moving ahead of the schedule set forth by the Review Module 22.

Because learning, reviewing and testing will be less effective and less efficient if a user simply doubles up on items to be learned, reviewed or tested because the user has missed a scheduled session, the system re-schedules Normal and Scheduled Review by re-ranking all items which still must be reviewed according to item importance, strength, activation, and other factors. This re-ordering can be done preferably using an Nth degree polynomial smoothing function. This re-ordering can also be conducted if the user, administrator, or system determines that the workload of any particular session is significantly greater or less than the sessions before or after it. It is desirable that the workload from session to session be as equal and uniform as possible to maintain the user's motivation, and to ensure the most effective and efficient learning, review and retrieval of knowledge and skills.

In each of Normal Review, Ad Hoc Review and Scheduled Review of the Review Module 22, items are presented for review in a manner that is similar to the presentation of items in the Learn Module 21 to the extent that latency of recall is measured and calculated. Based on the measured latency of recall and the user's quantitative judgement of the adequacy of his response to the presented cue, an item to be reviewed will either be maintained in the presentation group or dropped out of the review group in the Review Module 22. The process of sorting items continues until all items are reviewed to a level that is desired.

The time between presentation of a cue and presentation of a response in the Review Module 22 is preferably controlled according to user input, position of item within sequence of items to be reviewed, primary sensory modality, and other factors such as covert data taken from user, such as galvanic skin response, pupil diameter, blink rate etc. and other measured characteristics. The system, method and apparatus of preferred embodiments of the present invention also control the time between the presentation of one cue and one response pair and the next cue and response pair.

In addition, the presentation of each cue and response pair in the Review Module 22 relative to other cue and response pairs is controlled according to timing, sequence, and format of material to be presented. All of these factors vary over time based on user input, both overt and covert, to determine which items will be presented, as well as the sequence, pattern and timing of presentation.

III. THE TEST MODULE: The Test Module 23 preferably includes several different types of tests of varying sensitivity including a test of familiarity, a test of recognition, a test of recall, and a test of automaticity. Through testing and the use of different types of tests in the Test Module 23, the system can determine whether an item is known to a user and to what degree an item is known (familiarity, recognition, recall, automaticity).

In the prior art, a typical test is a test of recall in which latency of response is not measured and is unimportant. In contrast, in the present preferred embodiment, latency of response is important and is measured and used to modify future operations of the various modules of the system 10.

The preferred test format is to use an alternative forced-choice test, preferably a five alternative forced-choice test in which a user must select one of the five alternatives presented in response to a presented cue. Although a five alternative forced-choice test is preferred, it is possible to change the number of forced-choice responses and type of test according to various factors such as what level of memory strength is being measured or for what purpose the test is being presented.

The Test Module 23 is important not only as a traditional measure of knowledge or measure of memory strength, but also because the testing in the Test Module 23 functions as another form of review. Test taking is another way for the user to learn, review, and to maintain motivation and interest in using the system 10.

In a preferred embodiment of the Test Module 23, an item to be tested is presented. First the cue is presented along with a question, "Do you know the answer?". The user constructs a response, and then indicates his quantitative "feeling of knowing" by choosing one of a plurality of choices. In the preferred embodiment of the Test Module 23, a scale from 1 to 5 is presented, whereby 1 indicates that the user has no idea of the correct response and 5 indicates that the user is absolutely certain that he knows what the correct response is. Scores of 2, 3, and 4 are gradated between these two extremes. The time period from the presentation of the scale of 1 to 5 until the time that the user makes his choice is measured.

Then a plurality of forced-choice responses (preferably five) are presented for the user to choose from. Only one of the presented responses is the correct response. The time period from the presentation of the plurality of responses to the time when the user selects a response is measured.

This time period is referred to as a measurement of latency of response. However, absolute latency is not an accurate indicator of the cognitive functioning of the user. Instead, relative latency is measured for each user by taking into account many difference latency periods, the order of presentation of alternative responses, the primary sensor modality of the items and other factors.

After the user has selected one of the alternative choices as his response, the user is required to rate his response by choosing one of a plurality of choices in response to a question "How confident are you in your response?" The time between the presentation of this question and the user's response is measured. The incorrect responses are removed from the screen, leaving the correct response and the cue displayed. If the correct response was selected, the cue and response remain for a period of time which is shorter than the period of time in which the cue and response remain if the user chose the incorrect response.

In addition to knowing whether a response was correct or incorrect, the user is provided with information about their metacognitive judgements of "feeling of knowing" and "confidence of response." This information about metacognitive performance is only used to assist the user in improving his metacognitive abilities thus improving self-paced study skills and thereby making the user a better learner.

According to preferred embodiments of the present invention, items to be learned, reviewed or tested are presented in a sequence which is not determined by the user's metacognitive performance and perceived knowledge of those items, as is done in some conventional methods. That is, the sequence of the items in each group are presented to the user in each of the Learn Module 21, the Review Module and the Test Module 23 without ever querying the user as to whether the user thinks or perceives he knows the correct response or answer. Thus, the items to be learned, reviewed and tested are presented based on the predetermined grouping and sequencing of those items and the grouping and sequencing is not based on the user's perception as to whether the items are known or unknown.

It is preferred that the conditions of retrieval in the Test Module 23 most closely model the actual real world test or retrieval situations which the user is preparing for. Thus, the Test Module 23 is preferably configured to the form of the actual anticipated test or retrieval situations to enhance the retrieval practice effect. The act of retrieving an item from memory facilitates subsequent retrieval access of that item. The act of retrieval does not simply strengthen an item's representation in memory, it also enhances the retrieval process.

In terms of the presentation or sequence of items in the Test Module 23, it is preferred that the presentation of test items is based so as to reduce the process of elimination effect. This effect describes a method used by students to "learn" information early in a test that assists them in responding to items later in the test. In order to reduce or eliminate this effect, the most difficult and confusable items, for instance, are presented early in the test in the Test Module 23. Ordering of items is preferably based on difficulty, confusability and other suitable factors in the Test Module 23.

The measurements of latency of response for the feeling of knowing judgements and the confidence in response judgements, not the actual scores of feeling of knowing and confidence of response, are used for scheduling future learn, review and test activities in the Learn Module 21 and the Review Module 22.

The Test Module 23 is preferably adapted to modify or normalize the feeling of knowing and confidence of response choices. If a user selects only 3s, 4s and 5s, for instance, the system 10 will normalize such responses into a 1, 2, 3, 4, 5 scale. The absolute judgement is important, however, and valuable information can be obtained by measuring and calculating the relative values of the judgements as well.

For the review of missed items presented in the Test Module 23, the sequence is determined by the relative degree of difficulty of items. Degree of difficulty is determined by the correctness of the user's response, the latency of response in providing feeling of knowing and confidence of response judgements and is not based on the actual scores of feeling of knowing and confidence of response. Ordering the sequence of missed items on this basis creates higher memory strengths of items missed in the testing.

The system 10 can determine the user's motivation by monitoring the user's performance data in the Learn Module 21, the Review Module 22 and the Test Module 23, as well as system usage including a user's ability to adhere to a set schedule, how many sessions or days a user has missed, and other factors.

Based on relative motivation, determined as described above, the Test Module 23 preferably selects an item to be tested so as to increase a user's motivation and confidence. The Test Module 23 is also arranged to allow for use of testing as a form of motivation, to break up monotony, and to use test as form of review.

The date of tests in the Test Module 23, including using testing as a form of review, can be determined by the user, the system 10, the administrator, or other input sources. For example, a teacher may want to use a test in the Test Module 23 as a form of review when an actual classroom test will occur soon.

Test as a form of review is preferably done when the strength of items is relatively high and the activation is relatively low. A test as a form of review breaks up monotony, maintains a review schedule, allows a different form of retrieval practice, closely mirrors the conditions of an actual test, and may have a motivational influence. In addition, the scheduling of testing in the Test Module 23 as a form of review may be influenced by a user's performance in the Learn Module 21 or the Review Module 22. For example, if the user's performance in the Learn Module 21 and the Review Module 22 are less than desired, a test may be scheduled as an alternative form of review and also to increase motivation.

In addition, in the Test Module 23, the user, the administrator or the system can determine when a test should be administered. The Test Module 23 preferably takes into account all testing factors like time of day, gender, age, other personal factors including physiological measures, measures of attentiveness or other brain states and other environmental conditions. The Test Module 23 also takes into account the material to be tested, its difficulty, and other factors such as recency, frequency and pattern of prior exposure to material in the past.

After testing in the Test Module 23 further review and testing may be scheduled based on the performance in the Test Module 23. For example, items that were determined to be well known are tested and reviewed less in the future. Further, the system changes hopping tables for items to be reviewed and tested in the future based on latency of response, actual knowledge and other factors observed during the test.

Many different forms of tests may be used in the Test Module 23 including a test of recall, an alternative forced-choice test, and other types of tests. Latency of response is preferably measured when using a test of recall or alternative forced-choice test.

Also, items can be tested backwards and forwards in the Test Module 23. That is, the cue becomes the response and the response becomes the cue. Further, a distracter, which is an alternative forced-choice that is incorrect, may be used to increase testing difficulty. A distracter should be chosen from a group of similar items although not necessarily from the same lesson.

Also, confusable items are tested consecutively and may be used as reciprocal distracters. The Test Module 23 determines whether users are still confusing these items by analyzing latency of response, confidence, and by the user choosing the incorrect confusable response, rather than the correct response itself. Other factors may also be considered in determining whether items are confusable.

IV. THE SCHEDULE MODULE: The Schedule Module 25 is preferably provided to interactively and flexibly schedule the operation of the Learn Module 21, the Review Module 22 and the Test Module 23. The preferred embodiments of the present invention are set up such that a user's performance in the Learn Module 21, the Review Module 22 and the Test Module 23 may affect operation of any of the others of the Learn Module 21, the Review Module 22 and the Test Module 23 to make learning, reviewing and testing more efficient and effective.

Furthermore, the Schedule Module 25 may schedule presentation of items in any of the Learn Module 21, the Review Module 22 and the Test Module 23 based on input information from the user, the administrator, the system or other input sources and other input information, including date of test or date that knowledge or skills are required, the current date, the start date, what knowledge or skills need to be learned between the start date and the test date, desired degree of initial learning and retention, days that study or learning cannot be done, how closely a person follows the schedule already created by the system, and many other factors.

That is, the system 10, and the Schedule Module 25 in particular, is responsive to user performance and user activity both within the system and in the real world.

The Schedule Module 25 schedules the presentation of items in the Learn Module 21, the Review Module 22 and the Test Module 23 by spreading the material out to reduce cognitive workload on a micro level and a macro level to maximize strength and activation of all items or skills on the predetermined date. In addition, the most significant way to drastically reduce the cognitive workload on the user or student is to eliminate the burden of scheduling, determining the pattern, sequencing, and timing of presentation, and presenting cues and monitoring responses in the Learn Module 21, the Review Module 22 and the Test Module 23, which the Schedule Module 25 does.

In one example of a preferred embodiment of the present invention, a user or administrator identifies content which is either already in the system or input thereto. The user or administrator, or system, may identify and input to the Schedule Module 25 the date of test or date that knowledge or skills are required, the desired level of retention, the starting date, dates where no activity will be done, time available during each study session, whether or not a Final Review is desired, how well the user can perform according to a schedule, how much time is required by the user to learn, review and test an item based on past performance, and other factors.

The system and more particularly, the Schedule Module 25 generates a customized schedule based on inputs from the user or administrator as noted above and any of the following factors: the spacing effect, strength, activation, when a lesson was initially learned, the degree of difficulty of items, the confusability of items or other factors upon which the Learn Module 21, the Review Module 22 and the Test Module 23 are based.

The Schedule Module 25 also preferably determines whether items are being scheduled for presentation during a Normal Zone, a Compression Zone or a Final Review Zone. In the Normal Zone, an average or normal schedule of learn, review and test is conducted since there is enough time remaining before the test date or the date that the knowledge or skills are required to achieve the desired degree of strength and activation. However, during the Compression Zone, the Schedule Module 25 must provide more opportunities to review items than in the Normal Zone. That is, the Schedule Module 25 treats items learned in the Compression Zone as though they are more difficult, increasing the number and type of reviews, so as to increase the strength of those items before the Final Review.

In addition, the Schedule Module 25 preferably uses workload smoothing to avoid any relative busy or easy study sessions for learning, reviewing and testing items. Graceful degradation also takes into account the user's actual use of the system 10. For instance, if the user skips one or more study sessions, or gets ahead of the schedule, or changes the date of the test, or makes other modification to the input factors, the Schedule Module 25 will recalculate the learning, reviewing and testing that must be conducted in the future to ensure the most effective and efficient use of time to develop the desired degree of strength and activation of knowledge or skills by the predetermined date.

V. THE PROGRESS MODULE: The Progress Module 26 is preferably provided in the main engine to quantitatively monitor performance of other modules, most notably, the Learn Module 21, the Review Module 22 and the Test Module 23. As noted above, the progress in any one of the Learn Module 21, the Review Module 22 and the Test Module 23 may affect the scheduling and operations of any of the others of the Learn Module 21, the Review Module 22 and the Test Module 23.

In addition, it is important to give the user or student proper motivation and feedback regarding their metacognitive skills as described above, as well as their usage of the system. Thus, the Progress Module 26 evaluates in any of the Learn Module 21, the Review Module 23, the Test Module 23, and the Schedule Module 25 and other elements of the system such as the Discriminator Module 28.

VI. THE DISCRIMINATOR MODULE: The Discriminator Module 28 is preferably provided in the main engine 20 and interacts with at least one and possibly each of the Learn Module 21, the Review Module 22 and the Test Module 23. The Discriminator Module 28 is designed to teach confusable items. Confusable items are two or more items which are somehow similar or easily confused by the user, particularly in retrieval.

Confusable items may be previously determined by the system or may be identified by the user, the administrator or the system during use of the system.

According to a preferred method of the Discriminator Module 28, confusable items are arranged in the Learn Module 21 such that a user learns the first and second confusable items and practices the ability to discriminate between the two.

If two items are confusable or difficult to discriminate, an aspect or feature of that item or items which increases discriminability should be identified and used to practice discriminating between the confusable items. Preferably the user, the administrator or system identifies the aspect or feature that allows the confusable items to be differentiated from each other using the Discriminator Module 28.

The Discriminator Module 28 is preferably set up to make the discrimination between the two confusable items as easy as possible. For example, visually similar items may be differentiated using a blink comparator which overlays and alternatively displays two items in the same position using different colors, shades, or graphical information to show clear differences between the two confusable items.

It should be noted that confusable items can be a pair of items to be learned or an item to be learned and another item that is not scheduled to be learned but is confusable with the item to be learned. In addition, there may be more than two confusable items which are identified and controlled by the Discriminator Module 28. However, it is preferred that the number of confusable items to be learned, reviewed and tested is two.

It is also preferred that the confusable pair is presented always in the same lesson set, review set and test set.

In addition to its applications to the Learn Module 21, the Discriminator Module 28 also preferably interacts with the Review Module 22 and the Test Module 23. For example, in the Review Module 22, confusable items may be reviewed together using the blink comparator. This may also be true at the end of a test in the Test Module 23.

Confusable items to be learned, reviewed or tested can be presented using a blink comparator or other suitable ways. For example, if items are visually similar, the cues and responses are shown together allowing the user a period of time to compare the two items which are confusable. A "blink" button is provided to initiate the presentation. The presentation includes displaying the first response for a period of time, then replacing the first response with the second response for a period of time, and then repeating this process. In this way, the images seem to "blink," highlighting the most significant difference between the two. Further, it is preferred to change the rate of presentation of overlays, order of overlays, or other aspects of the blink comparator.

Figures 26, 27:
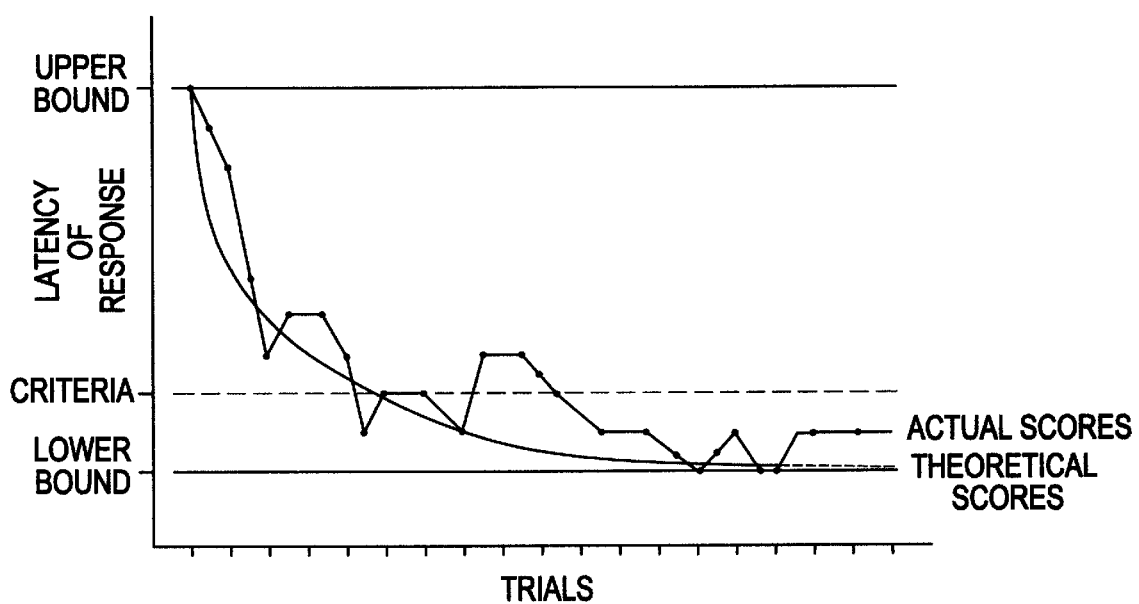
FIG. 26 is a table showing various combinations of cues and responses showing the forms for discrimination of two items used in the system of FIG. 1.
FIG. 27 is a graph of latency of response versus the number of trials used in the system of FIG. 1.

In addition, to further develop and retain the ability to discriminate between the confusable items, tests may be also be provided. When testing, a single cue is selected from one of the confusable items. All of the confusable responses are then presented. The user must choose the correct response to the presented cue. The correct response is then highlighted while the wrong responses disappear. This testing of each of the cues individually with the entire set of responses continues until the latency of responses and accuracy of responses reaches the desired criteria as shown in FIG. 27, which will be described in more detail below.

It is also possible in any of the Learn Module 21, the Review Module 22 or the Test Module 23 to change the presentation of confusable pairs by reversing the cue and response for each confusable pair until the user achieves a desired number of correct responses with a stable latency of response. Latency of response is preferably measured during use of the Discriminator Module 28 to determine relative latency and whether the actual relative latency is within desired limits. Also, alternative confusable pairs may randomly be dropped out of the sequence using criteria of performance and latency of response factors.

It is possible to use known confusable items as known items to take advantage of the spacing affect to schedule presentation of unknown confusable items. The unknown confusable items can be spaced out for presentation of these items for better learning of differences between the two confusable items and to practice how to discriminate between the two confusable items.

It is preferred that confusable items are presented together in each of the Learn Module 21, the Review Module 22 and the Test Module 23. That is, it is preferred that if the user, administrator or system identifies confusable items, the confusable items will always be learned, reviewed and tested together even if the confusable items are not part of the same lesson, review group, or test group. Confusable items are bound together until it has been determined by the user, the administrator or the system that the items are no longer confusable.

Now preferred embodiments of various applications and operation of the various modules of the system of FIG. 1 will be described.

Figure 7:
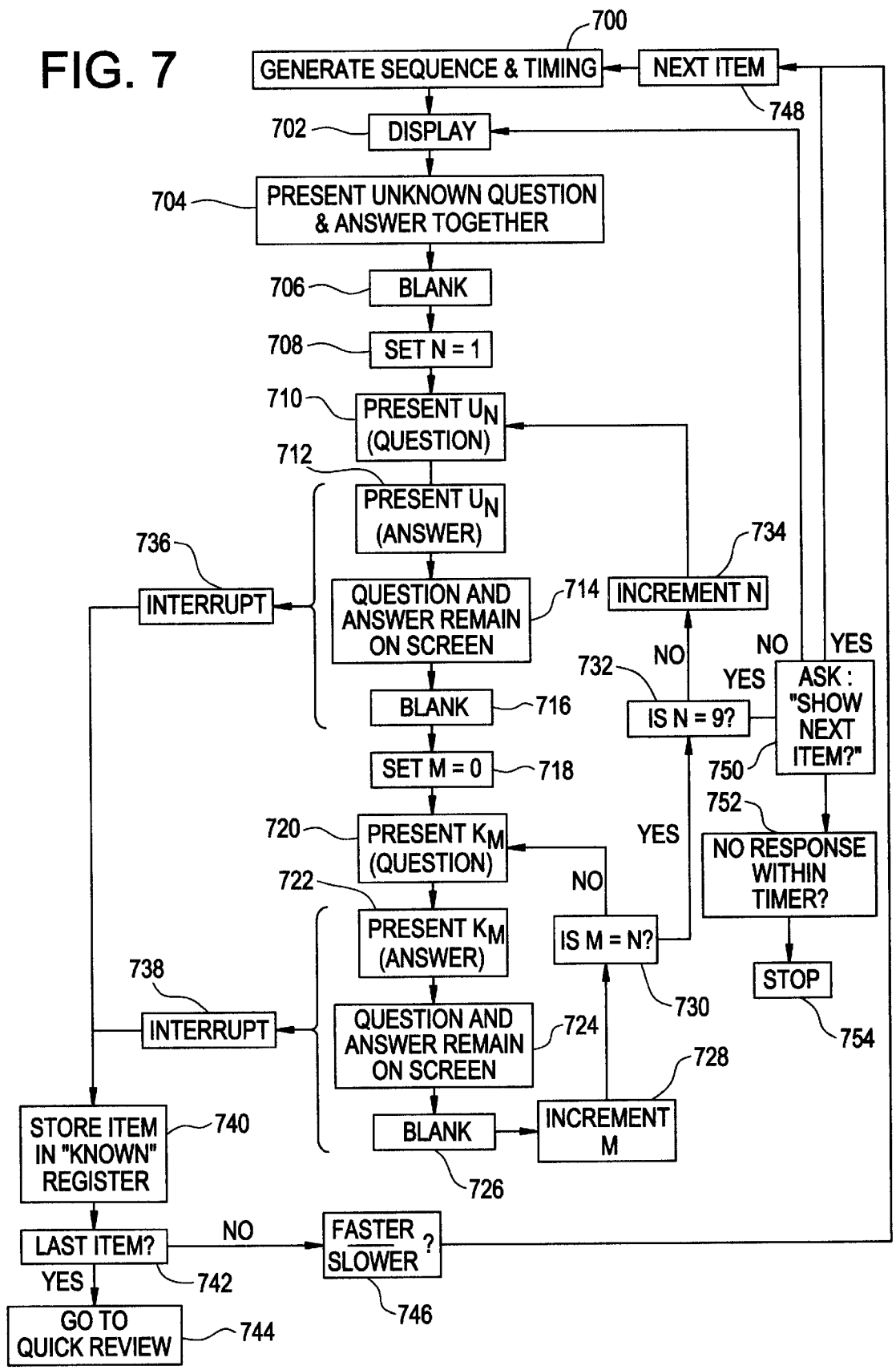
FIG. 7 is a flowchart showing operation of a preferred embodiment of the Learn Module of the system of FIG. 1.

FIG. 7 is a flowchart showing a preferred operation of the Learn Module 21 included in the system of FIG. 1.

As seen in FIG. 7, a preferred embodiment of the Learn Module is operated such that a sequence of items to be learned, such as the sequence shown in FIG. 16, is generated at step 700. The Learn Module 21 begins at step 700 with the generation of a sequence of items to be learned and various timing parameters of presentation of those items. The timing between presentation of a cue and a response is determined for each of a plurality of paired-associates consisting of a cue and a response. In addition, the timing between presentation of sets of paired-associates is determined at step 700. Other timing parameters such as those shown in FIGS. 17 and 18, described below, may also be determined at step 700.

After the sequence and timing of items to learned are generated at step 700, the display of items to be learned begins at step 702. First, an unknown cue and response are displayed or presented to the user at the same time, step 704. Then the display is cleared of the cue and response or nothing is presented to the user, step 706. A value of N is then set equal to 1, step 708. Then the cue of an unknown item $U_N$ to be learned is presented or displayed, step 710. The response corresponding to the cue of the unknown item $U_N$ is displayed or presented to the user, step 712. Then the cue and response of the unknown item $U_N$ remain on the screen or are continued to be presented to the user, step 714. After this step, the screen is then cleared or nothing is presented to the user, step 716. A value of M is then set to 0, step 718. Then, a cue of a known item $K_M$ is presented to the user or displayed, step 720, followed by the presentation of the corresponding response of the known item $K_M$, step 722. Then the cue and response for the unknown item $K_M$ remain or are continued to be presented to the user, step 724. Then the screen is cleared or nothing is presented to the user, step 726.

As shown by the interrupts at steps 736 and 738, the user can interrupt the flow from steps 712 to 716 and from steps 722 to 726, at any time. More specifically, if the user interrupts the process at any time between steps 712 to 716 or interrupts the process at any time between steps 722 to 726, the flow proceeds to step 740 at which an item is designated as having been learned and therefore, that item is stored as a known item in a "known" register. After the known item is stored, at step 740, a determination is made as to whether the last item has been learned, step 742. If the last item has been learned, the process flows to Quick Review, step 744, which is described in more detail with respect to FIG. 8. If it is not the last item to be learned at step 742, the user is queried as to whether they want to proceed more slowly or quickly, step 746, and then the process flows to step 748 where the next item to be learned is obtained and the flow returns to step 700 for generation of a new sequence for the next item to be learned.

If there is no user interrupt at steps 736 or 738, the process flows normally from step 726 where the display is cleared or nothing is presented to the user, to step 728 where the value of M is increased by 1. Then a determination is made whether M is equal to a value of N, step 730. If M is not equal to N, the flow returns to step 720 at which another known item $K_M$ is presented to the user. If M is equal to N, a determination is made whether N is equal to some predetermined number, such as, for example, 9, step 732. If N is not equal to the predetermined number, the value of N is increased by 1, step 734, and the flow returns to step 712 for presentation of another unknown item to be learned $U_N$. If N is equal to this predetermined number, a user is asked whether he wants to see the next item, step 750. If a user chooses to see the next item to be learned, the flow returns to step 748 and 700 for presentation of more items to be learned. If a user chooses not to see the next item to be learned, the flow returns to step 702. If there is no response within a certain period of time, step 752, the process stops at step 754.

Figure 8A:
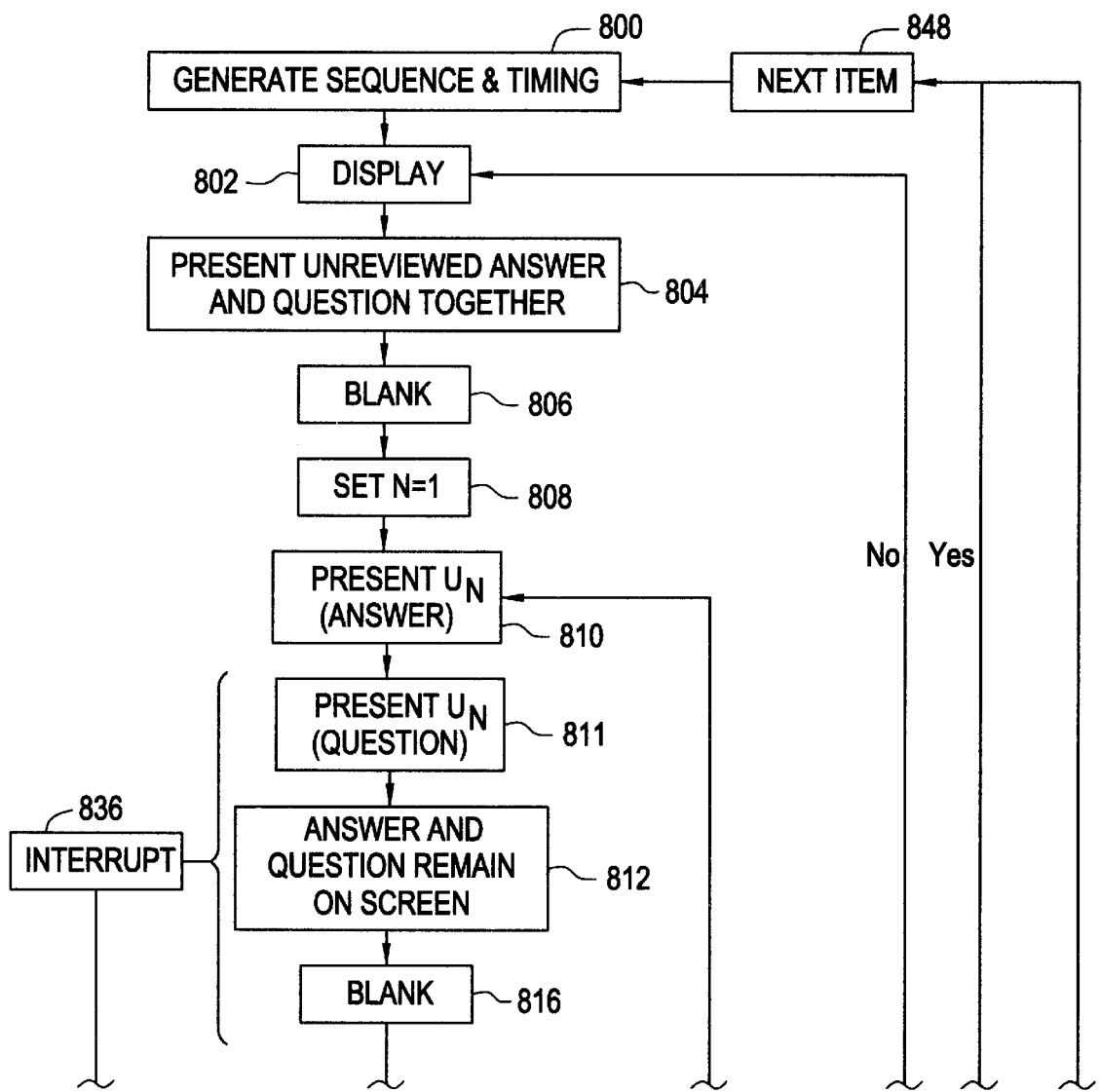
FIG. 8 is a flowchart showing a Quick Review operation of a preferred embodiment of the Learn Module of the system of FIG. 1.
Figure 8B:
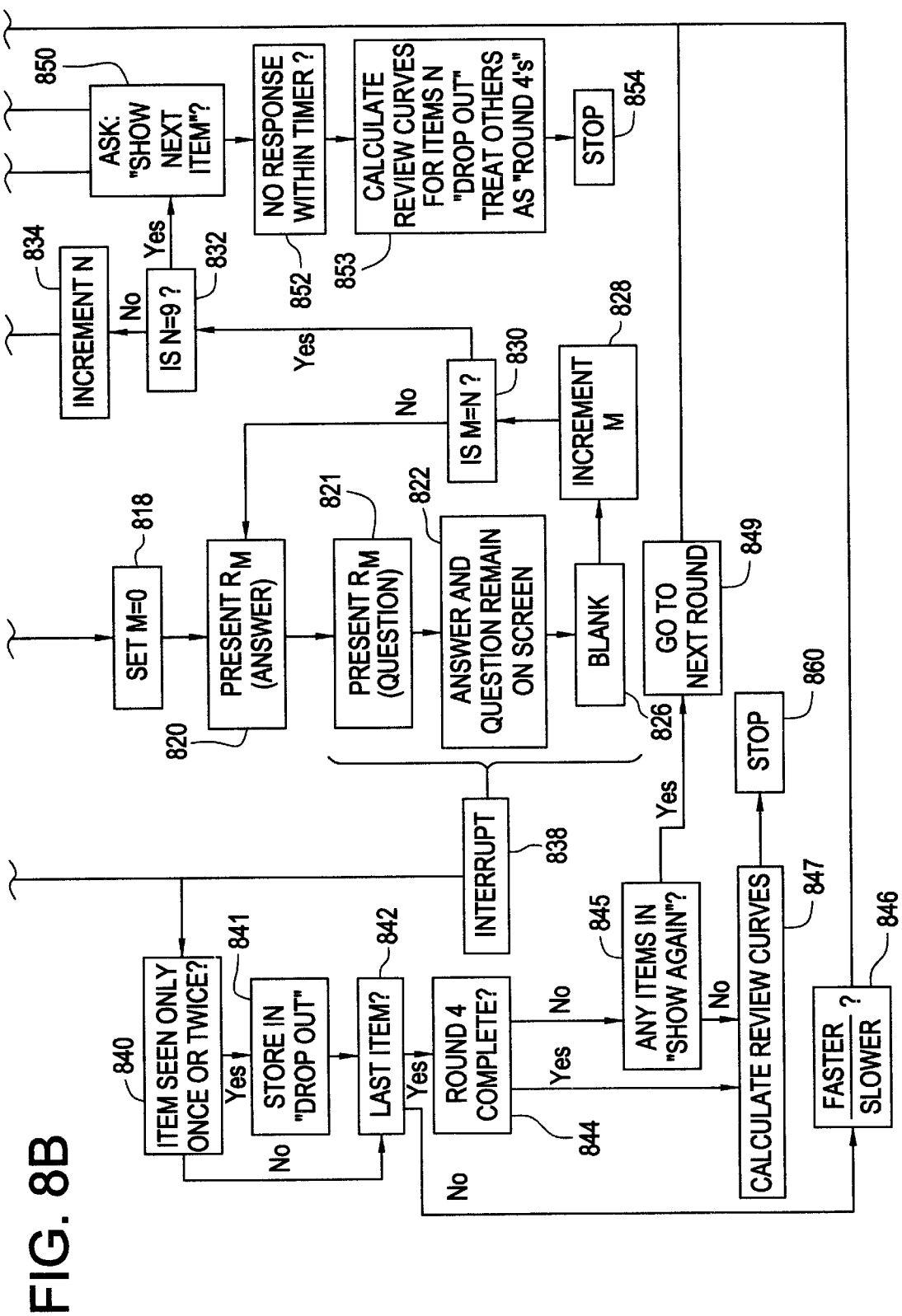

FIG. 8 show a preferred embodiment of Quick Review which is part of the Learn Module 21 of the system 10 shown in FIG. 1.

As seen in FIG. 8, a preferred embodiment of Quick Review of the Learn Module 21 is operated such that a sequence of items to be Quick Reviewed is generated at step 800. The Quick Review of the Learn Module 21 begins at step 800 with the generation of a sequence of items that have just been learned and are to be Quick Reviewed, and the generation of various timing parameters of presentation of those items. The timing between presentation of a cue and a response is determined for each of a plurality of paired-associates consisting of a cue and a response. In addition, the timing between presentation of paired-associates is determined at step 800. Other timing parameters different from but similar to those shown in FIGS. 17 and 18, described below, may also be determined at step 800.

After the sequence and timing of items to Quick Reviewed are generated at step 800, the display of items to be Quick Reviewed begins at step 802. First, an unreviewed cue and response are displayed or presented to the user at the same time, step 804. Then the display is cleared of the cue and response or nothing is presented to the user, step 806. A value of N is then set equal to 1, step 808. Then the cue of an unreviewed item UN to be learned is presented or displayed, step 810. The response corresponding to the cue of the unreviewed item $U_N$ is displayed or presented to the user, step 811. After this step, the cue and response remain on the screen or are continued to be presented to the user, step 816. A value of M is then set to 0, step 818. Then, a cue of a reviewed item $R_M$ is presented to the user or displayed, step 820, followed by the presentation of the corresponding response of the reviewed item $R_M$, step 821. The cue and response remain on the screen or are continued to be presented to the user, step 822. Then the display is cleared or nothing is presented to the user, step 826.

As shown by the interrupts at steps 836 and 838, the user can interrupt the flow at any time between steps 811 to 816, and between steps 821 to 826. More specifically, if the user interrupts the process at any time between steps 811 to 816 or interrupts the process at any time between steps 821 to 826, the flow proceeds to step 840 at which a determination is made as to whether an item has been seen or reviewed only one or twice. If the item has only been reviewed one or two times, the flow proceeds to step 842, described later. If the item has been reviewed more than two times, the item is stored in the drop-out register, step 841, and then a determination is made whether the last item has been Quick Reviewed, step 842. If the last item has been Quick Reviewed, a determination is made whether four rounds of Quick Review have been completed, step 844. If four rounds of Quick Review have been completed, review curves, described later, are calculated, step 847 and the process stops at step 860. If four rounds of Quick Review have not been completed, a determination is made whether there are any items which have been stored in a "show again" register, step 845. If there are no items to be shown or reviewed again, the process flows to step 847 where review curves are calculated and then the process stops at step 860. If there are items to be shown or reviewed again, the process begins the next round of Quick Review, step 849, and the process flows to step 848 where the next item to be Quick Reviewed is selected. The sequence and timing of presentation for the next item to be Quick Reviewed is then generated, step 800.

If there is no user interrupt at steps 836 or 838, the process flows normally from step 826 where the display is cleared or nothing is presented to the user, to step 828 where the value of M is increased by 1. Then a determination is made if M is equal to a value of N, step 830. If M is not equal to N, the flow returns to step 820 at which another known item $R_M$ is presented to the user. If M is equal to N, a determination is made whether N is equal to some predetermined number, such as, for example, 9, step 832. If N is not equal to the predetermined number, the value of N is increased by 1, step 834, and the flow returns to step 811 for presentation of another unknown item to be learned $U_N$. If N is equal to this predetermined number, a user is asked whether he wants to see the next item, step 850. If a user chooses to see the next item to be learned, the flow returns to step 848 and 800 for presentation of more items to be learned. If a user chooses not to see the next item to be learned, the flow returns to step 802. If there is no response within a certain period of time, step 852, the review curves are calculated for items in the "drop-out" register and other items are treated as if those items have been Quick Reviewed through all four rounds of Quick Review without dropping out and then the process stops at step 854.

Figure 9:
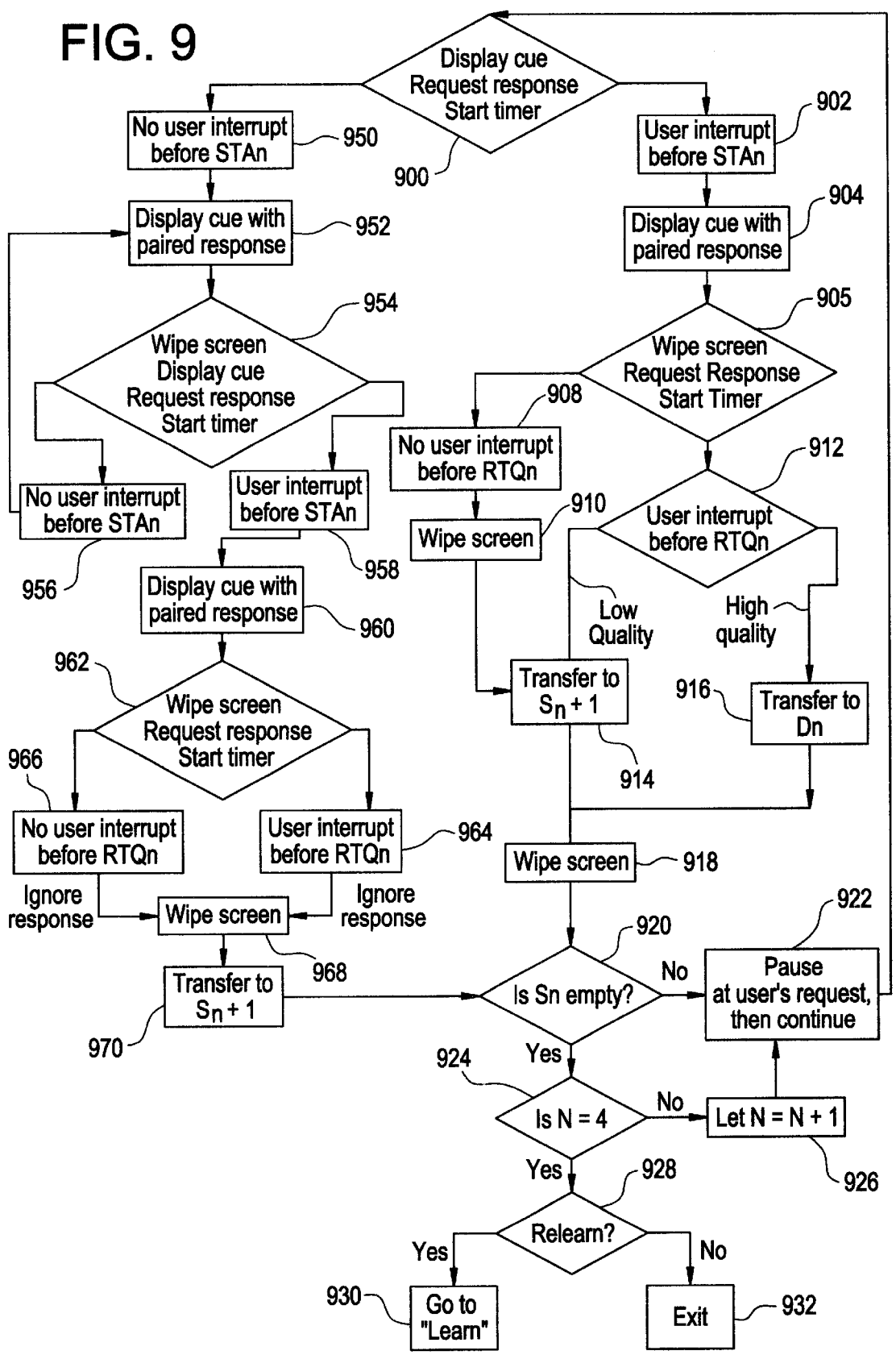
FIG. 9 is a flowchart showing operation of a preferred embodiment of the Review Module of the system of FIG. 1.

FIG. 9 is a flowchart for illustrating an operation of the Review Module 22 according to a preferred embodiment of the present invention. As seen in FIG. 9, the Review Module 22 begins by displaying a cue and asking a user whether he wants to see the answer yet, while also beginning a timer, as shown in step 900. During this time, the user is expected to construct or formulate a correct response to the cue presented in step 900. The user is expected to construct or formulate the correct response within a certain period of time, $STA_n$. If a user interrupts the operation of the Review Module before the period of time $STA_n$ lapses, step 902, the cue is displayed with a paired response, step 904. Then the screen is made blank and a response to a query asking the user to quantitatively rate the quality of his response is requested while the timer is started, step 905. The user is expected to rate the quality of his response within a certain time period $RTQ_n$. If a user does not interrupt operation before the time period $RTQ_n$ has lapsed by providing the rating of quality of response, step 908, the screen is made blank, step 910, and that particular item is transferred to a storage register $S_{n+1}$ and flow proceeds to step 920. $S_n$ or $S_{n+1}$ represents a storage register where items for which the user either could not identify the correct response or had trouble in identifying the correct response as indicated by a low rating of the quality of his response, are stored for additional review in the future. The variable n in $S_n$ or $S_{n+1}$ indicates the number of the pass or round of Review. If the user does interrupt the operation of the Review Module 22 after step 905, before the period of time $RTQ_n$ has lapsed, by providing the response to the request for rating his response, step 912, a determination is then made whether the user has rated his response to be high quality (e.g. a value of 4 or 5) or low quality (e.g. a value of 1, 2 or 3). If a low quality response is provided, the control proceeds to step 914 described above so that the item receiving a low quality rating is stored for future review in the register $S_{n+1}$. If the user rates his response as high quality, the control proceeds to transfer to $D_n$ at step 916 and then the screen is made blank at step 918 and flow proceeds to step 920. $D_n$ represents a discard register where items which are well known to the user, as indicated by the high quality response, are stored and are not reviewed again in another round of the Review Module 22. At step 920, the determination is made whether $S_n$, the storage register with the items receiving low quality performance ratings, is empty. If $S_n$ is not empty, meaning there are more items to be reviewed, the presentation may be paused at the user's request, step 922, and then control returns to step 900 for further operation. If $S_n$ is empty meaning there are no more items to be reviewed, it is determined at step 924 whether N is 4. N is a value indicative of the number of rounds of Review, or can be thought of as the number of times a user has reviewed all of the items in the storage register $S_n$. If N is not 4, N is increased by one at step 926 and the flow returns to step 922 to return to the beginning at step 900 after a brief pause at step 922. If N is equal to 4 meaning the user has made four passes through Review, the user is asked if he wants to relearn all items that remain in the $S_n$ register, step 928. If a user chooses to relearn a particular item, the flow is transferred to the Learn Module 21 at step 930. If a user chooses not to relearn an item, the control exits out of the Review Module 22 at step 932.

If the user fails to interrupt the Review Module 21 before the time period $STA_n$ has lapsed by failing to request that the answer or response be shown, step 950, the cue is displayed with the paired response at step 952. Then the screen is made blank, the cue is again displayed by itself, a response is requested and a timer is started, step 954, which is similar to step 900. If the user does not interrupt before the time period $STA_n$ lapses, that is the user did not request that the answer be shown, at step 956, the flow returns to step 952 in which the response is shown with the cue. If the user does interrupt before the time period $STA_n$ lapses, step 958, the cue is displayed with the paired response, step 960, and the flow proceeds to step 962 at which point the screen is made blank, a response for rating the quality of response is requested and the timer for timing the time period $RTQ_n$ is started. If a user interrupts before the time period $RTQ_n$ lapses, that is before the user rates the quality of his response, step 964, the response is ignored and the screen is wiped blank at step 968. If the user does not interrupt before the question is repeated at step 966, the response is ignored and the flow proceeds to step 968. The response is ignored in both cases because it has already been determined that this particular item should be reviewed again. Then the item is placed in the register $S_{n+1}$ at step 970 and flow proceeds to step 920, and further processing occurs as described above.

Figure 10A:
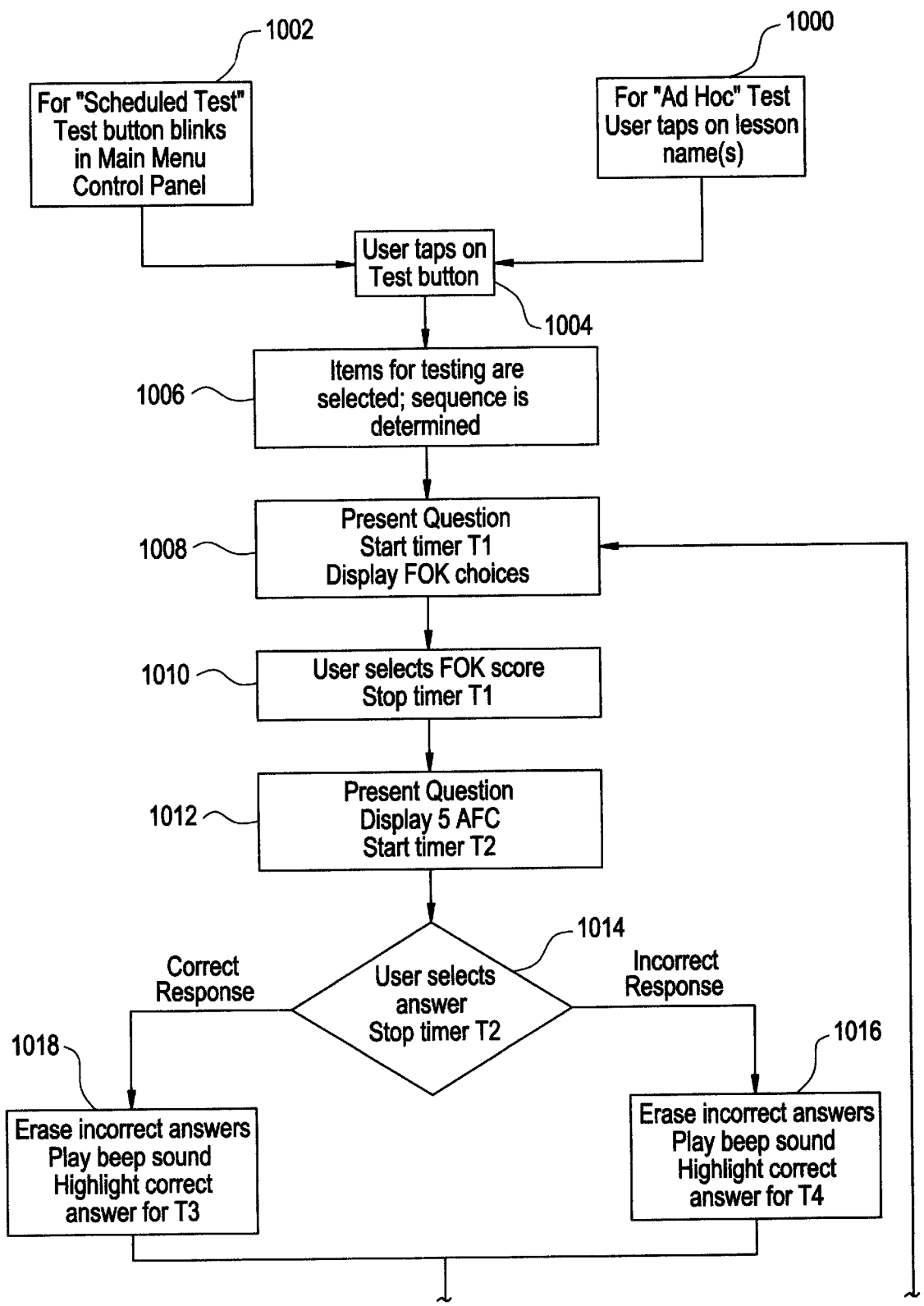
FIG. 10 is a flowchart showing operation of a preferred embodiment of the Test Module of the system of FIG. 1.
Figure 10B:
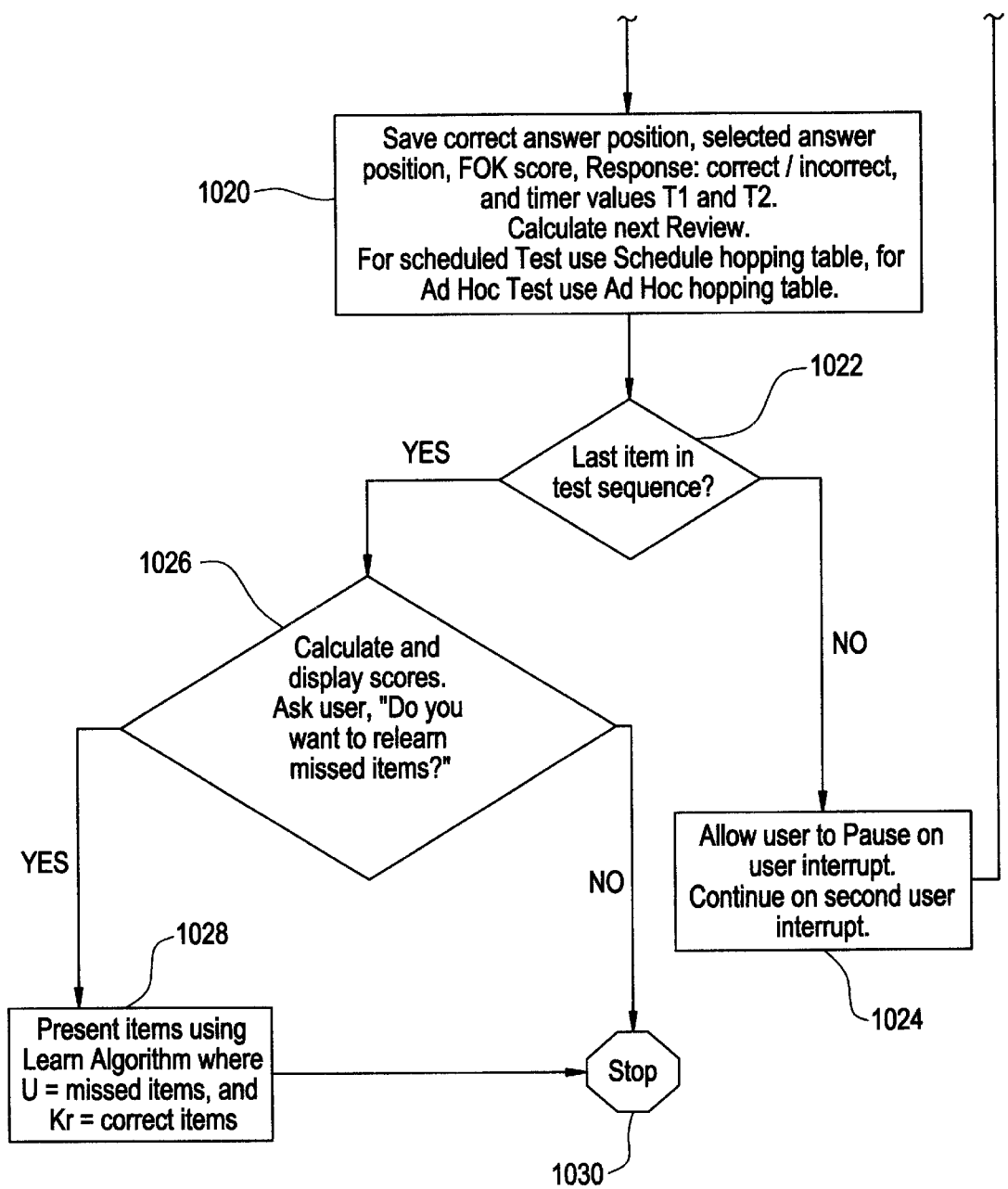

FIG. 10 is a flowchart for illustrating an operation of the Test Module 23 according to a preferred embodiment of the present invention. As seen in FIG. 10, the Test Module 23 begins by the user selecting an Ad Hoc Test, step 1000 or by the system 10 displaying a test button in the main menu display, step 1002, for a Scheduled Test. Then the user selects or taps on the test button on the display, step 1004, and the items for testing are selected and a sequence of items to be tested is generated, step 1006. The first cue of the items to be tested is then presented and a timer is started, step 1008. In this preferred embodiment, the user is asked to select a "feeling of knowing" score, for example, by indicating on a scale of 1 to 5 how confident the user is that he knows the correct response to the cue. The user selects the feeling of knowing score and the timer is stopped at step 1010. Then the cue is displayed with preferably 5 alternative forced-choices and a second timer is started, step 1012. The user then selects one of the 5 alternative forced-choices and the second timer is stopped, step 1014. If the response selected by the user is correct, the incorrect answers are eliminated from the display and an audible signal is produced and then the correct response is highlighted and shown for a time T3, step 1018. If the response selected by the user is not correct, the incorrect answers are eliminated from the display and an audible signal is produced and then the correct response is highlighted and shown for a time T4, which is longer than time T3, step 1016. Then the correct answer position and the selected answer position are saved as are the feeling of knowing score and the accuracy of response, step 1020. Then it is determined whether the item just tested was the last in the sequence of items to be tested, step 1022. If there are more items to be tested, the user is allowed to pause and then the operation returns to step 1008 for testing of more items, step 1024. If there are no more items to be tested, the test scores are calculated and displayed, and a user is asked if he wants to relearn the items that for which the user selected the incorrect response, step 1026. If a user chooses to relearn missed items, the missed items are relearned using the Learn Module 21, step 1028, as described above. If the user chooses to not relearn missed items, the Test Module stops, step 1030.

Figure 11:
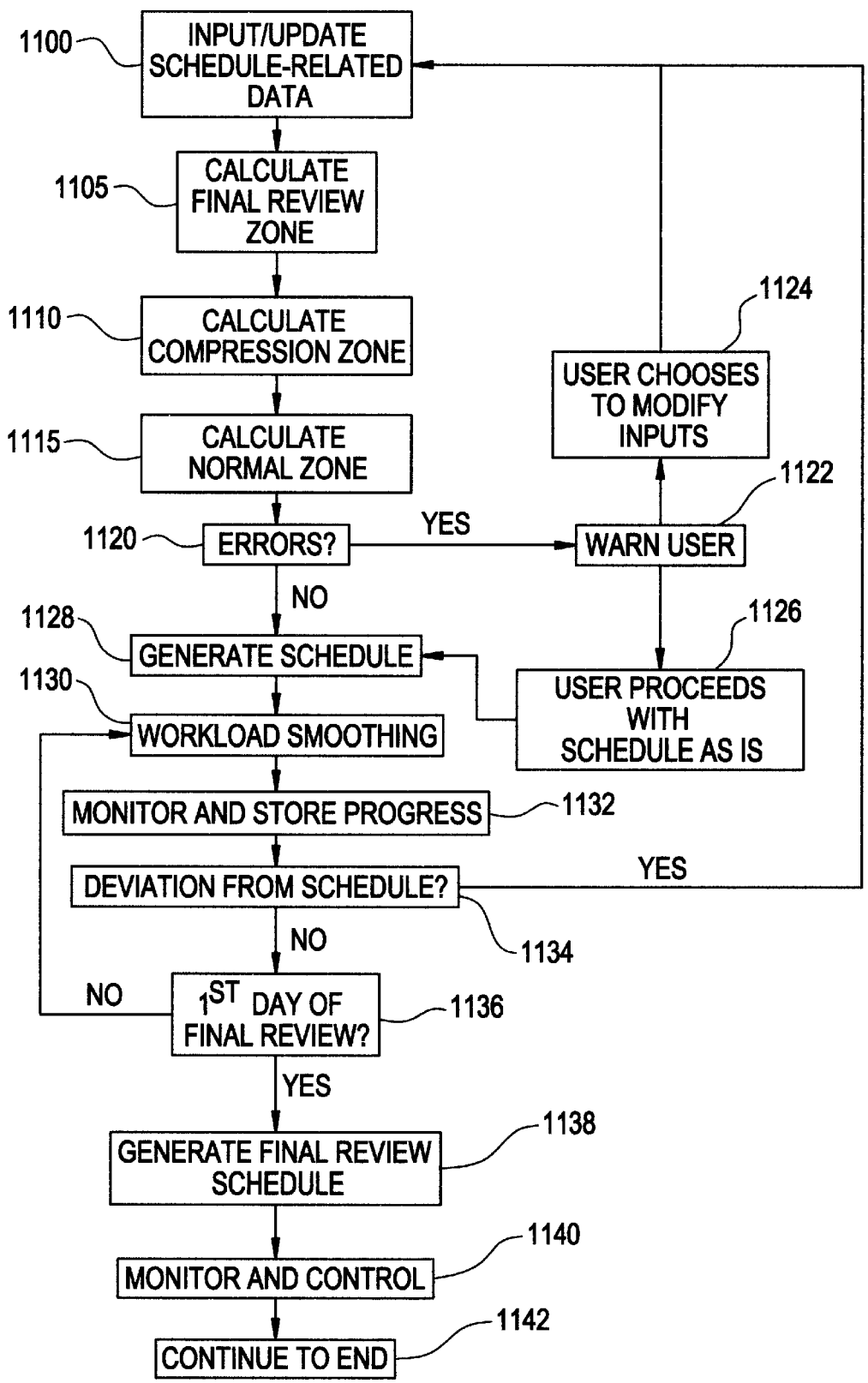
FIG. 11 is a flowchart showing operation of a preferred embodiment of the Schedule Module of the system of FIG. 1.

FIG. 11 is a flowchart of an operation of a preferred embodiment of the Schedule Module 25 preferably provided in the system of FIG. 1. The Schedule Module 25 begins at step 1100 at which information relating to the Schedule Module 25 is input or updated. The information to be input at step 1100 may preferably include the start date, the end date, the lessons to be learned, reviewed and tested, the types of lessons, the desired level of retention, the amount of time each day that the user is available to use the system, the number of final reviews, the time available for final reviews, the user's history of system usage, black out days when use of the system is not possible, and other factors and information. After this information is input at step 1100, the final review zone is calculated at step 1105 so as to determine the start date and end date of the final review period. Then the compression zone is calculated at step 1110 to determine when the compression period begins and ends. After this, the normal zone is calculated at step 1115 to determine the start and end dates of the normal period. Then the system 10 checks for the presence of scheduling errors at Step 1120. Scheduling errors include the scheduling of too many items within too short of a time period based upon the demonstrated ability of the user or other input. Other errors may also be checked for. If scheduling errors are detected at step 1120, a warning is issued to the user at step 1122. If a user chooses to modify the input information to avoid such scheduling errors at step 1124, the flow returns to step 1100 to begin the Schedule Module 25 again and re-calculate the schedule. If a user chooses to proceed with the Schedule Module 25 despite the presence of scheduling errors at Step 1120, the flow proceeds to generate a schedule at step 1128.

As described above, the schedule is generated based on the input information including the user's past history and usage of the system 10 and ability to comply with previously generated schedules. After a schedule is generated at step 1128, the schedule is checked for workload smoothing at step 1130 to avoid any session or day in which too much work or not enough work is scheduled relative to the preceding or following days. The schedule may be modified at step 1130 to achieve sufficient workload smoothing. Then, the user's progress with the system and specifically, the user's ability to comply with the generated schedule is monitored and stored in the system at step 1132. The system detects at step 1134 whether there is any deviation from the schedule generated at step 1128. If there is any deviation from the schedule, the control returns to step 1100 for re-calculation of the schedule to accommodate and compensate for such deviations. If there is no deviation from the schedule, the flow proceeds to step 1136 in order to determine if the final review start date has arrived. If the final review start date has not arrived, the flow returns to step 1130 to further monitor progress and to detect any deviations from the schedule. If the final review start date has arrived, the Schedule Module 25 generates a final review schedule based on relative difficulty of the items, the recency, the frequency, the pattern of prior exposure and other factors, step 1138. The user's performance in final review is monitored and controlled at step 1140 until the end date at which time the Schedule Module 25 ends, step 1142.

Figure 12:
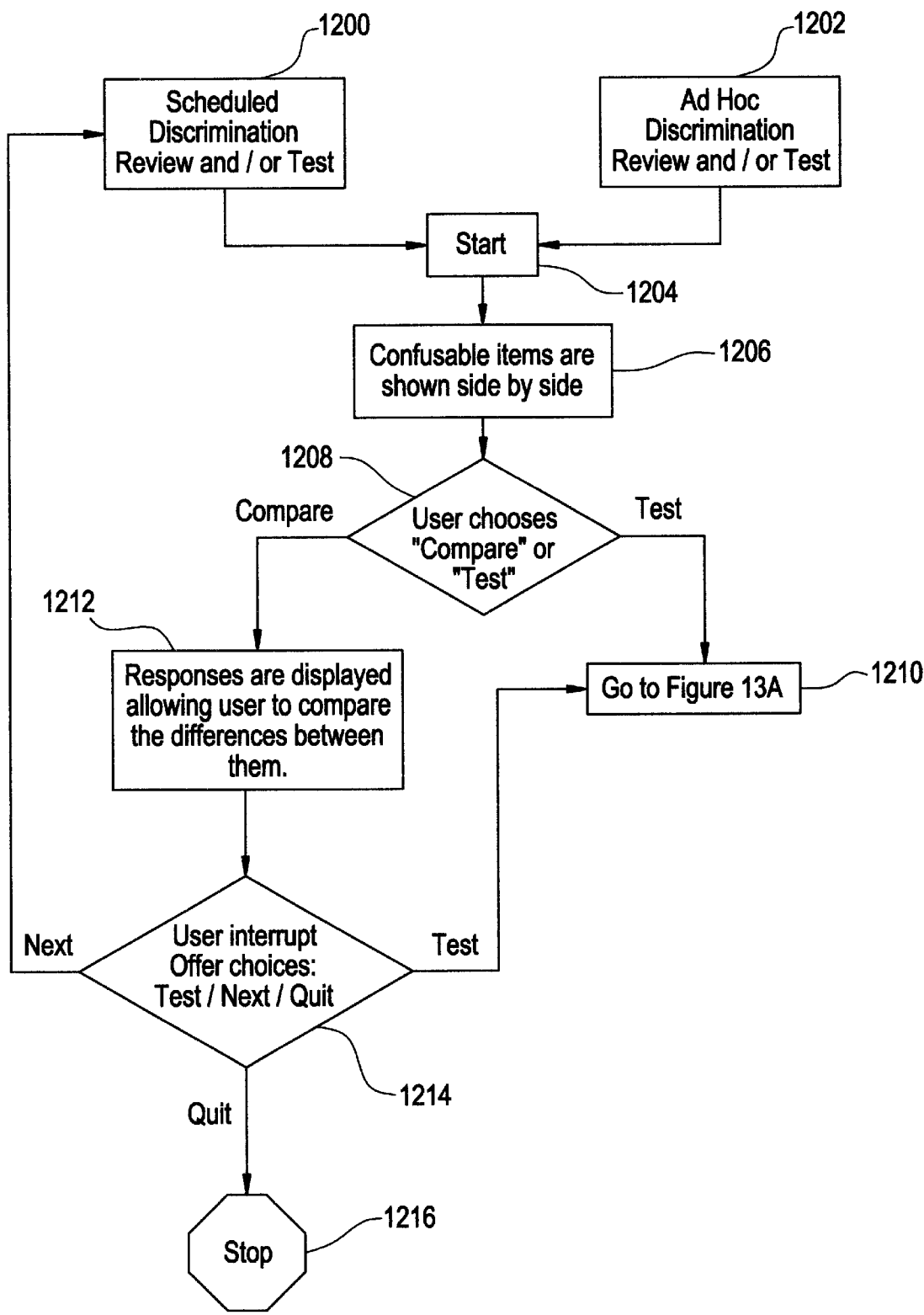
FIG. 12 is a flowchart showing operation of a preferred embodiment of the Discriminator Module of the system of FIG. 1.
Figure 13B:
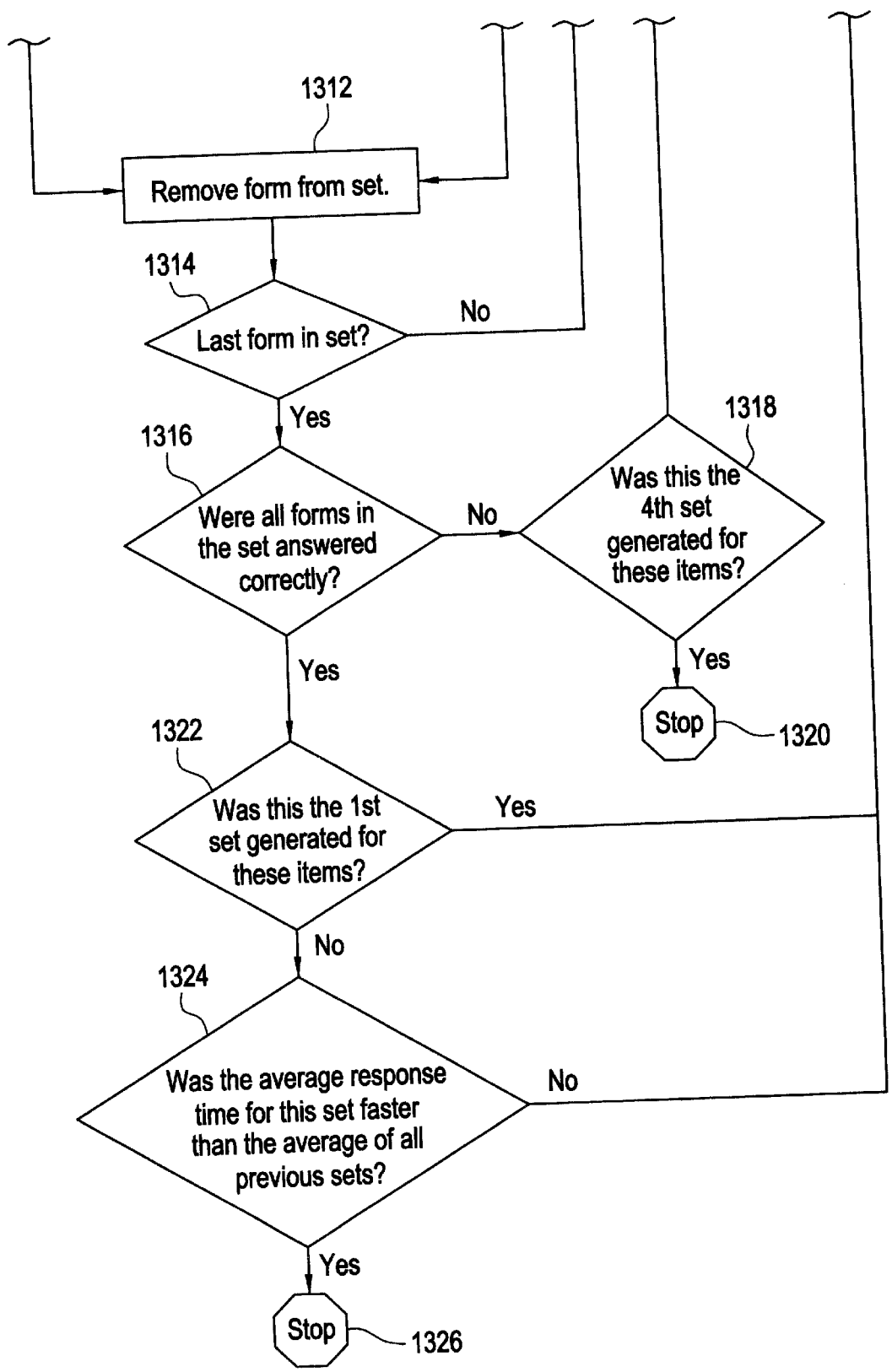
FIG. 13 is a flowchart showing further operation of a preferred embodiment of the Discriminator Module of the system of FIG. 1.

FIGS. 12 and 13 show a flowchart of an operation of a preferred embodiment of the Discriminator Module 28 preferably provided in the system 10 of FIG. 1. The Discriminator Module 28 begins with either a Scheduled Discrimination review or test, step 1200, or with an Ad Hoc Discrimination review or test, step 1202. The process then begins at step 1204 and confusable items are displayed or presented to a user in a side by side or closely associated presentation, step 1206. The user then decides whether to compare the confusable item or to be tested on their knowledge of the confusable items, step 1208. If the user chooses to compare the confusable items, the responses of the confusable items are displayed or otherwise presented to the user to allow the user to compare and discriminate differences between the confusable items, step 1212. If a user interrupts this process, step 1214, the user is provided the choice of being tested, moving to the next item or quitting operation of the Discriminator Module 28. If a user chooses a test at step 1214, the flow proceeds to step 1210. If the user chooses to end operation of the Discriminator Module 28 at step 1214, the operation of the Discriminator Module 28 stops at step 1216. If a user chooses to move to the next confusable item, the flow returns to steps 1200, 1204 and the next group of confusable items is presented at step 1206.

At step 1208, if the user chooses to be tested on the confusable items, the flow proceeds to step 1210 and the process shown in FIG. 13.

As shown in FIG. 13, if a user chooses to be tested on confusable items, test forms and sequences are generated at step 1300. Then various test forms are selected from the total set of test forms for use in presentation to the user, step 1302. Then a cue is presented to the user with various response choices and a first timer is started, step 1304. Then a user selects the response he believes to be the correct one and the first timer is stopped, step 1306. If the response is correct, the incorrect responses are removed from the display and the cue and correct response remain displayed for a certain period of time X with the correct response being highlighted and an audible signal is presented, step 1310. If the response is not correct, the incorrect responses are removed from the display and the cue and correct response remain displayed for a certain period of time Y, longer than the period of time X, with the correct response being highlighted and an audible signal is presented, step 1308. Then the test form is erased or removed from the display, step 1312. A determination is then made if the last test form has been presented to the user, step 1314. If there are more test forms to be presented to the user, the control returns to step 1302 for presentation of more test forms for testing confusable items. If there are no more test forms to be presented to the user, a determination is made whether all of the test forms were answered correctly, step 1316. If not all of test forms were answered correctly, a determination is made whether it is the fourth set generated for the particular items being tested, or the fourth time that those particular confusable items were tested, step 1318. If it is not the fourth set or fourth time, the control returns to step 1300 for generation of another set of test forms. If it is the fourth set or fourth time, the process stops at step 1320. If all of the test forms were answered correctly as determined at step 1316, a determination is made whether it is the first set or first time that the set of test forms was generated for this particular group of confusable items, step 1322. If it is the first set or first time, the control returns to step 1300 for generation of another set of test forms. If it is not the first set or first time, a determination is made as to whether the average time for response for the current set of test forms is shorter or less than previous time for response, step 1324, and if so, the process ends at step 1326. If the average time for response for the current set of test forms is greater than or equal to the previous time for response, the flow returns to step 1300 for generation of another set of test forms.

Figure 14:
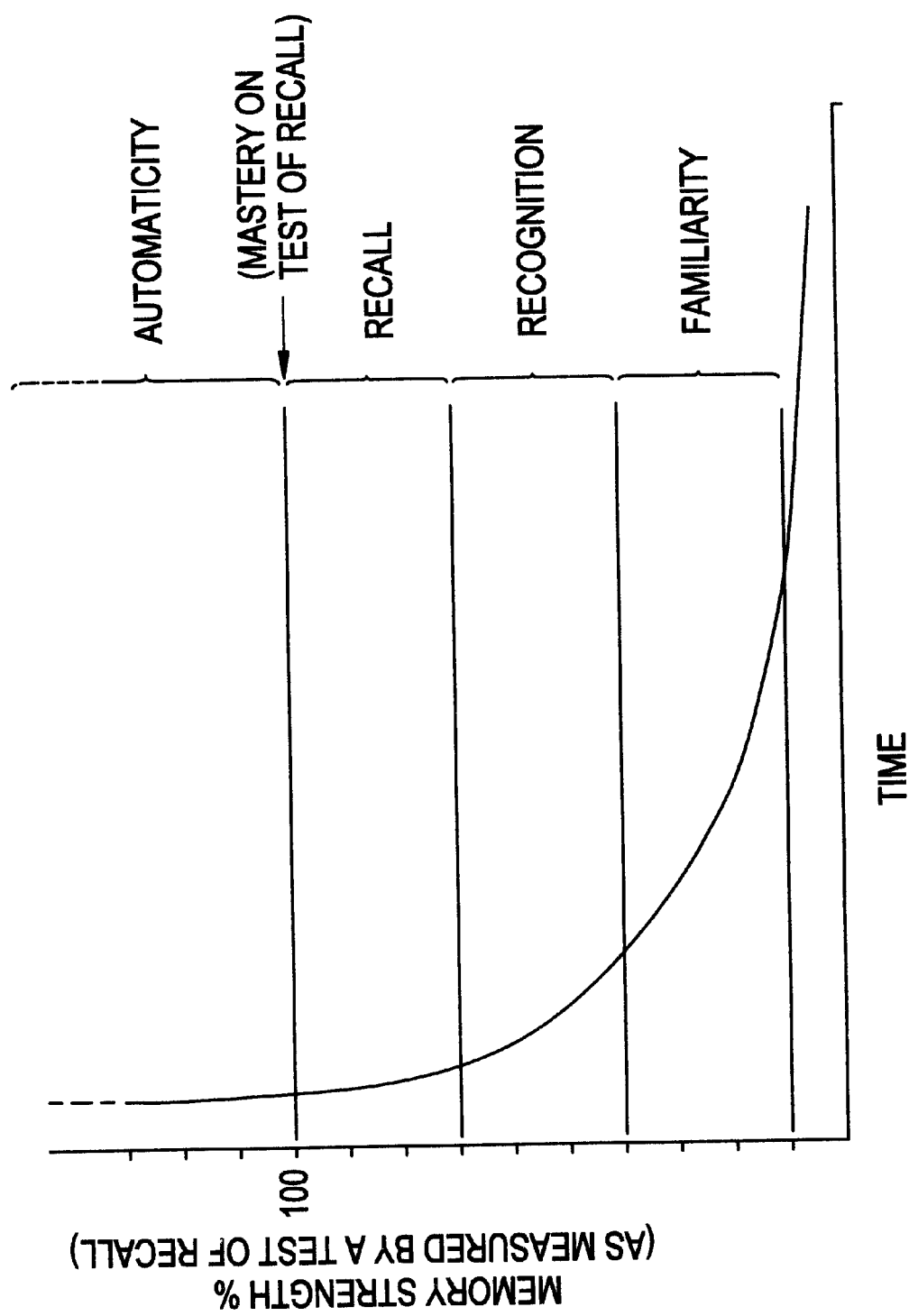
FIG. 14 is a graph of memory strength versus time indicative of the various levels of learning which can be achieved using the system shown in FIG. 1.

The sequence of items to be learned in the Learn Module 21 generated in step 700 of FIG. 7 may be generated based on the input desired degree of initial learning or level of learning. FIG. 14 shows various levels of learning possible in the system 10 of preferred embodiments of the present invention, along with a graph of memory strength versus time which includes the forgetting/retention curve shown in FIG. 3. As seen in FIG. 14, four levels of learning are located at various points along the forgetting/retention curve shown in FIG. 3. In the order of lowest learning level to highest learning level, the four levels of learning are: familiarity, recognition, recall and automaticity.

Information learned or remembered to the level of familiarity is information that the user has the feeling that they knew at one time, but can no longer remember.

Information learned or remembered to the level of recognition is information that the user can separate from other distracting choices or distracters. When presented with a cue, the user can choose the appropriate response from a number of alternatives. For example, the user may be asked select the correct answer on a multiple choice test.

Information learned or remembered to the level of recall is information that the user can retrieve when only a cue is presented. For example, the user may be asked o provide the correct response to a provided cue on a "fill in the blank" test.

Information learned or known to the level of automaticity is information that the user can retrieve instantly, with little or no cognitive effort, when only a cue is presented. The user "knows" the information as opposed to "remembers" the information. Automaticity can be measured by a test of recall where accuracy is required and latency of response is the key variable.

As shown in FIG. 3 and described above, previously learned items such as knowledge or skills, are gradually forgotten over time. The higher the level of initial learning, the longer the information is available for retrieval. Learned information passes down through the various levels until it is only familiar.

Different types of tests have varying degrees of sensitivity. A student could answer a question correctly on a multiple choice test, but miss the same question on a test of recall. Therefore, a test of recognition is less sensitive test of memory strength than a test of recall. Similarly, a test of recall is a less sensitive measure of memory strength than a test of automaticity.

In preferred embodiments of the present invention, the items to be learned are presented in the sequence generated in step 700 of FIG. 7 in such a way that the user learns to a level of automaticity. The benefits and processes for learning to a level of automaticity will be described below.

In order to have a user learn to a level of automaticity as shown in FIG. 14, the system 10 presents items to be learned by taking advantage of the principle of overlearning as shown in FIG. 15. More specifically, FIG. 15 shows the benefits of overlearning. The degree of initial learning affects future performance as described above. The decay rate for memory is approximately parallel for various degrees of initial learning as shown by the parallel curves in FIG. 15. Material learned to a level of mastery (100% correct on a test of recall) is forgotten at the same rate as overlearned material (100% correct on a test of recall, with low latency of response and low cognitive effort). Since both curves in FIG. 15 are substantially parallel, however, at any point in the future, retrieval performance is higher for overlearned material. Additionally, material which is initially overlearned to a level of automaticity is more likely to survive the initial, fragile period of consolidation where most memories are lost due to decay and interference.

The parallel nature of the curves in FIG. 15 is independent of the time schedule. Material learned to a higher degree of initial learning has a higher memory strength than material learned to a lower degree of initial learning even when measured decades later.

For generating the sequence of items to be learned at step 700 of FIG. 7, the system 10 preferably determines a sequence of items to be learned and a time period between a presentation of a cue and a response of a paired-associate and a time period between presentation of successive paired-associates to achieve learning to a level of automaticity shown in FIG. 14 by using overlearning shown in FIG. 15. More specifically, the items to be learned in the system 10 are preferably arranged according to a learn presentation sequence shown in FIG. 16. As seen in FIG. 16, Items (cues and responses) presented in the Learn Module 21 of the system 10 are sequenced according to whether they are items to be learned or are items that have already been learned. In FIG. 16, items being presented for the first time are designated, as $U_I$ where I indicates that it is the initial presentation of the unknown item. That same item seen again and again is designated as $U_N$, where N is the number of times that the item has been previously seen within the sequence. Items which have already been presented during previous Learning Module 21 operation are considered to be "known" for the purposes of sequencing and are designated as $K_R$, where the R indicates that they are items chosen randomly from the pool of known items.

By creating a sequence of known and unknown items as shown in FIG. 16, a form of expanded rehearsal for the unknown item is created. As mentioned previously, the expanded rehearsal series is the most effective and efficient schedule of review to build memory strength. In experimental psychology, this is known as the spacing effect. The sequence shown in FIG. 16 creates an intra-trial spacing effect. The schedule of review described in FIG. 4 creates an inter-trial spacing effect.

At some point during the presentation of the sequence shown in FIG. 16, the user will determine that they have learned the previously unknown material by comparing the adequacy of their response to the cue with the correct response provided by the system 10. When the user judges that their response is adequate, the user interrupts the presentation sequence. This interrupt will take the user to the next unknown item to be learned if any remain in the lesson, or to a Quick Review session if all items within the lesson have been seen.

FIG. 17 illustrates a learn presentation pattern for the presentation of the items described in FIG. 16 which is broken down and described in further detail in FIG. 17.

At the beginning of the sequence, the unknown item to be learned within the sequence is presented as $U_I$. Both the cue and the response are presented at the same time ($T_1$).

The cue and response disappear leaving a blank screen, or depending upon the modality of presentation of the information, a null event—one where nothing happens ($T_2$).

Now the unknown item is displayed or presented by itself. At this time, the user absorbs the cue and attempts to actively recall the appropriate response ($T_3$).

Whether the user is successful in retrieving the response or not, the correct response is presented using a method that may be the same as the method of presenting the known response, but preferably is unique to the presentation of the response to be learned. The method of presentation could involve color, sound, motion or any other method that differentiates it from the presentation of the randomly-chosen known response. The time that it takes to present the response using the defined method is called $T_4$.

Both the cue and response continue to be presented. The user uses this time ($T_5$) and the time available in $T_4$ to compare the response that the user retrieved to the correct response. If their response is judged adequate, the user can interrupt the sequence and move on to the next unknown item to be learned.

Following $T_5$, both the cue and response are eliminated leaving a blank screen or null event ($T_6$).

Now a known item is selected from the group of previously learned items. It is presented by first displaying the cue for a short period of time ($T_7$) allowing the user to attempt to actively recall the correct response, then the correct response is shown according to a method that may be the same as the method of showing the unknown response, but preferably is unique to the presentation of known responses ($T_8$). Both the known cue and known response remain presented for a period of time ($T_9$), and then both are eliminated for another period of time or a null event ($T_{10}$).

The presentation pattern of showing unknown cues and responses and known cues and responses separated by null events preferably follows the sequence described with respect to FIG. 17 until the user interrupts the sequence at allowable times as described in FIG. 7 or some other event occurs such as predefined time or number of presentations is reached.

FIG. 18 shows a table indicating the presentation timing preferably used in the Learn Module 21. There are preferably ten separate timing variables used as shown in FIG. 18, which preferably vary according to the position of the unknown or known cue or response within the sequence of items shown in FIG. 16. The timing parameters are set at an initial value and then are changed according to overt and covert responses input to or sensed by the system 10. One overt response to the system 10 occurs when the user interrupts the presentation sequence because he wishes to learn a new item. At this point the question is asked, "Do you wish to go faster or slower?" in order to maintain the attention and arousal of the user. If the user responds by choosing "faster" the timing values are decreased by the amount defined within the table for that timing parameter. If the user responds by choosing "slower", the timing values are increased by the amount defined within the table for that timing parameter.

The purpose of varying the timing values is to maintain the user's attention and arousal. Timing sequences where there is little or no variation in the stimulation can become habituating. That is, the stimulus is no longer novel and the brain tunes it out.

Additionally, each user has a desired rate of learning determined by the rate of presentation of each item as well as the rate at which new items are presented. In the classroom, when the teacher is lecturing, all students are presented information at the same rate. Some students find this boring because the presentation is too slow, and others find it frustrating because the presentation is too fast—they are left behind.

In the system 10 described above, the pattern, sequence, and timing of items are varied to maintain the user's interest, and provide each individual user with a rate of learning that each user finds challenging. Thus, the system 10 adapts to each user.

Figure 19:
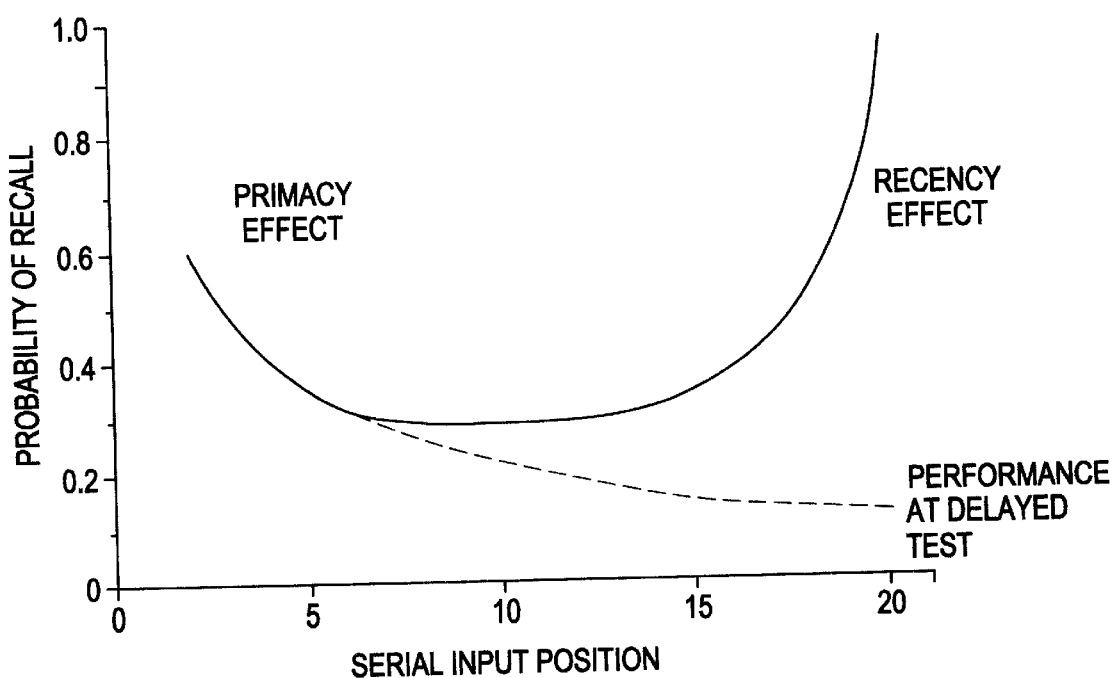
FIG. 19 is a graph of a the probability of recall according to the serial input position indicative of the serial position effect used in the system shown in FIG. 1.

Also related to the sequencing of the items to be learned is a phenomenon knows as the serial position effect. FIG. 19 illustrates the serial position effect which is a well understood phenomenon of psychology and involves the learning of items presented in a list. FIG. 19 shows that when items are presented in a list, the probability of successful recall varies based on the item's position within the list. If the recall test is administered immediately prior to the learning session, a recency effect is shown. That is, items presented later in the list are more likely to be recalled than previously presented items because the later presented items are still in the user's short term memory. If the recall test is administered after a delay of several minutes, the recency effect disappears because the items cannot be maintained in short term memory for that period of time without rehearsal. This effect contributes to judgement of learning errors which detrimentally affect self-paced learning.

Figure 20:
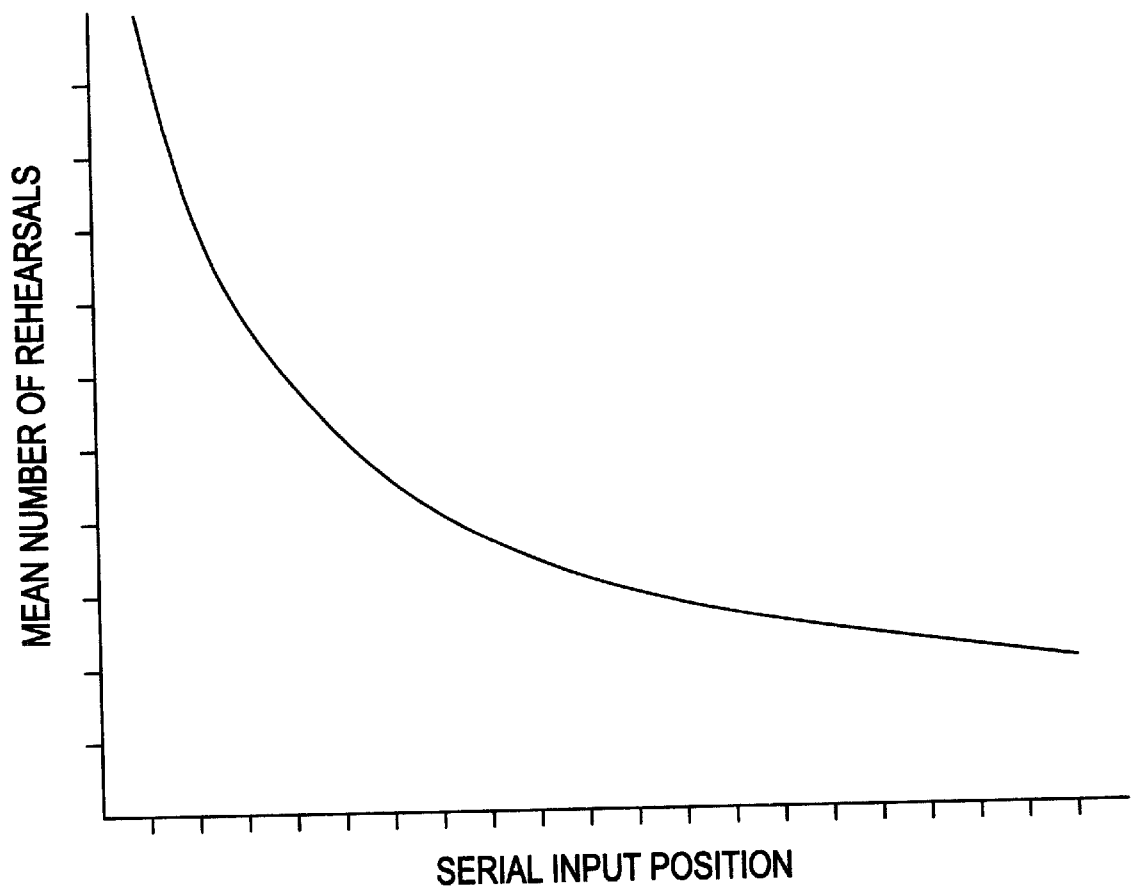
FIG. 20 is a graph of the mean number of rehearsals as a function of the serial input position used in the system shown in FIG. 1.

Items appearing early in the list are more likely to be recalled because of the primacy effect. Items appearing early in the list are more likely to be rehearsed a greater number of times than items later in the list as shown in FIG. 20. The success in recalling items from the list is dependent upon the number of times the item was rehearsed.

More specifically, FIG. 20 shows a graph of the number of Rehearsals vs. Input Position of an item to be learned. FIG. 20 illustrates the veracity of the statements made in the description of FIG. 19 regarding the primacy effect. Items presented early in a list are rehearsed more times than items presented later in the list and are therefore more likely to be recalled at the time of the test.

Figure 21:
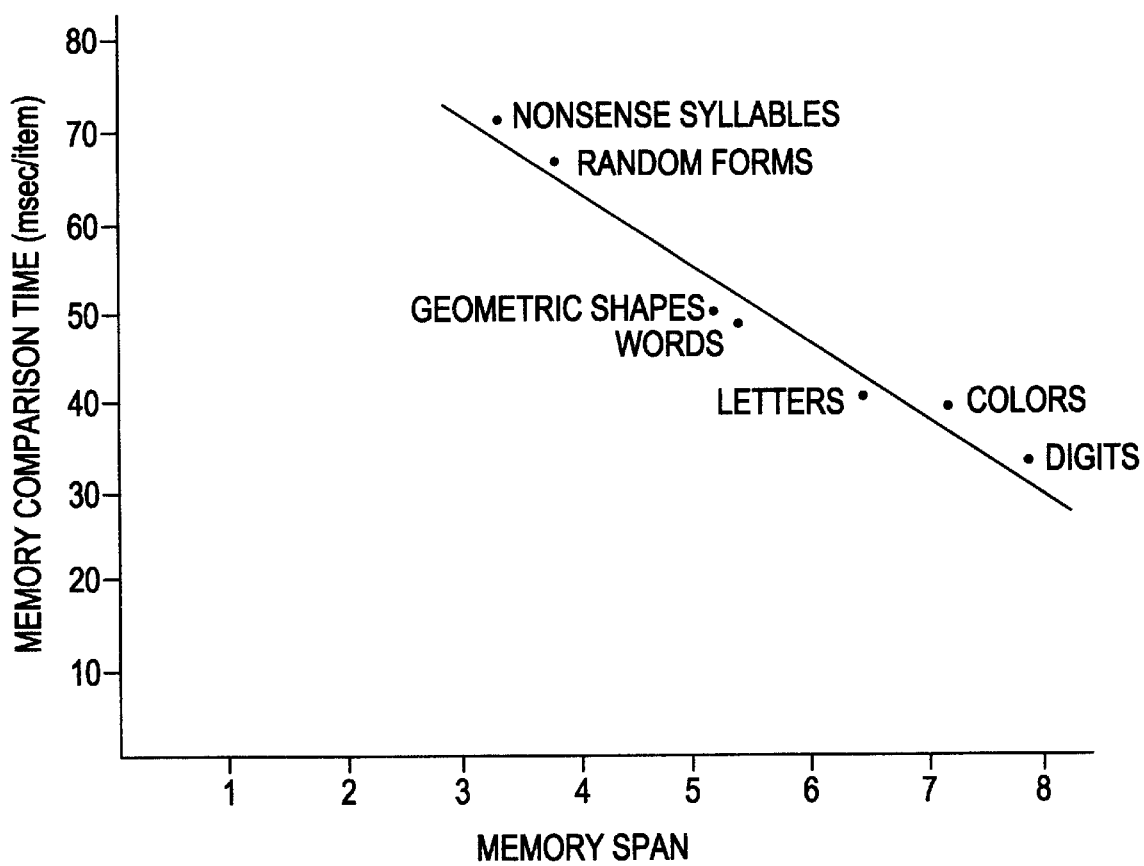
FIG. 21 is a graph of memory comparison time versus memory span used in the system of FIG. 1.

FIG. 21 shows a graph of memory comparison time versus memory span. FIG. 21 indicates that the memory span for information varies by the type of information. Memory span for digits is approximately seven plus or minus two digits. That is, most people can keep seven plus or minus two digits in their short term memory through the process of maintenance rehearsal—they repeat them over and over. The rate at which a person can repeat a particular type of information directly affects their span for that type of information. This rehearsal rate varies from person to person. Generally speaking, adults can maintain more items in short term memory than children because their rehearsal rates are faster. Also, the language that a verbal item is rehearsed in affects the memory span. For example, when rehearsing digits, speakers of Chinese can maintain more items in memory than speakers of Welsh. Likewise, memory span for images, sounds, and graphical information will vary from person to person. This phenomenon and those shown in FIGS. 19–21 are taken into account within the system 10 by the use of the modality pairing matrix shown in FIG. 22 which is used to define parameters associated with the sequence and pattern, and in particular, the timing of presentation.

FIG. 22 shows a modality pairing matrix in which the response follows the cue preferably by about 250 milliseconds to about 750 milliseconds is a general guide for maximum conditioning. Some information takes more time to be absorbed than others. The differences in time for encoding and storage of information are a result of the input channel or the primary sensory modality, the complexity of the material, the familiarity of the material, distractions to the use of the system by outside conditions, and many other factors. FIG. 22 describes the flexibility of the system 10 in handling materials presented in any combination of sensory modalities and information formats in both the cue and the response. The system 10 has predefined parameters for the presentation pattern, rate, and sequence for each combination of cue and response described in FIG. 22. These parameters may be modified by the user, administrator, or system 10 in order to create maximum conditioning adaptive to each user for each item learned.

Now preferred embodiments of the Review Module shall be discussed. As described with respect to FIGS. 3 and 4, the Review Module operates based on the forgetting/retention function and spaced rehearsal series shown in FIG. 4.

FIG. 23 shows a review curve table preferably used in the preferred embodiments of the Review Module 22. As mentioned in the description of FIG. 3, no single curve can model the forgetting rate of each item learned by each user. In the current preferred embodiment of the system 10, a "family" of curves are preferably modeled to encompass the range of forgetting: from very easy items to very difficult items. The curves shown in FIG. 25 have been sampled to create a table of numeric values. In this example, eight curves have been modeled to represent the total range. The values within the matrix shown in FIG. 23 indicate when a session of the Review Module 22 should occur and are representative of the number of days since an item was initially learned. Those with ordinary skill in the art can create any number of ways to represent the range of forgetting retention and use the system to calculate the next session of the Review Module, based on input from the user, to maintain any desired level of retention.

FIG. 24 illustrates a review hopping table. As noted above, since no single curve can accurately model the rate of forgetting, a family of curves is used by the system 10 to characterize the range of forgetting. Many variables can change over time however, which affects the rate of forgetting. A curve which accurately models the forgetting rate of a particular item for a particular learner early in the Review schedule may become inaccurate at some later date due to such effects as proactive or retroactive interference and other factors. In order to accurately model the rate of forgetting, the system "hops" the item to be reviewed from one curve to another to more accurately model the forgetting rate. FIG.

24 shows the hopping rules that determine when an item should hop from one forgetting curve to another forgetting curve shown in FIG. 25. During each session of the Review Module 22, the user is presented with items previously learned. A cue is presented and the user attempts to actively recall the appropriate response. After the user has made his best attempts, the user taps the "Show the Answer" button which causes the correct response to be displayed. The user is asked to rate the quality of his response. This rating is called the "score".

As shown in FIG. 24, scores range from a low of 1 to a high of 5. If a score of 4 is given in the first round, the items changes "0" curves and is dropped from the current Review set. If a score of 5 is given, the item changes "−1" curves and is dropped from the Review set. Changing "−1" means that the item is moved to 1 curve "easier" than the current curve. An easier curve is one where Review sessions occur less frequently. Relating this to FIG. 25, the item may be moved from curve 4 to curve 3—a change of "−1".

If in the first round of the Review Module 22, the quality of response was scored as a 1, 2, or 3, the item simply moves to the next round of the Review Module. No changes are made to the curve at this point.

The review of each item and scoring and scoring of quality of response occurs round after round until no items are remaining, or until the fourth round of the Review Module 22 is complete. If an item has been seen in four rounds and a quality rating is consistently given as 1, 2, or 3, the item is treated as "unlearned", and the whole process of Learning, Review, and Testing begins all over again.

This example of determining the appropriate curve to model the rate of forgetting of an item over time based on scoring the quality response during a session of the Review Module 22 represents only one way to monitor and control the ever-changing rate of forgetting. The current system 10 also takes into account latency of response, scores on scheduled and ad hoc tests, the rate of initial learning, the degree of initial learning, and many other factors. Those with ordinary skill in the art can also create other systems based on the present invention that modify the model for the rate of forgetting of each item for each user based on overt and covert feedback taken based on performance in the Learning Module 21, the Review Module 22, and the Test Module 23 as well as data available from other sources such as the rate of forgetting of other users of the system or other factors.

FIG. 25 illustrates a family of review curves with hopping. FIG. 25 graphically represents one family of Review curves with a trace of an item hopping between curves. Many different families of curves can be used by the system 10. Each family of curves is designed to accurately model forgetting for a particular type of information, knowledge or skill learned, retained, and retrieved. The family of curves which best model verbal information may be different than the family of curves for auditory information. These variations in curves may vary from user to user as well. A family of curves which best model auditory information for one user may be ideal for modeling visual information for another user. The system 10 constantly monitor's the users rate of forgetting and rate of timing of "hopping" to minimize the need for hopping. Families of curves which result in less hopping are considered to be better curves than curve families that result in more hopping.

FIG. 26 illustrates forms for the discrimination of two items preferably used in the Discriminator Module 28. FIG. 26 represents the eight separate forms of presenting cues and responses for two confusable items. In the first form, when the cue is presented as Question 1, the user should choose Answer 1 on the left as the correct response. Presenting the cues and responses for the two confusable items in the various formats, the user is trained to discriminate between the items in any possible scenario. Also, by presenting the cues and responses in varying formats, the user does not get bored during the training session because of repetition.

FIG. 27 illustrates the latency of response in discrimination trials according to a preferred embodiment of the Discriminator Module 28. Learning to discriminate between two items is a skill. Skills can be improved through practice. One measure of performance of a skill is latency of response. With practice, scores for latency of response decrease along a negatively accelerated curve, called "theoretical scores" in FIG. 27. At first, the user has a difficult time discriminating between the two confusable items. The user requires a relatively long period of time to perform this function. This time is known as the Upper Bound—it is the slowest the user will ever be performing at this skill. With practice, the user becomes faster at discriminating between the items. There is a Lower Bound to how quickly the user can perform this skill based upon the limitations of perception, cognition, and reporting reflexes. With practice, the latency of response decreases from the Upper Bound asymptotically to the Lower Bound. Because of the laws of diminishing returns, it is not desirable to continue training for too long. The decreasing benefit of the training does not justify the time expended. Therefore, a criteria level is set. When the user reaches this criteria between the Upper Bound and the Lower Bound, the training session is complete. Criteria levels can be set by the user, the system 10, the administrator or other input sources.

Figure 28:
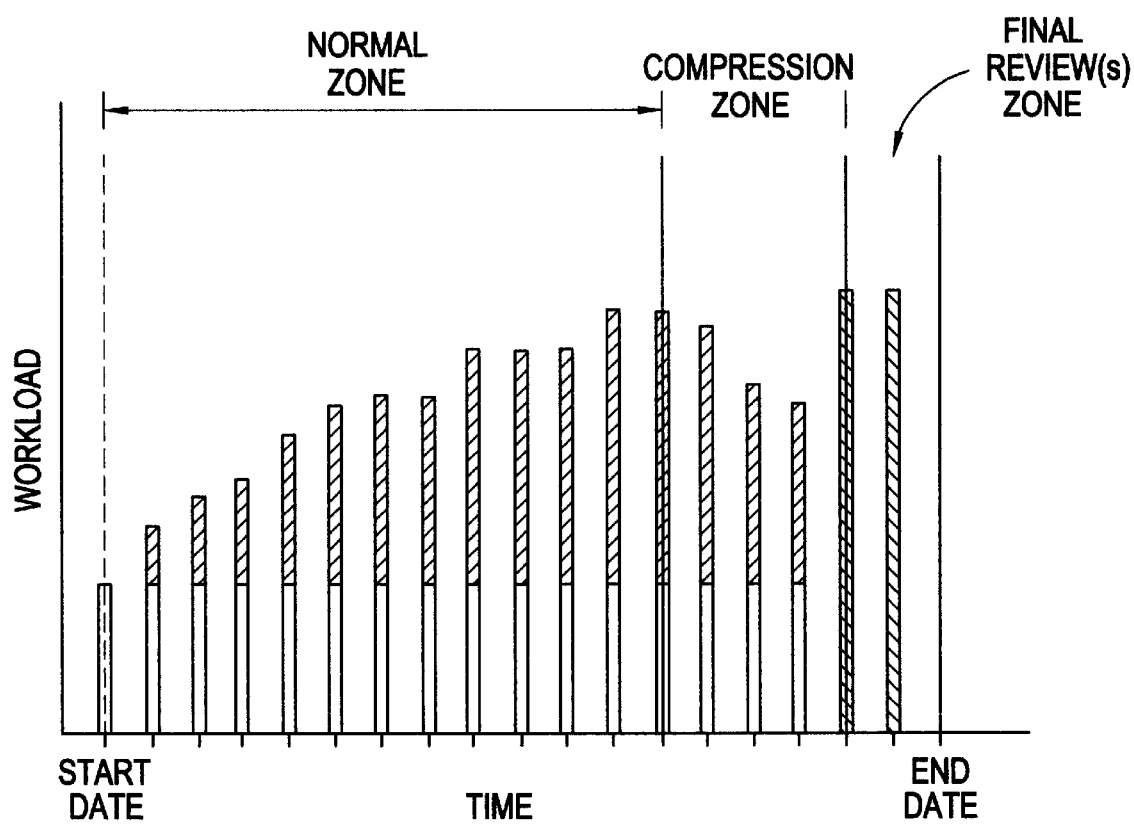
FIG. 28 is a graph of workload versus time indicative of schedule zones and workload used in the system of FIG. 1.

FIG. 28 illustrates various schedule zones and workload for a preferred embodiment of a Schedule Module 25 of the present invention. FIG. 28 illustrates the work zones created by the Schedule Module 25 for the system 10. The user or the administrator defines the start date, the end date, and the items desired to be learned. The system 10 automatically determines the most effective and efficient schedule of operation of the Learn Module 21, the Review Module 22 and the Test Module 23 to build the greatest strength and activation for all of the items in the curriculum by the defined end date.

The white areas in FIG. 28 represent the number of items to be learned each day. The cross-hatched areas in FIG. 28 indicate the number of items to be reviewed each day. The black areas indicate the number of items for Final Review each day.

In the Normal Zone, items are learned and reviewed in the normal manner. In the Compression Zone, items are learned in the normal manner but are reviewed as those items are particularly difficult. This creates more opportunities to build strength of the items when very little time remains prior to the end date. In the Final Review Zone, all items have been learned and reviewed to develop the maximum strength possible. One or more Final Review sessions are scheduled to maximize and equalize to the greatest possible extent activation for each item. This presents to the user all of the material just prior to the end date in one or more of the last reviews.

According to one preferred embodiment of the present invention, a system 10, as shown in FIG. 1, is embodied in a processor-based apparatus and method in which information including items to be learned, reviewed and tested is presented to a user graphically, auditorily, kinesthetically, or in some other manner. More specifically, the preferred embodiment shown in FIGS. 29–51 is a processor-based system 10 including a display for showing various window displays described with reference to FIGS. 29–51.

Figures 29, 30:
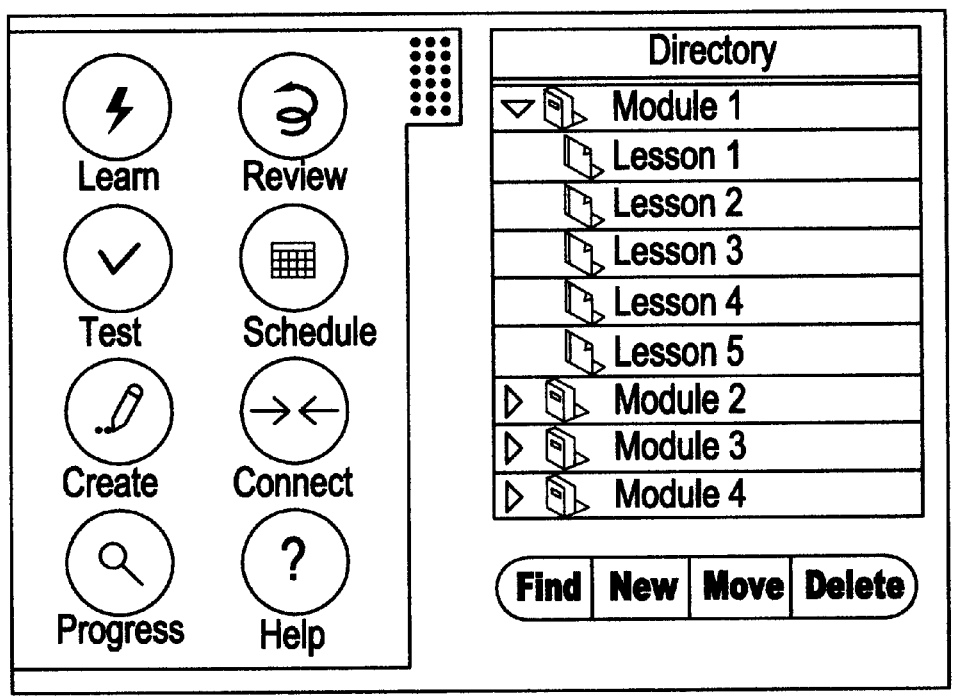
FIG. 29 is an illustration of a main window display for a preferred embodiment of the system shown in FIG. 1.
FIG. 30 is an illustration of a preview window display for a preferred embodiment of the system shown in FIG. 1.

FIG. 29 shows one preferred embodiment of the present invention, in which a Main Window display is provided to allow the user to choose which function he wishes to perform. As seen in FIG. 29, such functions can include viewing lessons, including items to be learned, within a Directory and to organize lessons in any way that the user desires by using any of the Find, New, Move or Delete options. Also, as seen in FIG. 29, the user can select any one of the Learn Module 21, the Review Module 22, the Test Module 23, the Schedule Module 25, the Create Module 200, the Connect Module 300, the Progress Module 26 and the Help Module 28. The operation of these various Modules will be described in more detail below. It should be noted that other types of Modules may also be included in the system and the display shown in FIG. 29.

In this preferred embodiment of the present invention shown in FIGS. 29–51, the display is preferably a touchscreen type display which responds to contact by a pen, stylus, finger or other object. Other types of displays or information presentation apparatuses may also be used in various preferred embodiments of the present invention.

FIG. 30 shows a Preview Window display which is presented in response to a user selecting a Lesson such as Lesson 1. In one preferred embodiment of the present invention, if a user taps twice on the display at the location of the title "Lesson 1" in rapid succession, the display presents information about that lesson including the lesson's title, the author of the lesson, the date of creation of the lesson, and description/instructions for learning that lesson. In addition, the user can tap the Preview button to see the contents of the lesson. Tapping the Close button takes the user back to the Main Window display shown in FIG. 29.

FIG. 31 is a display showing operation of the Learn Module 21 including the presentation of a cue. In this preferred embodiment of the present invention, when a lesson is selected as described above and the Learn button shown in FIG. 29 is tapped, the Learn Module 21 is initiated. FIG. 31 shows the display corresponding to $T_3$ in FIG. 17.

FIG. 32 is a display showing a further operation of the Learn Module 21 including the presentation of a response to the cue shown in FIG. 31 corresponding to T4 in FIG. 17.

Figure 33:
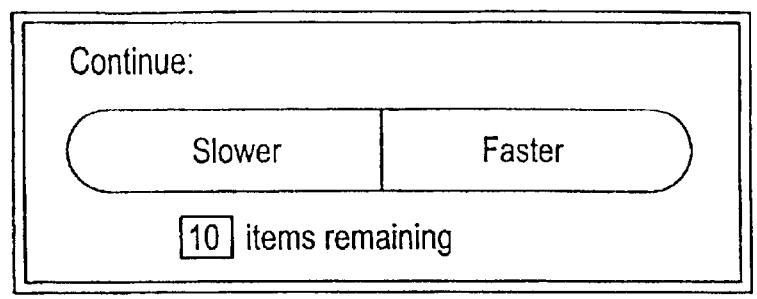
FIG. 33 is an illustration of a learn sequence including a request for faster or slower presentation of cues for a preferred embodiment of the system shown in FIG. 1.

FIG. 33 is a display showing a further operation of the Learn Module 21 including e presentation of a prompt asking the user whether he wants to proceed Faster or Slower. FIG. 33 shows the window displayed after the user has determined that he knows the unknown item being presented and has interrupted the sequence of presentation of this particular unknown item.

Figure 34:
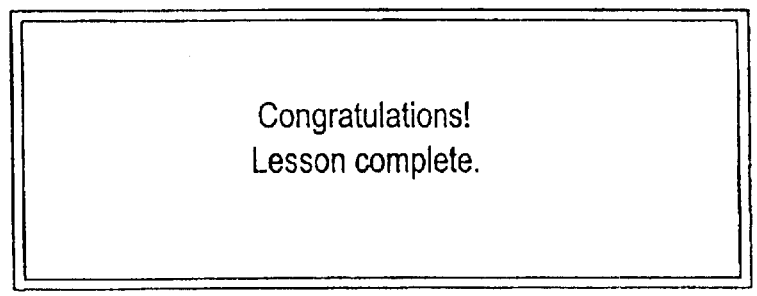
FIG. 34 is an illustration of a learn sequence including a completion indication for a preferred embodiment of the system shown in FIG. 1.

FIG. 34 shows the display that is provided after the user has completed the entire process of learning a lesson.

Figure 35:
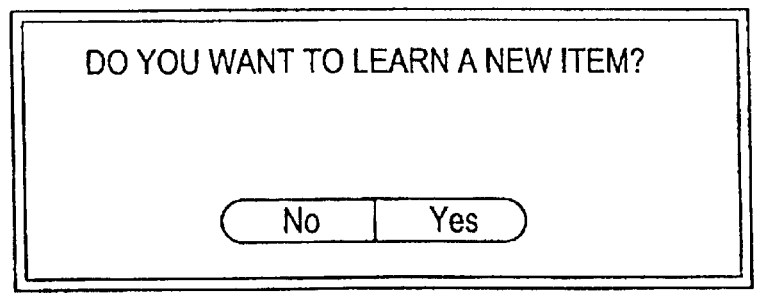
FIG. 35 is an illustration of a learn sequence including a new item learn prompt for a preferred embodiment of the system shown in FIG. 1.

FIG. 35 shows another operation of the Learn Module 21 according to a preferred embodiment of the present invention in which a user is asked if he wants to learn a new item. FIG. 35 shows the window displayed when a user has reached a point in the presentation sequence when no user interrupt is given, but a predetermined time or presentation value has been reached. The user determines whether he wants to learn a new item or continue learning the item that is currently being presented for learning. If the user chooses "Yes," the next unknown item is presented. If the user chooses "No," the presentation sequence for the item currently being learned is started over again.

Figure 36:
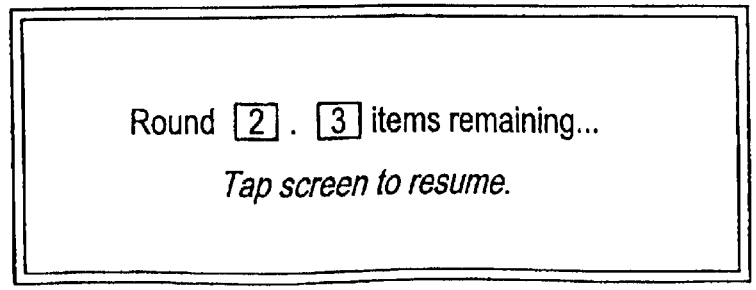
FIG. 36 is an illustration of a learn sequence indicating a Quick Review operation for a preferred embodiment of the present invention.

FIG. 36 shows a further operation of the Learn Module 21 including the operation of the Quick Review part of the Learn Module 21. FIG. 36 shows the display presented at the end of each Quick Review round.

Figure 37:
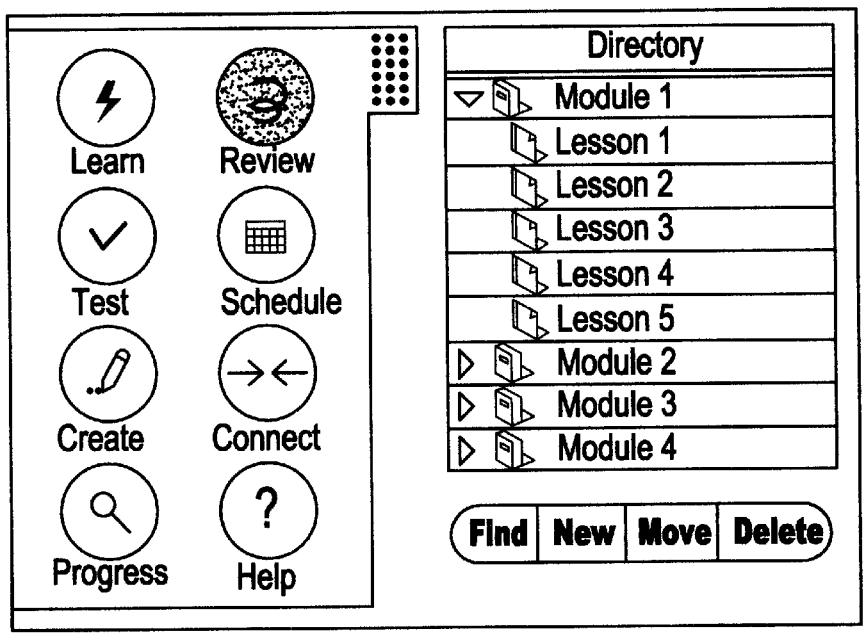
FIG. 37 is an illustration of a main window display with a review notification for a preferred embodiment of the present invention.

FIG. 37 shows a display including a Main Window with Review Notification included therein. In one preferred embodiment of the present invention, when items previously learned are scheduled for review via the Review Module 22 on the day that the user turns on the device, the Review button on the display is green and blinks to capture the user's attention. Also shown in FIG. 37, the green icon is arranged to move and preferably spiral next to the lesson icon on the display indicating that the lesson has been learned and that such lesson has been put on a schedule of review.

Figure 38:
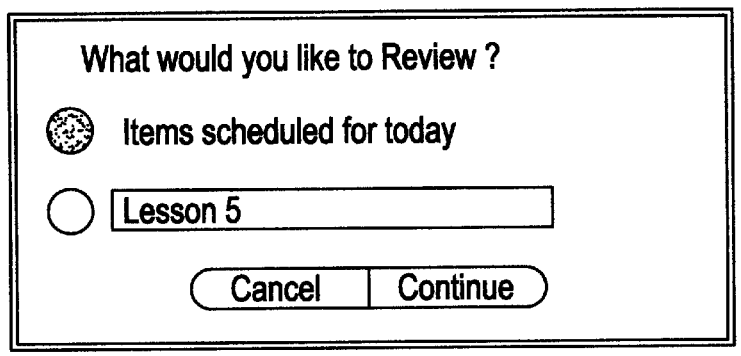
FIG. 38 is an illustration of a review sequence including a presentation of review options for a preferred embodiment of the present invention.

FIG. 38 shows a display illustrating operation of the Review Module 22. According to a preferred embodiment of the present invention, when items previously learned are scheduled for Review on the day that the device is turned on, the Review button on the display is green and blinks to capture the user's attention. If the user has selected a lesson in the Directory, and then taps the Review button, the window shown in FIG. 38 appears and asks the user what they would like to Review, for example, items scheduled for review today or the lesson selected in the Directory Window. The default is the Scheduled Review. The user selects one of the two and taps Continue to review his choice or taps Cancel to return to the Main Window.

Figure 39:
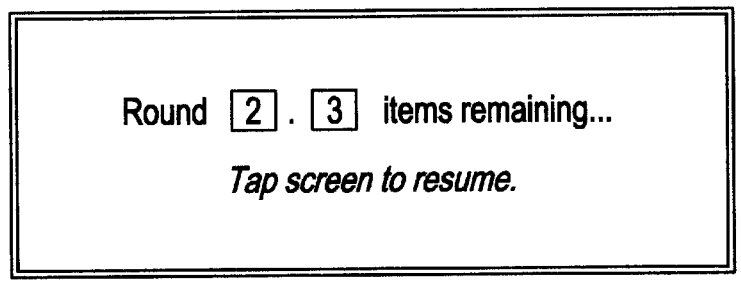
FIG. 39 is an illustration of a review sequence including an indication of an end of a review round for a preferred embodiment of the present invention.

FIG. 39 shows a further operation of the Review Module 22. According to a preferred embodiment of the present invention, after the user has completed a round of Review, and the round is not Round 4, the display shown in FIG. 39 is presented.

FIG. 40 shows another operation of the Review Module 22 including presentation of a cue. According to a preferred embodiment of the present invention, after the user has selected a lesson to Review or has selected to review items scheduled for Review, he is presented with a cue. At this point, the user attempts to actively recall the answer. When he has performed this task to his satisfaction, the user taps on the "Show the Answer" button shown in FIG. 40.

FIG. 41 shows a further operation of the Review Module 22 including a Rating Quality of Response. In one preferred embodiment of the present invention, after the user has tapped the "Show the Answer" button shown in FIG. 40, the user is presented with the correct response to the cue. The user compares his response to the correct response displayed and rates the quality of his response on a scale of 1 to 5 where 1 is the lowest quality and 5 is the highest quality.

Figure 42:
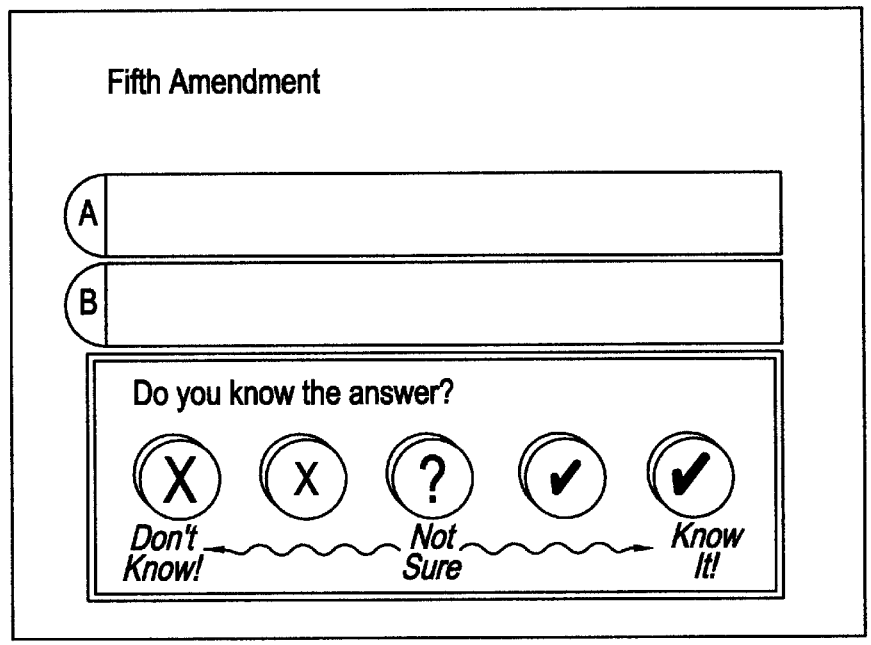
FIG. 42 is an illustration of a test sequence including a five alternative forced-choice for a preferred embodiment of the present invention.

FIG. 42 shows an operation of a Test Module 23 according to a preferred embodiment of the present invention, including the presentation of cue and a rating of the "Feeling of Knowing." In one preferred embodiment of the present invention, after the user has chosen a lesson he would like to be tested on, or the system or administrator has presented the user with a test via the Test Module 23, the user is presented with a cue. The user must actively recall what he considers to be the correct response. After he has made his attempt at such active recall, the user must determine his "feeling of knowing" on a scale of 1 to 5, where 1 is "Don't Know", 3 is "Not Sure" and 5 is "Know It", and 2 and 4 are gradations between the other scores.

Figure 43:
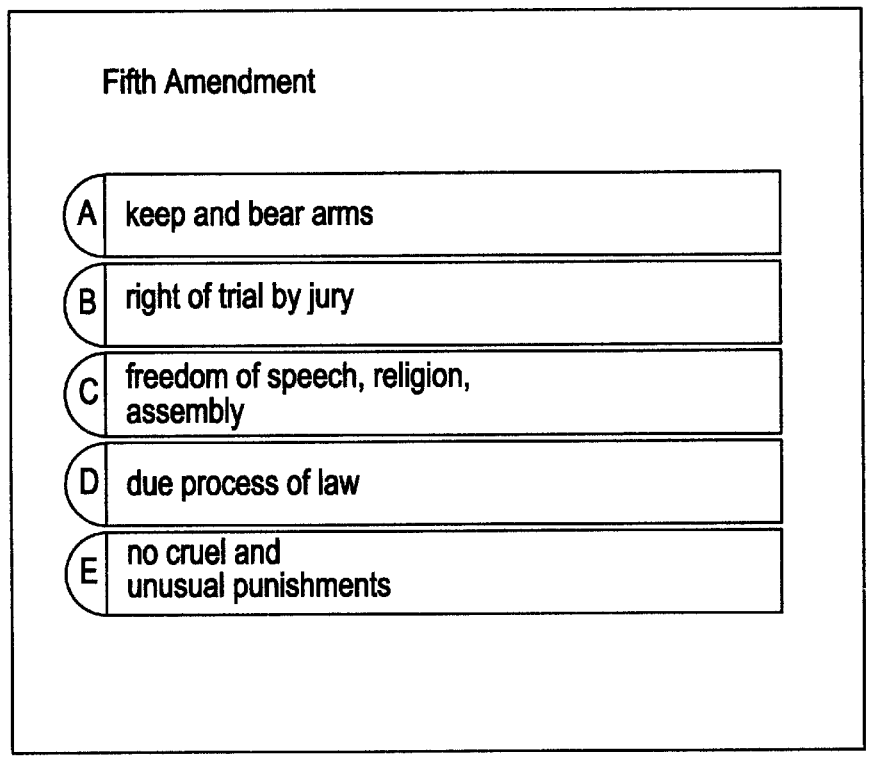
FIG. 43 is an illustration of a test sequence including a presentation of a cue and a feeling of knowing rating for a preferred embodiment of the present invention.

FIG. 43 shows a further operation of the Test Module 23 including the display of a correct response. In one preferred embodiment of the present invention, after the user has chosen a feeling of knowing score as described above, the user is presented with five alternative forced-choices. The user must find his answer among the choices and select the correct answer by tapping on the screen.

Figures 44, 45:
FIG. 44 is an illustration of a test sequence including a cue and correct response for a preferred embodiment of the present invention.
FIG. 45 is an illustration of a test sequence including scores of performance in the test sequence for a preferred embodiment of the present invention.

FIG. 44 shows another operation of the Test Module 23 including the display of a correct response. In one preferred embodiment of the present invention, after the user has selected what he considers to be the correct response from among the distracters as described in FIG. 44, the incorrect answers are erased leaving only the correct answer. If this is the answer the user selected in the step described in FIG. 43, the answer remains for a relatively short period of time. If it is not the answer that the user selected, the answer remains for a relatively longer period of time.

FIG. 45 shows an operation of the Test Module 23 including a display of test scores. In one preferred embodiment of the present invention, after the user has completed a test, he is provided with test scores which include the number of items missed, test score, performance score, percent under confident, and percent overconfident. If the user selected an incorrect response to the cue, the user will be provided with the opportunity to "re-learn" that item. If the user chooses "Yes", the items will be presented in a similar way as they were the very first time that the user learned these items.

Figure 46:
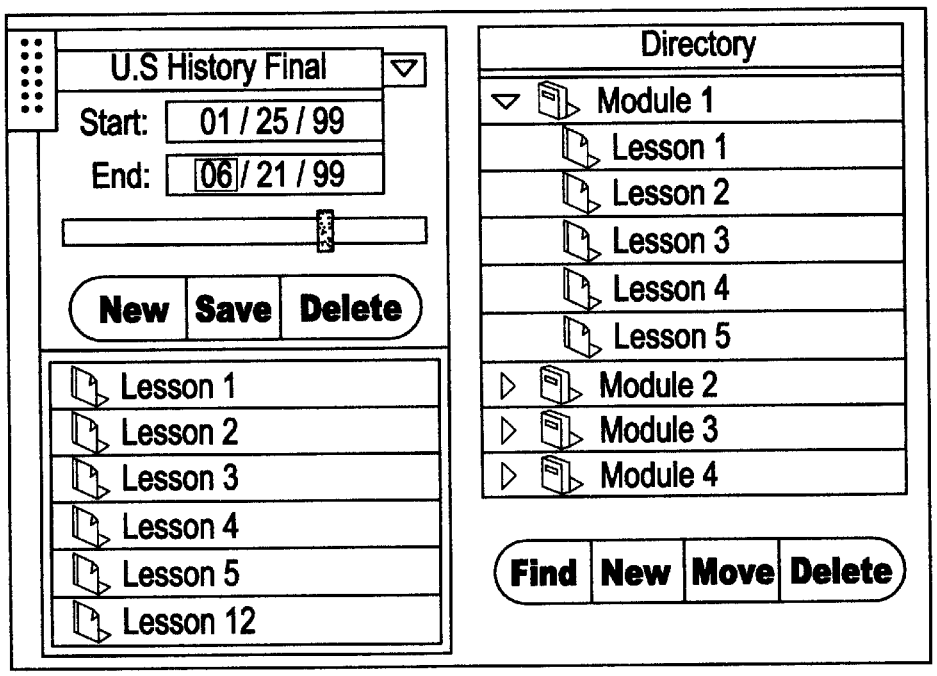
FIG. 46 is an illustration of a schedule main window display for a preferred embodiment of the present invention.

FIG. 46 shows an operation of the Schedule Module 25 including a Schedule Main Window display. In one preferred embodiment of the present invention, the user can request that the system 10 calculate and maintain a schedule for the user via the Schedule Module 25. The user inputs the starting date (defaulted to the current day's date) and the ending date, and identifies the lessons to be learned and the name of the schedule. Other relevant information can be input by the user, the system 10 or other sources. The system 10 then calculates the most effective and efficient schedule of Learning, Reviewing, and Testing so that all items are at the highest state of strength and activation possible on the end date. Also shown in FIG. 46 is a progress bar which shows where the user is in the schedule compared to where he should be (the vertical hash mark) if the user were following the schedule initially prescribed by the system.

Figure 47:
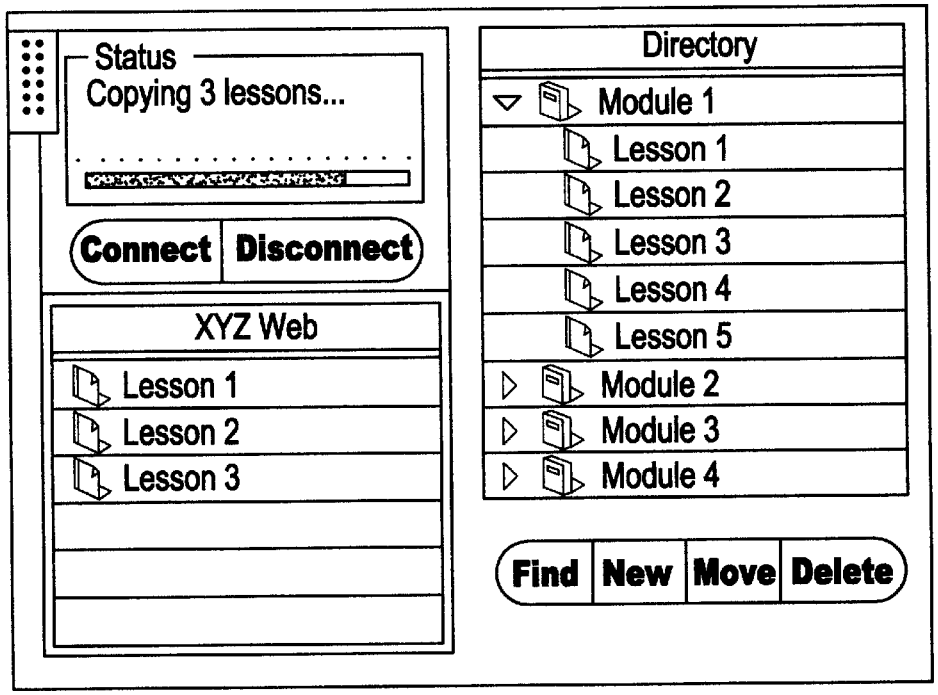
FIG. 47 is an illustration of a connect main window display for a preferred embodiment of the present invention.

FIG. 47 shows an operation of the Connect Module 300 including a Connect Main Window display. In one preferred embodiment of the present invention, the user can connect the system 10 to another similar system, a learning device, a computer including a laptop, palmtop and desktop PC, a telephone, a personal digital assistant or to another system via a network connection such as the Internet. In FIG. 47, the Directory on the right is the user's directory of lessons. The directory on the left in FIG. 47 represents the directory of the machine that the user is connected to. To transfer lessons between the two, the user simply clicks on the lessons in one window and drags them into the other window and drops them. The progress bar and status window on the upper left report the progress of the transfer and connection.

Figure 48:
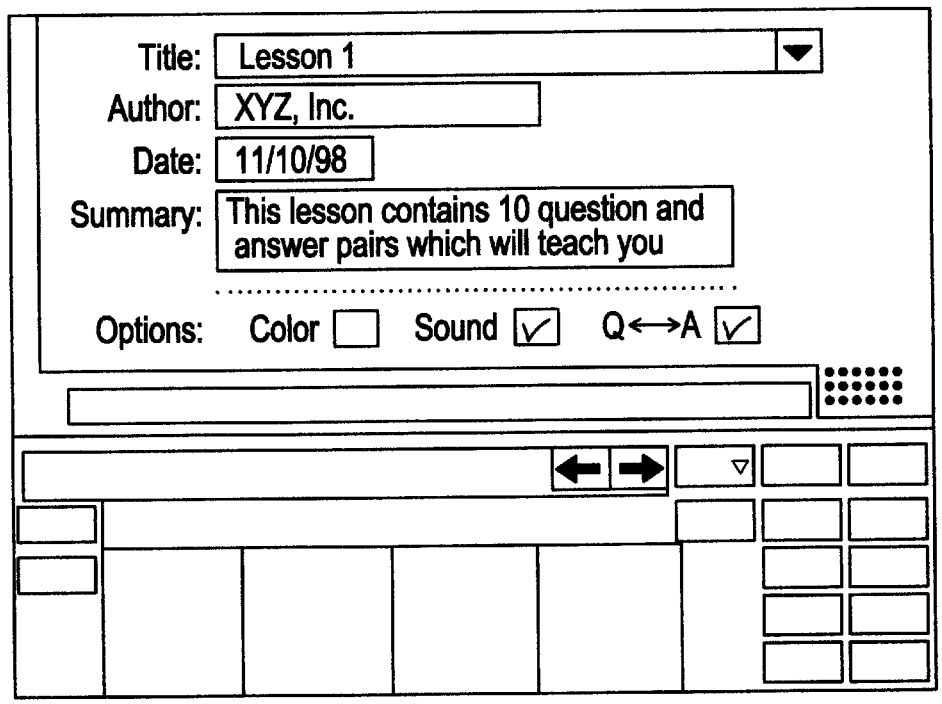
FIG. 48 is an illustration of a create control window display for a preferred embodiment of the present invention.

FIG. 48 shows an operation of the Create Module 200 including a Create Control Panel display. In one preferred embodiment of the present invention, the user can create lessons of his own. In FIG. 48, the Create Control Panel is shown. This is the panel where the user enters the title of the lesson, the author, the date of creation, and a summary of the lesson (which also appears in the Preview window described in FIG. 28). The user also sets options which determine whether the lesson will be shown in color, with sound, and whether the questions and answers will be reversed in the Quick Review portion of the Learn Module 21. The user closes (and opens) the panel by tapping on the tab on the bottom right hand corner of the panel. The user can also open up a list of lessons in the Directory by tapping on the down arrow on the Title input window. If a lesson is selected in this manner, the user can review the settings or modify then save the lesson.

Figure 49:
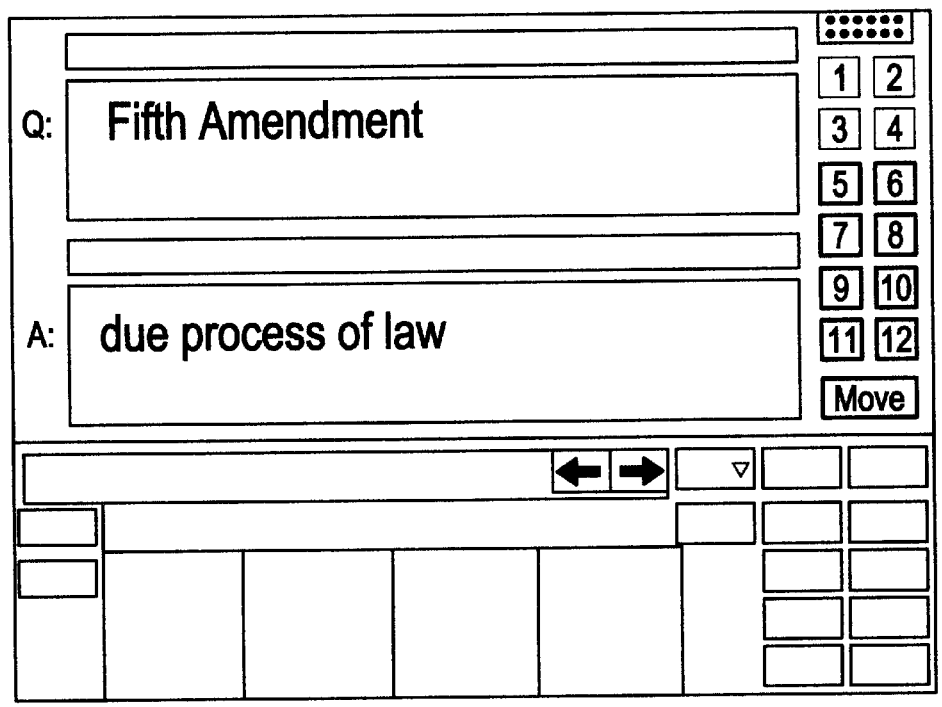
FIG. 49 is an illustration of a create main window display for a preferred embodiment of the present invention.

FIG. 49 shows a further operation of the Create Module 200 including a Create Main Window display. In a preferred embodiment of the present invention, the user can create lessons on his own. The display shown in FIG. 49 is provided when the Control Panel in FIG. 49 is closed.

The user enters the question and answer as shown in this figure by first tapping on one of the buttons on the right labeled from 1 to 12, and then entering the text in the appropriate window. Two additional input windows are available—one above the question and one above the answer. These windows allow the user to add pronunciation hints or any other information that the user would like to include with each item. The buttons on the right appear in different colors depending on the state of the question and answer fields. If the fields are blank, the button is blue. If the fields have data entered, the button is green. The button that is colored red is the question and answer field currently displayed.

The user can change the ordering of items by tapping on the button representing item he wishes to move, then tapping on the move button, then tapping on the position where he would like the item moved to. If there was an item already filled in the target location, it is moved to where the first item used to be.

Figure 50:
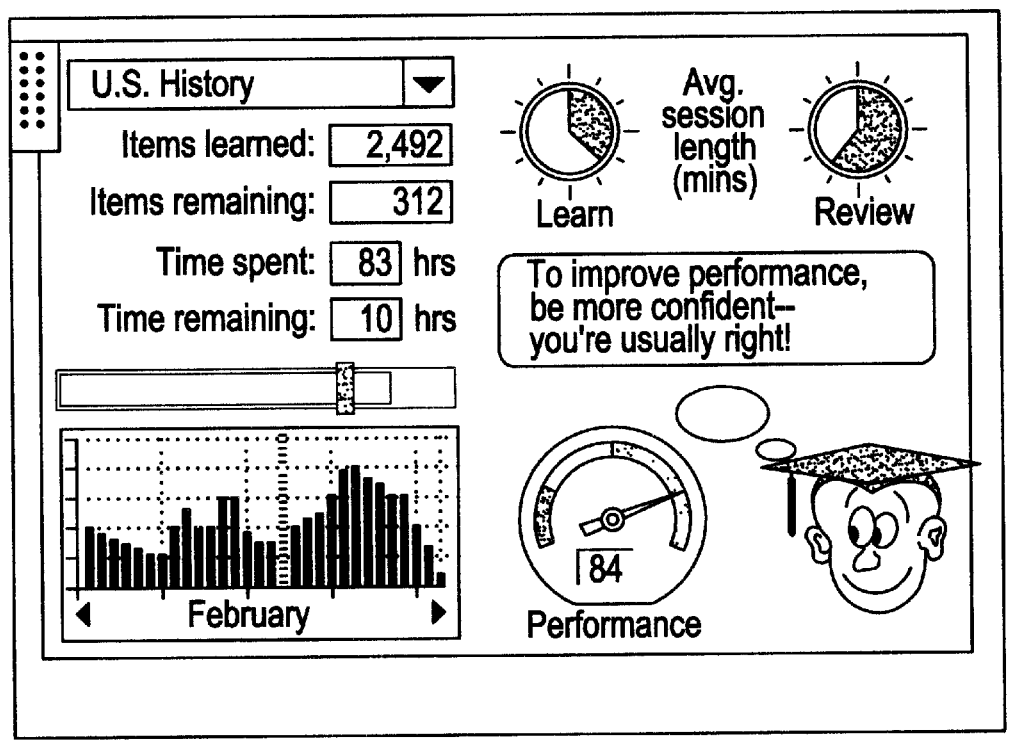
FIG. 50 is an illustration of a progress main window display for a preferred embodiment of the present invention.

FIG. 50 shows the operation of a Progress Module 26 including a Progress Main Window display. In a preferred embodiment of the present invention, the user is provided with feedback about his use of the system 10 via the Progress Module 26. FIG. 50 shows the various numeric and graphical feedback provided. In addition, the user can tap on any field displayed. The "teacher" character displayed in the bottom right corner of the display will look at the field tapped on, will smile or frown based upon the quality of the score, and will provide advice on how to improve the score in the thought or dialog "bubble" above his head.

Figure 51:
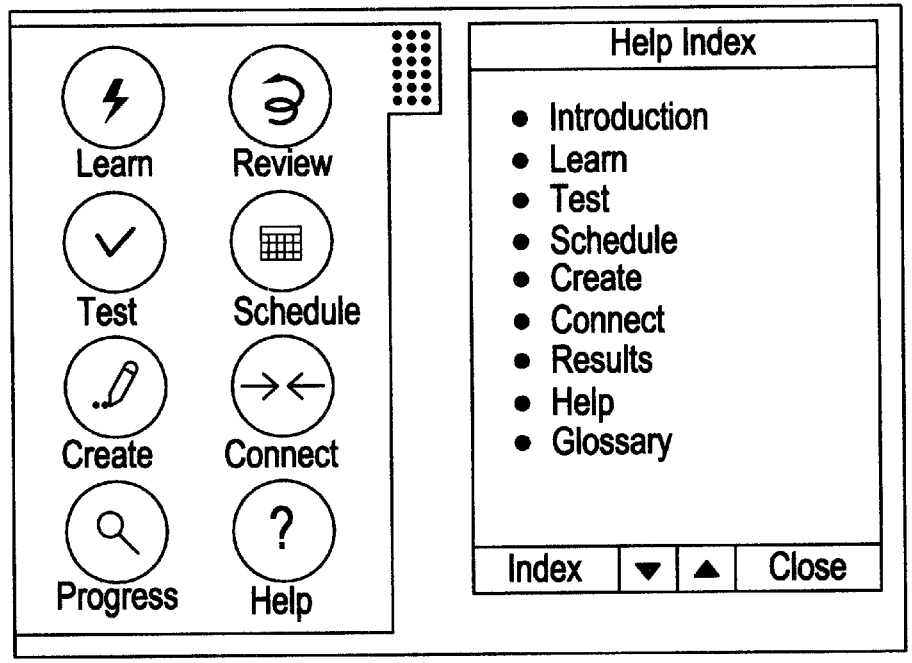
FIG. 51 is an illustration of a help main window display for a preferred embodiment of the present invention.

FIG. 51 shows the operation of the Help Module 27 including a Help Main Window display. In a preferred embodiment of the present invention, the user will be provided with textual and graphical help to assist with the use and operation of the system's features. The user simply taps on the Help button in the lower right corner of the Main Window Control Panel. The Help Index appears on the right and the user taps on the area of interest to reveal more information. The user taps the Close button when the user is through.

In another preferred embodiment of the present invention, the system 10 is embodied in a paper based application in the form of a word-a-day calendar shown in FIG. 52. In this preferred embodiment, the user is presented with one new word each day to learn with one set of information. In this case, spelling, part of speech, pronunciation, a full definition, and the use of the word within a sentence is included. The user is also presented two words for review that were very recently learned. The words are presented with a different set of information than a word presented the first time. In this case: spelling, part of speech, pronunciation and a brief definition. The user is also presented several words that were learned further in the past. The words are presented with a different set of information than a word presented the first time or words that were very recently learned. In this case: spelling and brief definition.

In this preferred embodiment of the present invention, responses (definitions of vocabulary words) are to be actively recalled based upon the presentation of cues (vocabulary words). This active recall can be accomplished by shielding the responses with paper or plastic until active recall is attempted, by making invisible responses visible with special pens and printed inks after recall is attempted, or any number of ways known to those skilled in the art.

FIG. 53 shows a table including a review expansion series for the paper-based system. As illustrated in FIG. 53, items learned should be scheduled for Review based upon on an expanding rehearsal series in order to maintain long term retention. Generally speaking, an adaptive system is desired in order to maximize the effectiveness and efficiency of the user's time. The schedule of review for each word learned is defined by FIG. 53. Words learned on day 0 are reviewed on the first following day, the third day after day 0, one week after day 0, two weeks after day 0, one month after day 0 and so on.

Numerous additional modifications and variations of the present invention are possible in light of the above teachings. As noted above, the information to be learned, reviewed and tested and the platforms for learning, reviewing and testing items is not limited in any sense and can be modified as desired. Also, various modules of the various preferred embodiments described above can be combined in different combinations to define systems as desired. Further, the various modules can operate independently of each other or can be interactive and adaptive to each other. Many other modifications, combinations and changes may be made to the present invention without departing from the scope of the present invention. It is therefore to be understood that within the scope of the appended claims, the present invention may be practiced other than as specifically described herein.

What is claimed is:

1. A method of learning comprising the steps of:
   (a) presenting information to be learned to a user so that the information to be learned becomes learned information;
   (b) presenting the learned information to the user for providing a review of the learned information;
   (c) presenting information to the user for testing whether the learned information is known by the user;
   (d) monitoring the user's performance in each of steps (a), (b) and (c);
   (e) measuring a memory strength of the user for each item of learned information during the user's operation in at least one of steps (a), (b) and (c);
   (f) modifying the future performance of at least one of steps (a), (b) and (c) based on the results of steps (d) and (e); and
   (g) determining metacognitive skills of the user by measuring at least one of the user's feeling of knowing, confidence and judgment of learning.

2. The method according to claim 1, further comprising the step of prompting the user to provide user preferences relating to the information to be learned and the scheduling of future operation of steps (a), (b) and (c).

3. The method according to claim 2, wherein the user preferences include a desired level of learning and retention, user learning time availability, type of information the user desires to learn, and changes in the scheduling of steps (a), (b) and (c).

4. The method according to claim 1, wherein the step of presenting information to be learned to the user is done such that the user learns the information to be learned to a level of automaticity.

5. The method according to claim 1, wherein the information to be learned by the user includes at least one of factual knowledge, declarative knowledge, factual information, skills, procedural knowledge, information objects, knowledge objects, and items of information that are desired to be learned initially and retrieved at a later date, information used to change behavior, information used to change thought processes, and information used to increase the ability to learn, review and test other items.

6. The method according to claim 1, wherein the information to be learned by the user is obtained from one of a text source, an image source, an audible sound source, a computer, the Internet, a mechanical device, an electrical device, and an optical device.

7. The method according to claim 1, wherein the information to be learned by the user is provided by at least one of a learning system, a user, an administrator, and an external information source.

8. The method according to claim 1, wherein the information to be learned by the user is presented to the user in the form of paired associate items each including a cue and a response.

9. The method according to claim 1, wherein the information to be learned by the user is presented to the user at least one of visually, auditorily and kinesthetically.

10. The method according to claim 1, wherein the information to be learned by the user is presented to the user in one of a serial order and a non-serial procedural order for skill-based learning.

11. The method according to claim 1, wherein the step of presenting the learned information to the user for providing a review is performed such that the learned information is reviewed and maintained by the user at a desired level of long term retention.

12. The method according to claim 1, further comprising the step of determining when the learned information has fallen below a desired level of retention of the learned information for the user and in response thereto performing the step of presenting the learned information to the user for providing a review.

13. The method according to claim 12, further comprising measuring the memory strength of the learned information to determine when the learned information has fallen below a desired level of retention of the learned information.

14. The method according to claim 1, wherein the information to be learned by the user is presented to the user in the form of paired associate items each including a cue and a response and the presentation of the cues and responses to the user is based on at least one of the type of information, difficulty of the information to learn, the user's performance in each of the steps (a), (b) and (c), measured arousal and attention to the user, the measured confidence of the user in responding to the presentation of cues and providing responses to cues, the number of times each of the paired-associate items has been presented to the user, the user's feeling of knowing and judgment of knowing as quantitatively rated by the user, the measured latency of response of the user, the measured memory strength for each of the paired associate items, and the measured probability of recall for each of the paired associate items.

15. The method according to claim 1, wherein the step of modifying the future performance of at least one of steps (a), (b) and (c) is performed to optimize the learning, memory and performance of the learned information by the user.

16. The method according to claim 1, further comprising the step of changing a schedule of presentation of at least one of steps (a), (b) and (c) based on the results of steps (d) and (e).

17. The method according to claim 16, wherein the step of changing the schedule includes calculating a schedule of the presentation of the information in at least one of the steps (a), (b) and (c) to maximize the strength and activation of the learned information by a predetermined date.

18. The method according to claim 16, wherein during the step of scheduling the operation of steps (a), (b) and (c), the information to be learned and the learned information is arranged and distributed to achieve workload smoothing.

19. The method according to claim 16, further comprising the step of monitoring the user's ability to comply with the generated schedule and modifying the schedule based on the monitored information.

20. The method according to claim 16, further comprising the step of determining if there is any deviation from the schedule, and recalculating the schedule to correct for any deviation determined.

21. The method according to claim 1, wherein the steps of the method are embodied as one of computer software, a signal carrier wave format to be used on an Internet-based system, machine-executable instructions, computer-executable instructions for operation on a processor-based system including at least one of a computer, a telephone, a personal digital assistant and an information transmission device.

22. The method according to claim 1, wherein the steps of the method are performed via one of a paper-based system, a computer-based system, a human-based system, and a system that presents information to a person or organism for learning and future retrieval of the information.

23. The method according to claim 1, wherein the steps of the method are performed via a processor-based system.

24. The method according to claim 1, wherein the steps of the method are performed via a non-processor-based system.

25. The method according to claim 1, wherein the steps of the method are performed via at least one of a processor, a central processing unit, a computer, a telephone, a cellular telephone, a personal digital assistant, a hand-held electronic device, an information transmission device and a digital data/information transmission device which performs the steps via processing of instructions embodied in machine readable code or computer executable code.

26. The method according to claim 1, further comprising the step of presenting the information to be learned in the form of paired associate items each including a cue and a response, and determining at least one of a presentation pattern, a presentation rate, and a presentation sequence of the paired associate items based on the performance of the user in at least one of steps (a), (b) and (c).

27. The method according to claim 1, wherein the steps of the method are performed via at least one of audio tapes, video tapes, and paper-based systems including calendars, books, and documents.

28. The method according to claim 1, wherein the step of measuring memory strength is performed by gathering overt and covert information during the user's operation in at least one of steps (a), (b) and (c).

29. The method according to claim 1, further comprising the step of allowing the user to input the information to be learned.

30. The method according to claim 29, further comprising the step of allowing the user to input information relating to the information to be learned input by the user in the step of allowing the user to input the information to be learned.

31. The method according to claim 1, further comprising the step of displaying to the user information relating to the user's progress with at least one of steps (a), (b) and (c).

32. The method according to claim 1, wherein the step of monitoring the user's performance during each of steps (a), (b) and (c) is done without the user knowing about being monitored.

33. The method according to claim 1, further comprising the step of identifying at least two confusable items to be learned and presenting to the user the at least two confusable items to be learned successively during at least one of steps (a), (b) and (c).

34. The method according to claim 1, further comprising the step of providing information about the user's performance during testing including at least one of the number of items missed, a test score, a performance score, percent under confident and percent overconfident.

35. The method according to claim 1, further comprising the steps of presenting the information to be learned and the learned information in the form of paired associate items each including a cue and a response, and determining a sequence of items to be learned and a time period between a presentation of the cue and the response of each of the paired-associate items and a time period between presentation of successive paired associate items to achieve a desired level of learning.

36. The method according to claim 1, wherein the information to be learned is presented by generating a sequence of known and unknown items and presenting the known and unknown items via an expanded rehearsal series adapted to the unknown item.

37. The method according to claim 36, further comprising the step of adapting the expanded rehearsal series to the user based on the user's performance.

38. The method according to claim 36, wherein the sequence of known and unknown items is arranged to provide an intra-trial spacing effect.

39. The method according to claim 37, wherein the sequence of known and unknown items is arranged to provide an inter-trial spacing effect.

40. The method according to claim 2, further comprising the step of allowing the user to interrupt the presenting of the information to be learned and the learned information during at least one of steps (a), (b) and (c).

41. The method according to claim 1, wherein the performance of the user that is monitored in step (d) includes at least one of time required for the user to input various responses, the ability of the user to adhere to a schedule of operation of steps (a), (b), and (c), the user's level of interest and the user's arousal in learning.

42. The method according to claim 41, wherein the user's level of interest and arousal in learning is determined by measuring at least one physiological characteristic of the user.

43. The method according to claim 2, further comprising the step of calculating for each of the paired associates a memory strength over time based on a rate of initial learning, a degree of initial learning, a probability of recall, a latency of recall and savings in relearning.

44. The method according to claim 43, further comprising the steps of presenting the information to be learned and the learned information in the form of paired associate items each including a cue and a response, wherein the calculated memory strength for each of the paired associate items is used to adaptively modify the operation of at least one of steps (a), (b) and (c).

45. The method according to claim 2, further comprising the steps of presenting the information to be learned and the learned information in the form of paired associate items each including a cue and a response and determining when a memory strength for a particular item has decreased to a minimum retention level for the user by making calculated projections related to at least one of the decline of human memory, the type and difficulty of each of the paired associate items, the recency of presentation of the paired associate item, the frequency of presentation of the paired associate item, the pattern of prior user's exposure to the paired associate item, and the user's particular history of past performance in operation of steps (a), (b) and (c).

46. The method according to claim 2, further comprising the steps of presenting the information to be learned and the learned information in the form of paired associate items each including a cue and a response, monitoring the memory strength for each of the paired associate items and determining a schedule for review or testing of the paired associate items based on the monitored memory strength.

47. The method according to claim 2, further comprising the step of presenting the information to be learned and the learned information based on an expanded rehearsal series that is adapted to the user based on the measured user performance.

48. The method according to claim 2, further comprising the steps of presenting the information to be learned and the learned information in the form of paired associate items each including a cue and a response, wherein the user's performance is measured based on the user's ability to evaluate accurately whether the user knows the correct response and the incorrect responses to the cue of the paired associate items.

49. The method according to claim 48, wherein the step of measuring the user's performance includes the step of determining the time required for the user to make the evaluation about the correct response and incorrect responses.

50. The method according to claim 1, further comprising the step of modifying future operation of at least one of steps (a), (b) and (c) based on the results of the step of measuring at least one of the user's feeling of knowing, confidence and judgment of learning.

51. The method according to claim 1, further comprising the step of measuring at least one of the user's probability of recall, latency of response, and savings in relearning.

52. The method according to claim 51, further comprising the step of modifying future operation of at least one of steps (a), (b) and (c) based on the step of measuring at least one of the user's probability of recall, latency of response, and savings in relearning.

53. The method according to claim 1, further comprising the step of asking the user to indicate a desired degree of initial learning including one of familiarity, recognition, recall and automaticity.

54. The method according to claim 53, further comprising the step of generating a sequence of items to be learned based on a desired degree of initial learning indicated by the user.

55. The method according to claim 1, further comprising the steps of presenting the information to be learned and the learned information in the form of paired associate items each including a cue and a response, wherein a timing, order of presentation and sequence of presentation of each cue and response of the paired associate items is interactively determined based on information obtained from the user.

56. The method according to claim 55, wherein the information obtained from the user is obtained via input based on covertly obtained user performance information and overtly obtained information input by the user.

57. The method according to claim 55, wherein a timing, order of presentation and sequence of each cue and response is interactively determined based on input information including at least one of information concerning rate of presentation of the paired associate items, format of presentation of the paired associate items, and sequence of presentation of the paired associate items.

58. The method according to claim 1, wherein the information to be learned and the learned information is presented to the user based on at least one of an initial desired degree of memory strength and a desired degree of retention.

59. The method according to claim 1, further comprising the step of measuring at least one of probability of recall, latency of recall, and savings in relearning during operation of steps (a), (b) and (c), and modifying future operation of at least one of steps (a), (b) and (c) based on the results of the step of measuring at least one of probability of recall, latency of recall, and savings in relearning during operation of steps (a), (b) and (c).

60. The method according to claim 1, further comprising the steps of presenting the information to be learned and the learned information in the form of paired associate items each including a cue and a response, and modifying at least one of a pattern of presentation of the paired associate items, a sequence of paired associate items and a timing of presentation of the paired associate items based on the results of the step of measuring the user's performance during at least one of steps (a), (b) and (c).

61. The method according to claim 1, further comprising the step of increasing the user's attention to the information to be learned or the learned information by presenting obligatory attention cues to the user.

62. The method according to claim 1, further comprising the steps of presenting the information to be learned and the learned information in the form of paired associate items each including a cue and a response, and increasing the user's attention to the information to be learned or the learned information by varying at least one of the presentation pattern of the paired associate items, the sequence of presentation of the paired associate items, and the timing of presentation of the paired associate items.

63. The method according to claim 1, further comprising the steps of presenting the information to be learned and the learned information via paired-associate items each including a cue and a response and modifying an order of presentation of the paired associate items so as to eliminate a serial position effect.

64. The method according to claim 1, further comprising the steps of presenting the information to be learned and the learned information in the form of paired associate items each including a cue and a response and reordering the presentation of the cue and response of the paired associate items during future operation of at least one of steps (a), (b) and (c).

65. The method according to claim 1, further comprising the steps of presenting the information to be learned and the learned information in the form of paired associate items each including a cue and a response and generating a sequence of the paired associate items for presentation to the user in which the paired associate items that are more difficult to learn or remember are presented to the user more times than the paired associate items that are less difficult to learn or remember.

66. The method according to claim 1, further comprising the step of prompting the user to make a judgment of learning after the information to be learned is presented to the user.

67. The method according to claim 1, further comprising the step of providing a preview of the information to be learned before the user begins learning in step (a).

68. The method according to claim 1, further comprising the steps of presenting the information to be learned and the learned information in the form of paired associate items each including a cue and a response and providing the user an opportunity to review the paired associate items that the user has determined to be difficult to learn after learning the paired associate items in step (a).

69. The method according to claim 1, further comprising the steps of presenting the information to be learned and the learned information in the form of paired associate items each including a cue and a response and determining an ease of initial learning for each of the paired associate items by measuring how many times each of the paired associate items was presented to the user before the user indicated that the user had learned the paired associate item.

70. The method according to claim 69, further comprising the step of determining a relative degree of difficulty of learning for each of the paired associate items based on the ease of initial learning and determining an appropriate review schedule for the paired associate items based on the relative degree of difficulty of each of the paired associate items.

71. The method according to claim 1, further comprising the step of using at least one of hopping tables, prediction curves and mathematical correlations to accurately control future performance of the steps (a), (b) and (c).

72. The method according to claim 1, further comprising the step of using a learn hopping table to determine the initial schedule of presentation of the learned information and modifying a schedule of presentation of the learned information in step (b) based on user performance and review curves.

73. The method according to claim 1, further comprising the steps of presenting the information to be learned and the learned information in the form of paired associate items each including a cue and a response, wherein the learned information is presented to the user during step (b) so as to increase memory strength of the paired associate items learned later and so as to increase memory activation of items learned earlier.

74. The method according to claim 1, further comprising the steps of presenting the information to be learned and the learned information in the form of paired associate items each including a cue and a response, wherein the learned information is presented to the user during step (b) is arranged based on at least one of degree of difficulty of the paired associate items, degree of importance of the paired associate items, memory strength of the paired associate items, activation of the paired associate items and the user's past performance with at least one of steps (a), (b) and (c).

75. The method according to claim 1, further comprising the steps of presenting the information to be learned and the learned information in the form of paired associate items each including a cue and a response and arranging the information to be learned or the learned information based on at least one of importance of the paired associate items, strength of the paired associate items and activation of the paired associate items.

76. The method according to claim 1, further comprising the step of measuring the user's latency of recall while presenting the learned information in step (b).

77. The method according to claim 76, further comprising the step of stopping the review of learned information based on the measured latency of recall.

78. The method according to claim 1, further comprising the steps of presenting the information to be learned and the learned information in the form of paired associate items each including a cue and a response and determining the time between presentation of a cue and presentation of a response of the paired associate items during step (b) based on at least one of user input, position of the paired associate item within the paired associate items being reviewed, primary sensory modality, and covert data obtained from the user.

79. The method according to claim 1, further comprising the steps of presenting the information to be learned and the learned information in the form of paired associate items each including a cue and a response and arranging the presentation of each cue and response of the paired associate items relative to other cues and responses based on timing, sequence, and format of the paired associate items.

80. The method according to claim 1, further comprising the step of presenting the learned information in step (b) based on at least one of a forgetting/retention function and an expanded rehearsal series.

81. The method according to claim 1, further comprising the steps of presenting the information to be learned and the learned information in the form of paired associate items each including a cue and a response and modifying model for the rate of forgetting of each of the paired associate items for the user based on the user's performance in at least one of steps (a), (b) and (c).

82. The method according to claim 1, wherein the test presented during the step of testing includes one of a test of familiarity, a test of recognition, a test of recall, and a test of automaticity.

83. The method according to claim 1, further comprising the step of measuring latency of response during at least one of steps (a), (b) and (c) and modifying future operations of the steps (a), (b), and (c) based on the results of the step of measuring latency of response.

84. The method according to claim 1, wherein the test presented during step (c) is an alternative forced-choice test.

85. The method according to claim 1, wherein the test presented during step (c) is a five alternative forced-choice test in which a user must select one of the five alternatives presented in response to a cue.

86. The method according to claim 1, wherein the user is asked if the user knows the answer during the step (c) and is asked to provide a feeling of knowing by choosing one of a plurality of ratings relating to how sure the user is that the user knows the answer.

87. The method according to claim 86, further comprising the step of measuring the time required for the user to provide the feeling of knowing.

88. The method according to claim 86, further comprising the step of prompting the user to select a correct response from a plurality of responses presented to the user and measuring the time required for the user to select one of the plurality of responses.

89. The method according to claim 88, further comprising the step of asking the user how confident the user is that the response selected by the user from the plurality of responses is the correct response and measuring the time required for the user to indicate how confident the user is that the response selected by the user is correct.

90. The method according to claim 1, further comprising the step of asking the user to provide information about the user's feeling of knowing and confidence of response during step (c).

91. The method according to claim 1, further comprising the step of providing the user with the opportunity to review items for which the user provided an incorrect response during testing in step (c).

92. The method according to claim 1, wherein the learned information to be tested in step (c) is arranged and presented to the user based on at least one of time of day, gender of the user, age of the user, physiological measures of the user, measures of attentiveness of the user, environmental conditions, the type of learned information to be tested, difficulty of the learned information, the recency of the learned information, the frequency of the learned information and a pattern of prior exposure of the user to the learned information.

93. The method according to claim 1, further comprising the step of scheduling the operation of at least one of steps (a), (b) and (c) based on at least one of the information input by the user, information input by a learning administrator, and information input by a learning system.

94. The method according to claim 1, further comprising the step of scheduling the operation of at least one of steps (a), (b) and (c) based on at least one of date that the learned information must be known to the user, the current date, the start date, the information to be learned that must be learned by the user between the start date and the test date, the user's desired degree of initial learning and retention, times that the user is not available and the user's ability to adhere to previously generated schedules.

95. The method according to claim 1, further comprising the step of scheduling the operation of at least one of steps (a), (b) and (c) based on at least one of inputs from the user, inputs from a learning administrator, a spacing effect of the information presented in steps (a), (b) or (c) strength of the learned information, activation of the learned information, when a lesson was initially learned, the degree of difficulty of learned information, and the confusability of learned information.

96. The method according to claim 1, further comprising the step of identifying confusable items from the paired associate items, identifying a feature of the confusable items which increases discriminability between the confusable items, and using the feature which increases disciminability to practice discriminating between the confusable items.

97. The method according to claim 96, further comprising the step of presenting the confusable items via a blink comparator which overlays and alternatively presents to the user the confusable items in a manner to show clear differences between the confusable items.

98. The method according to claim 96, further comprising the step of changing the presentation of the confusable paired associate items by changing the order of the cue and response in each of the paired associate items.

99. The method according to claim 1, further comprising the steps of presenting the information to be learned and the learned information via paired-associate items each including a cue and a response and determining timing between presentation of the cue and the response for each of the paired-associate items.

100. The method according to claim 1, further comprising the step of scheduling the operation of steps (a), (b) and (c) based on at least one of a start date, an end date, type of information to be learned, a desired level of retention, an amount of time each day that the user is available, a desired number of final reviews, amount of time available for final reviews, the user's learning history, and black out days when the user is not available.

101. The method according to claim 1, further comprising the steps of determining a schedule of operation of steps (a), (b) and (c) including determining a normal review zone, a final review zone and a compression review zone.

102. The method according to claim 1, further comprising the step of asking the user if the user wants to have the information to be learned presented faster or slower in step (a).

103. A method according to claim 1, further comprising the step of measuring time required for operation of each of steps (a), (b) and (c).

104. A method of learning comprising the steps of:
(a) presenting information to be learned to a user so that the information to be learned becomes learned information;
(b) presenting the learned information to the user for providing a review of the learned information;
(c) presenting information to the user for testing whether the learned information is known by the user;
(d) monitoring the user's performance in each of steps (a), (b) and (c);
(e) measuring a memory strength of the user for each item of learned information during the user's operation in at least one of steps (a), (b) and (c); and
(f) modifying the future performance of at least one of steps (a), (b) and (c) based on the results of steps (d) and (e);
wherein during testing, prompting the user to provide a feeling of knowing score indicating how confident the user is that an answer is correct.

105. The method according to claim 104, further comprising the step of determining metacognitive skills of the user by measuring at least one of the user's feeling of knowing, confidence and judgment of learning.

106. A method of learning comprising the steps of:
(a) presenting information to be learned to a user so that the information to be learned becomes learned information;
(b) presenting the learned information to the user for providing a review of the learned information;
(c) presenting information to the user for testing whether the learned information is known by the user;
(d) monitoring the user's performance in each of steps (a), (b) and (c);
(e) measuring a memory strength of the user for each item of learned information during the user's operation in at least one of steps (a), (b) and (c);
(f) modifying the future performance of at least one of steps (a), (b) and (c) based on the results of steps (d) and (e);
(g) providing information about the user's performance during testing including at least one of the number of items missed, a test score, a performance score, percent under confident and percent overconfident; and
(h) inquiring if the user desires to relearn items that the user provided an incorrect response to during testing and allowing the user to relearn the items that the user provided an incorrect response to during testing.

107. A method of learning comprising the steps of:
(a) presenting information to be learned to a user so that the information to be learned becomes learned information;
(b) presenting the learned information to the user for providing a review of the learned information;
(c) presenting information to the user for testing whether the learned information is known by the user;
(d) monitoring the user's performance in each of steps (a), (b) and (c);
(e) measuring a memory strength of the user for each item of learned information during the user's operation in at least one of steps (a), (b) and (c);
(f) modifying the future performance of at least one of steps (a), (b) and (c) based on the results of steps (d) and (e); and (g) arranging the information to be learned or the learned information based on an Nth degree polynomial smoothing function.

108. A method of learning comprising the steps of:
(a) presenting information to be learned to a user so that the information to be learned becomes learned information;
(b) presenting the learned information to the user for providing a review of the learned information;
(c) presenting information to the user for testing whether the learned information is known by the user;
(d) monitoring the user's performance in each of steps (a), (b) and (c);
(e) measuring a memory strength of the user for each item of learned information during the user's operation in at least one of steps (a), (b) and (c);
(f) modifying the future performance of at least one of steps (a), (b) and (c) based on the results of steps (d) and (e);
(g) measuring the user's latency of recall while presenting the learned information in step (b); and
(h) stopping presenting of the learned information based on a user's quantitative judgment of the adequacy of the user's response.

109. A method of learning comprising the steps of:
(a) presenting information to be learned to a user so that the information to be learned becomes learned information;
(b) presenting the learned information to the user for providing a review of the learned information;
(c) presenting information to the user for testing whether the learned information is known by the user;
(d) monitoring the user's performance in each of steps (a), (b) and (c);
(e) measuring a memory strength of the user for each item of learned information during the user's operation in at least one of steps (a), (b) and (c);
(f) modifying the future performance of at least one of steps (a), (b) and (c) based on the results of steps (d) and (e);
wherein learned information presented during step (b) is based on a selected one of a plurality of forgetting curves which model the forgetting rate for each item of learned information and for the user.

110. The method according to claim 109, wherein the selected one of the plurality of forgetting curves is modified during the step (b) to model the forgetting rate of the user.

111. A method of learning comprising the steps of:
(a) presenting information to be learned to a user so that the information to be learned becomes learned information;
(b) presenting the learned information to the user for providing a review of the learned information;
(c) presenting information to the user for testing whether the learned information is known by the user;
(d) monitoring the user's performance in each of steps (a), (b) and (c);
(e) measuring a memory strength of the user for each item of learned information during the user's operation in at least one of steps (a), (b) and (c);
(f) modifying the future performance of at least one of steps (a), (b) and (c) based on the results of steps (d) and (e); and
(g) determining a forgetting curve that models the rate of forgetting of the learned information over time based on a quality response provided by the user.

112. A method of learning comprising the steps of:
(a) presenting information to be learned to a user so that the information to be learned becomes learned information;
(b) presenting the learned information to the user for providing a review of the learned information;
(c) presenting information to the user for testing whether the learned information is known by the user;
(d) monitoring the user's performance in each of steps (a), (b) and (c);
(e) measuring a memory strength of the user for each item of learned information during the user's operation in at least one of steps (a), (b) and (c);
(f) modifying the future performance of at least one of steps (a), (b) and (c) based on the results of steps (d) and (e); and
(g) arranging the learned information during testing in step (c) based on at least one of difficulty and confusability of the learned information.

* * * * *